US008413390B2

(12) United States Patent
Pereira

(10) Patent No.: US 8,413,390 B2
(45) Date of Patent: Apr. 9, 2013

(54) POLYGON MAST

(75) Inventor: Kenneth J. Pereira, Lemoore, CA (US)

(73) Assignee: US Tower Corporation, Woodlake, CA (US)

(*) Notice: Subject to any disclaimer, the term of this patent is extended or adjusted under 35 U.S.C. 154(b) by 383 days.

(21) Appl. No.: 12/290,238

(22) Filed: Oct. 28, 2008

(65) Prior Publication Data

US 2009/0145056 A1  Jun. 11, 2009

Related U.S. Application Data

(60) Provisional application No. 61/000,949, filed on Oct. 29, 2007.

(51) Int. Cl.
*B66C 23/06* (2006.01)
*B66C 23/62* (2006.01)
*E04H 12/34* (2006.01)

(52) U.S. Cl. .......................................... 52/111; 343/883

(58) Field of Classification Search ............. 52/40, 111, 52/632, 108, 118, 121, 67; 343/883, 901, 343/903; 74/424.71
See application file for complete search history.

(56) References Cited

U.S. PATENT DOCUMENTS

| | | | | |
|---|---|---|---|---|
| 3,034,209 A * | 5/1962 | Bianca et al. | | 29/432 |
| 3,688,455 A | 9/1972 | Zebuhr | | |
| 4,062,156 A * | 12/1977 | Roth | | 52/111 |
| 4,254,423 A | 3/1981 | Reinhard | | |
| 4,337,601 A * | 7/1982 | Vaerk et al. | | 52/118 |
| 4,358,915 A * | 11/1982 | Pantalone | | 52/115 |
| 4,663,900 A | 5/1987 | Rehm et al. | | |
| 4,871,138 A | 10/1989 | Sauter | | |
| 5,163,650 A | 11/1992 | Adams | | |
| 5,218,375 A * | 6/1993 | Hillman | | 343/883 |
| 5,537,125 A | 7/1996 | Harrell, Jr. et al. | | |
| 5,557,892 A * | 9/1996 | Lavin | | 52/121 |
| 5,593,129 A * | 1/1997 | Adams et al. | | 248/405 |
| 5,615,855 A | 4/1997 | Marue et al. | | |
| 5,624,046 A * | 4/1997 | Zimmermann | | 212/349 |
| 5,660,495 A | 8/1997 | Atsukawa | | |
| 5,887,841 A | 3/1999 | Newberg | | |
| RE37,559 E | 2/2002 | Marue et al. | | |
| 7,062,221 B1 | 6/2006 | Christensen | | |
| 2006/0236648 A1 * | 10/2006 | Grundman et al. | | 52/726.4 |

FOREIGN PATENT DOCUMENTS

| | | |
|---|---|---|
| DE | 271061 C | 3/1914 |
| EP | 0192094 A | 6/1986 |
| EP | 0486990 A | 6/1992 |

OTHER PUBLICATIONS

International application No. PCT/US2008/012187, International Search Report and Written Opinion, Aug. 27, 2009.

* cited by examiner

*Primary Examiner* — William Gilbert
*Assistant Examiner* — Theodore Adamos
(74) *Attorney, Agent, or Firm* — Lewis and Roca LLP

(57) ABSTRACT

Aspects of the invention relate to telescoping mast assemblies (telescoping "towers"), polygonal sided masts for use in such assemblies, methods of fabricating polygonal sided masts, methods and apparatus for sequentially actuating and deactuating hold-down and locking mechanisms in telescoping towers, and such other aspects as will be understood from the present descriptions and drawings. Telescopic towers are usable for supporting and raising to a height any type of communications payload, including, for example, radio antennas, television antennas, any type of surveillance and/or sensor payloads, including, for example, microphones, cameras, flood lights, and the like.

18 Claims, 53 Drawing Sheets

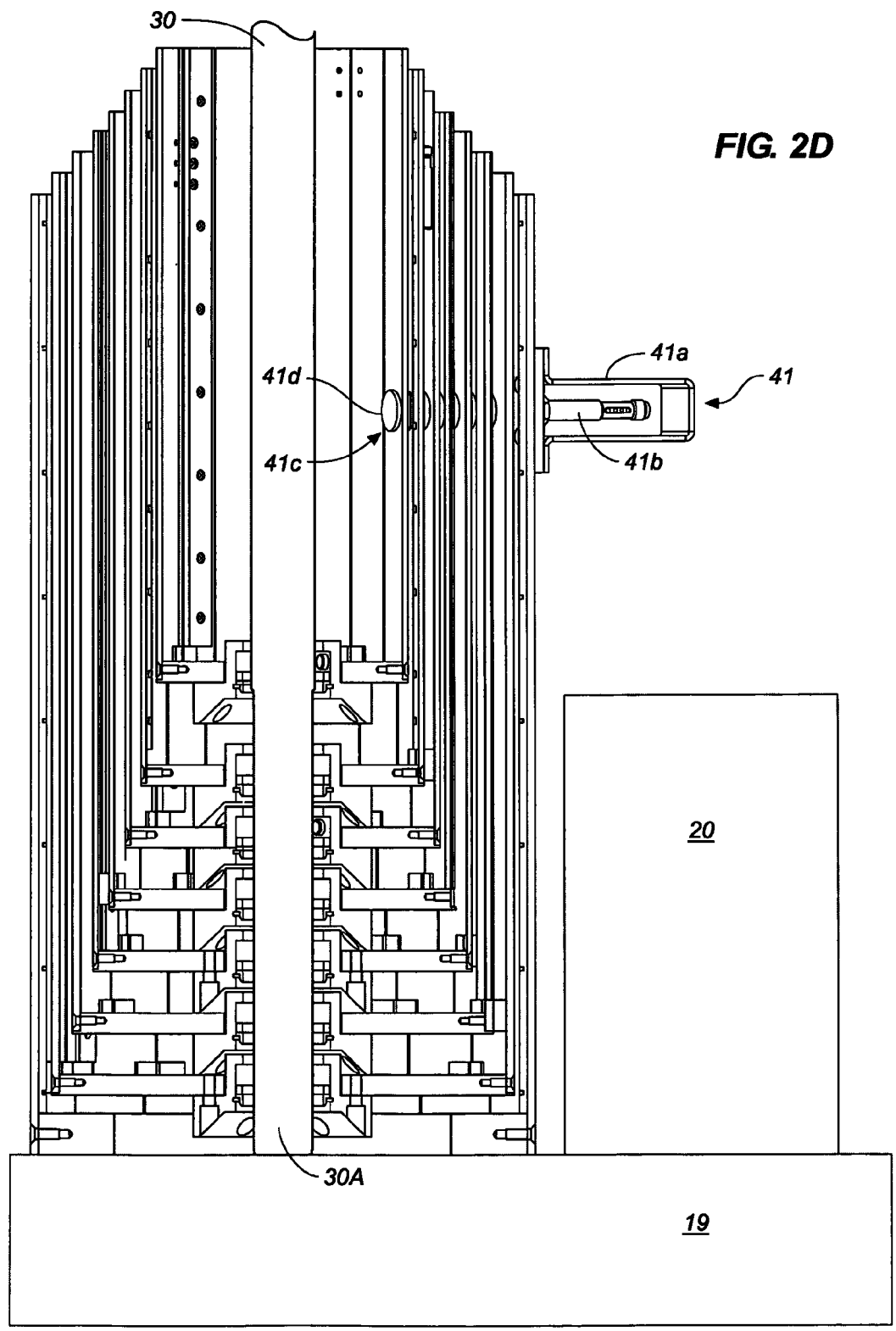

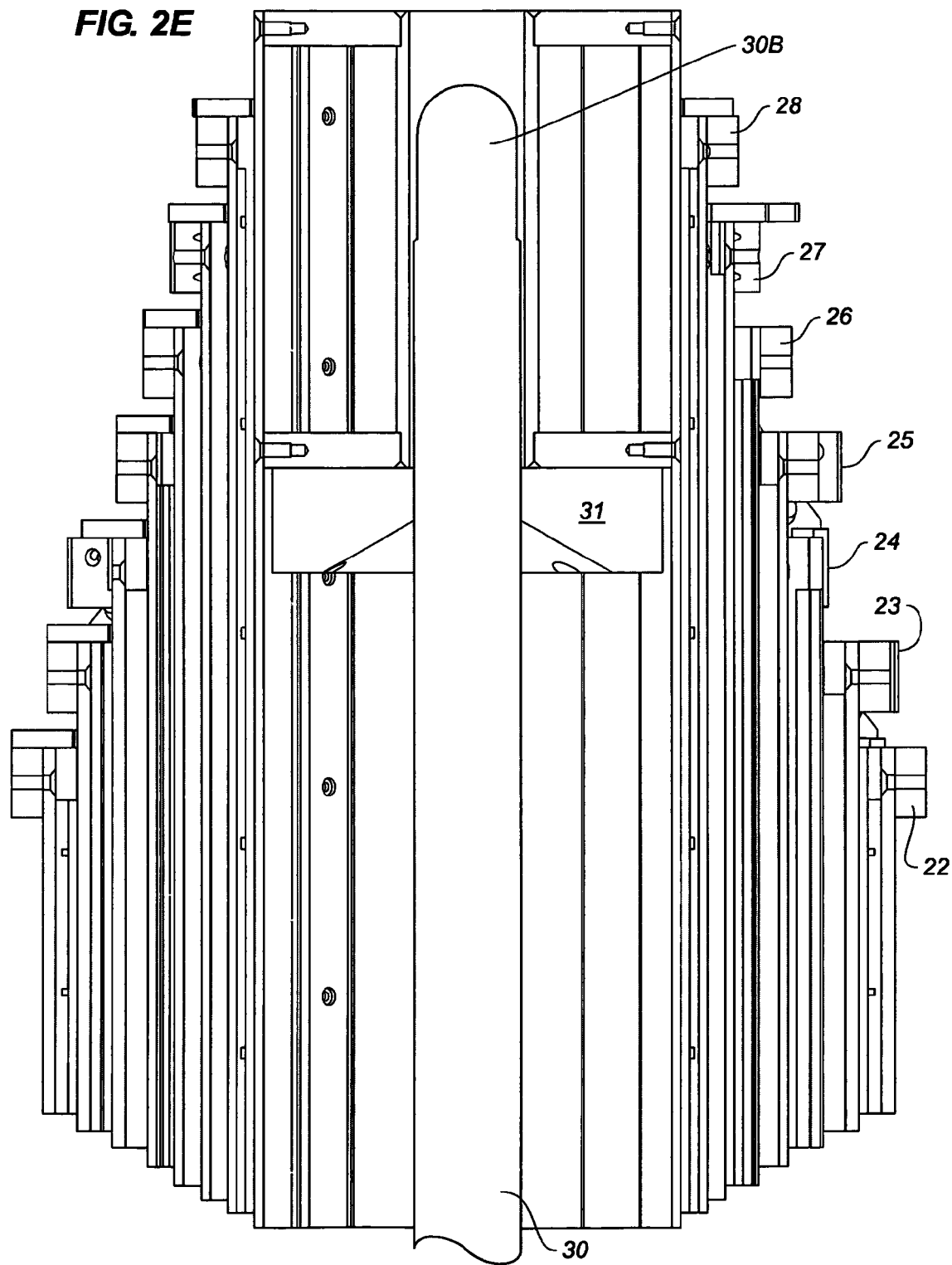

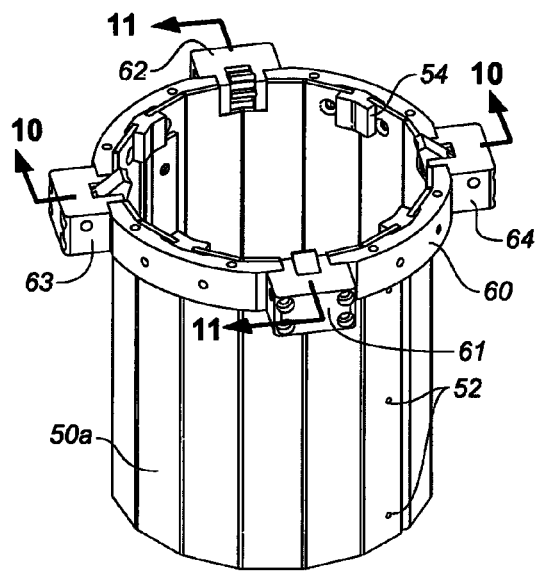
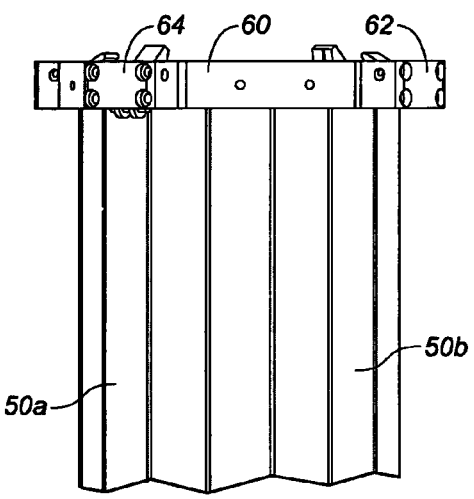
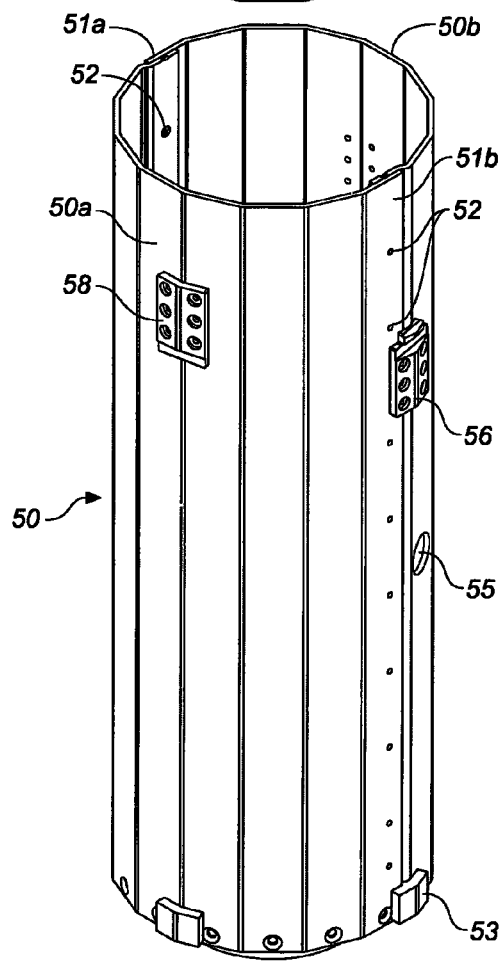
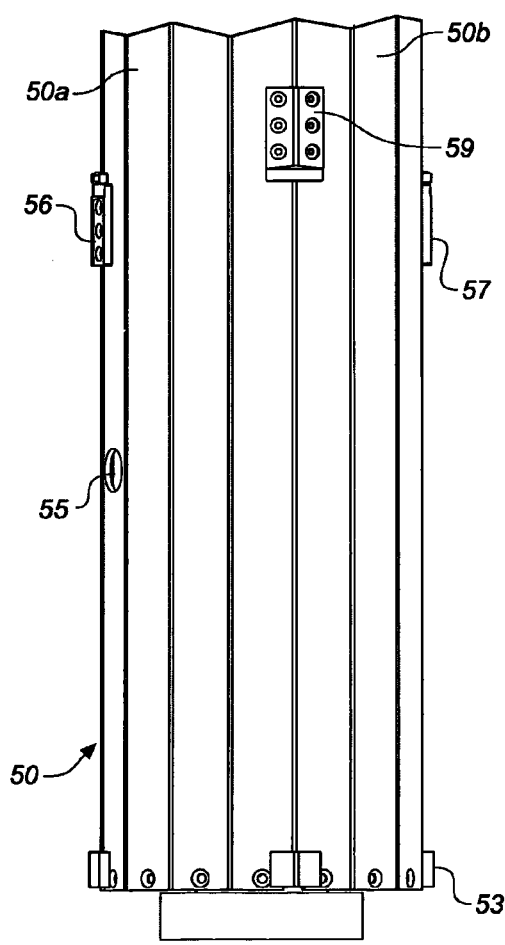
*FIG. 3A*      *FIG. 3B*

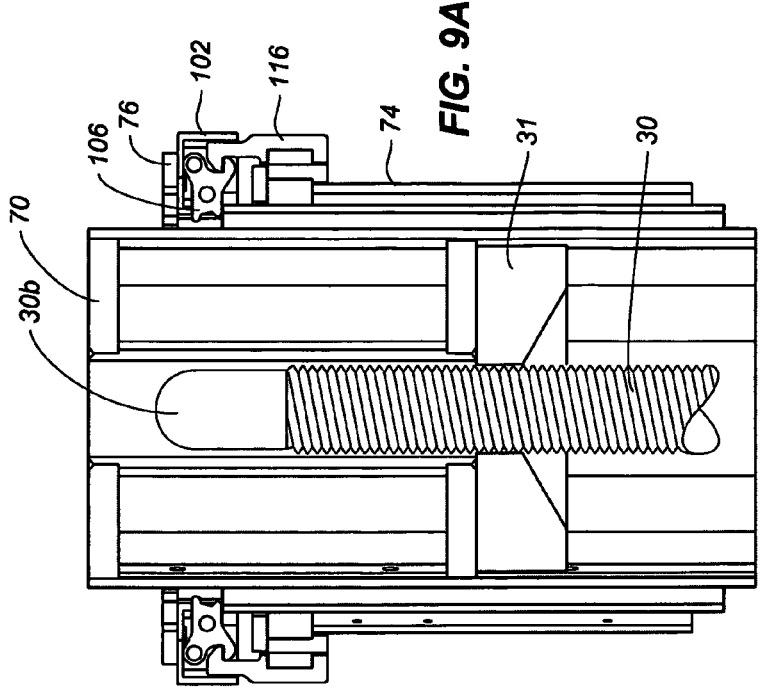
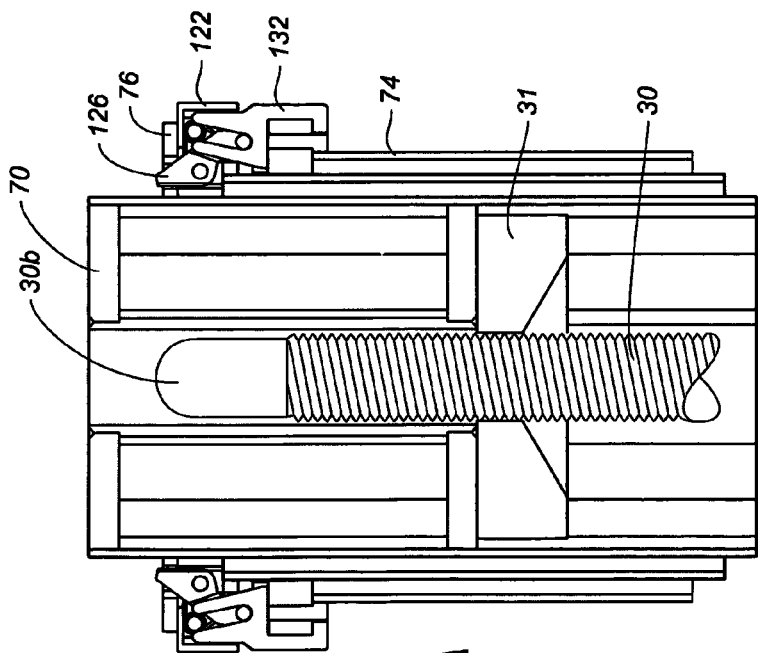

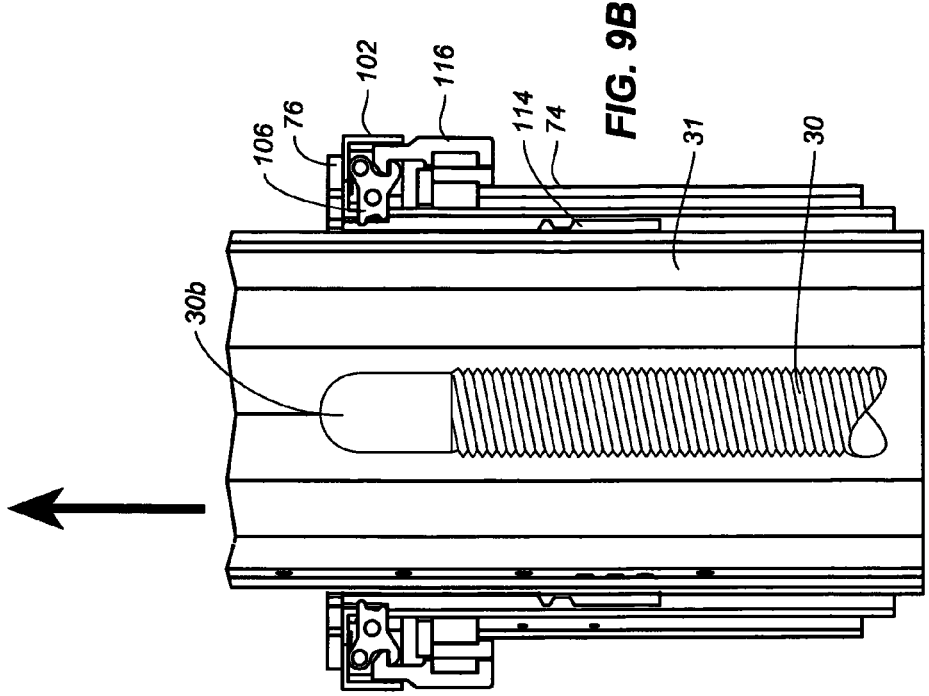
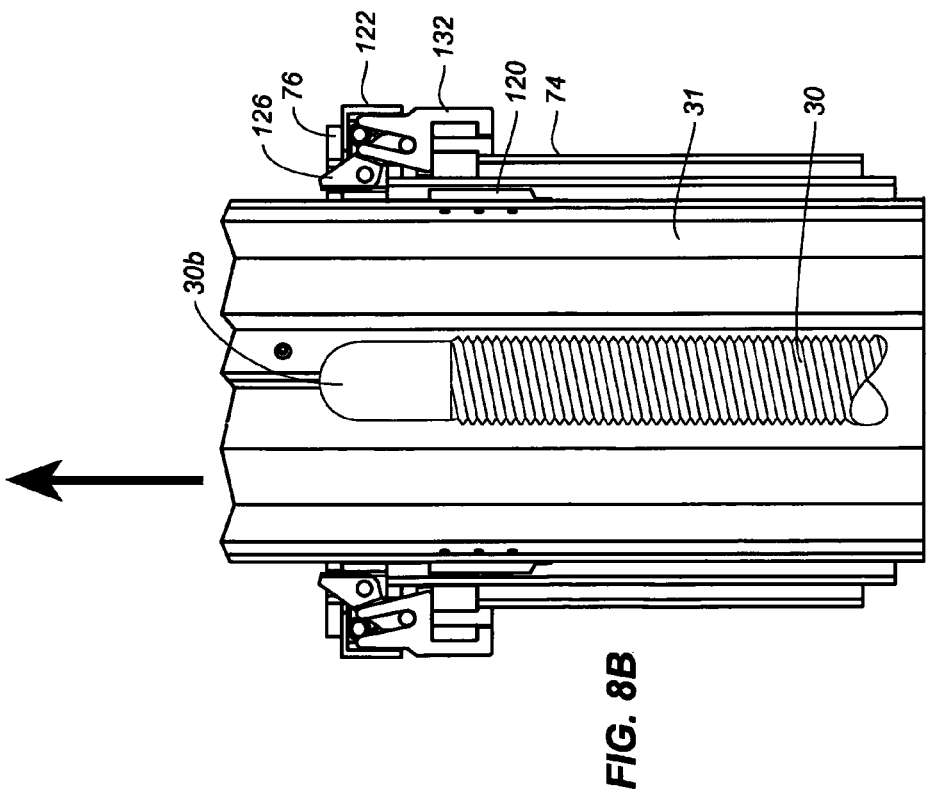

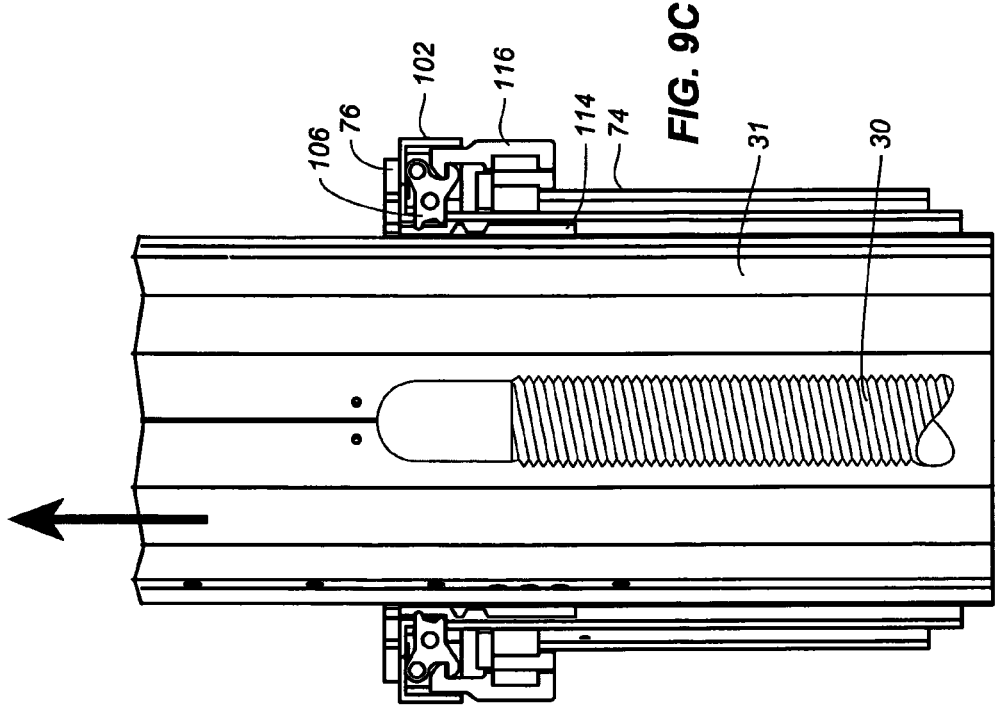
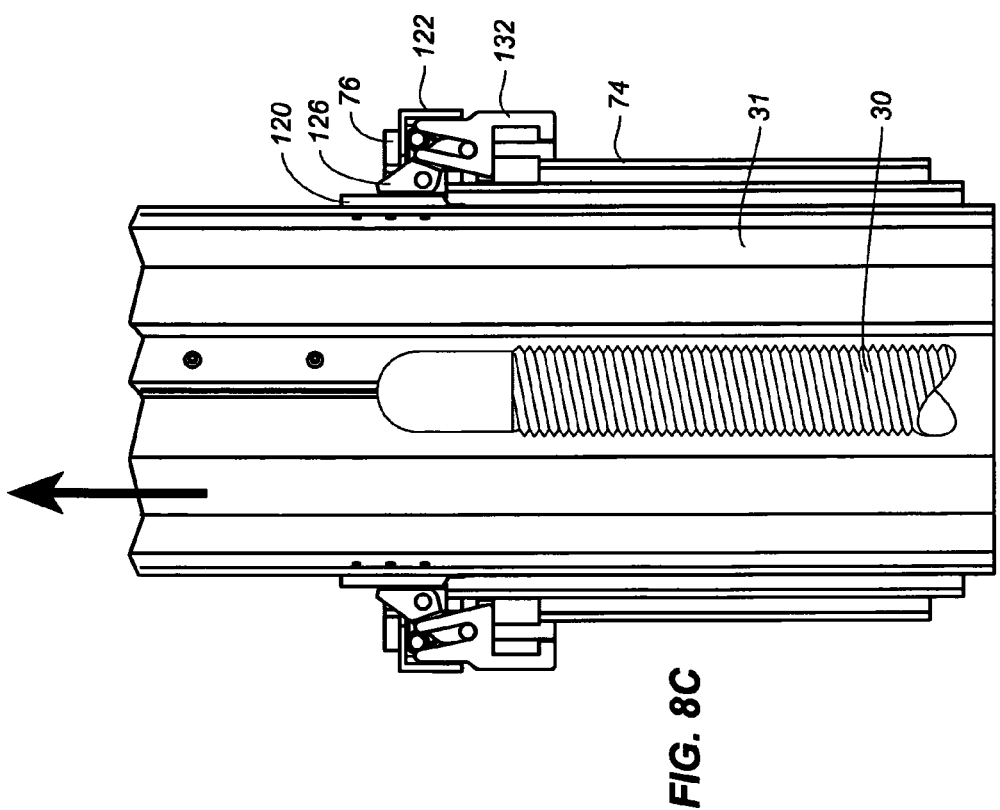

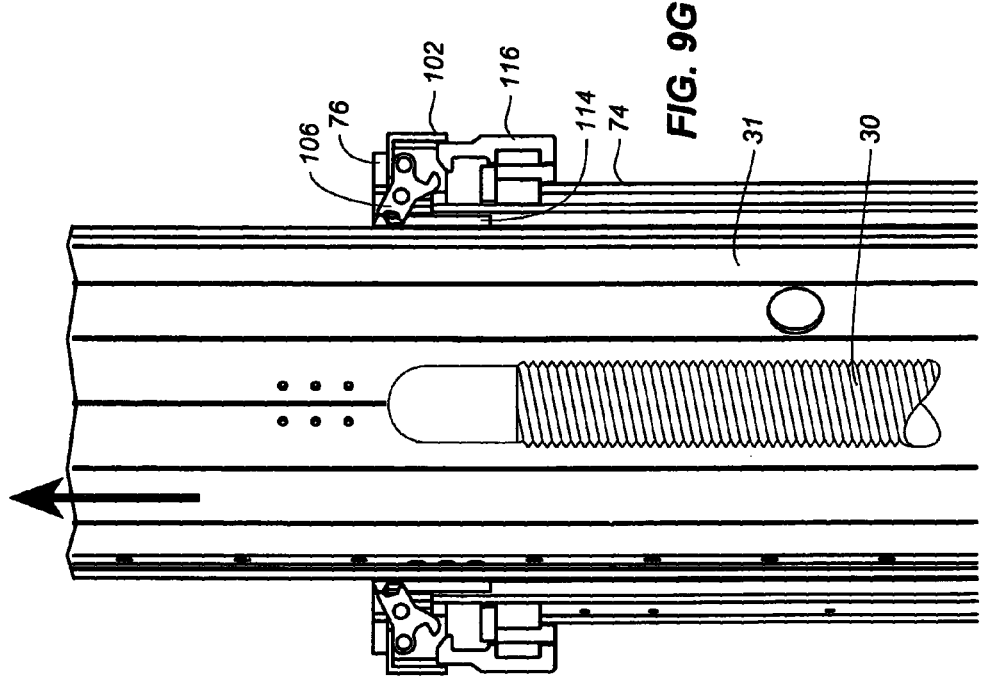
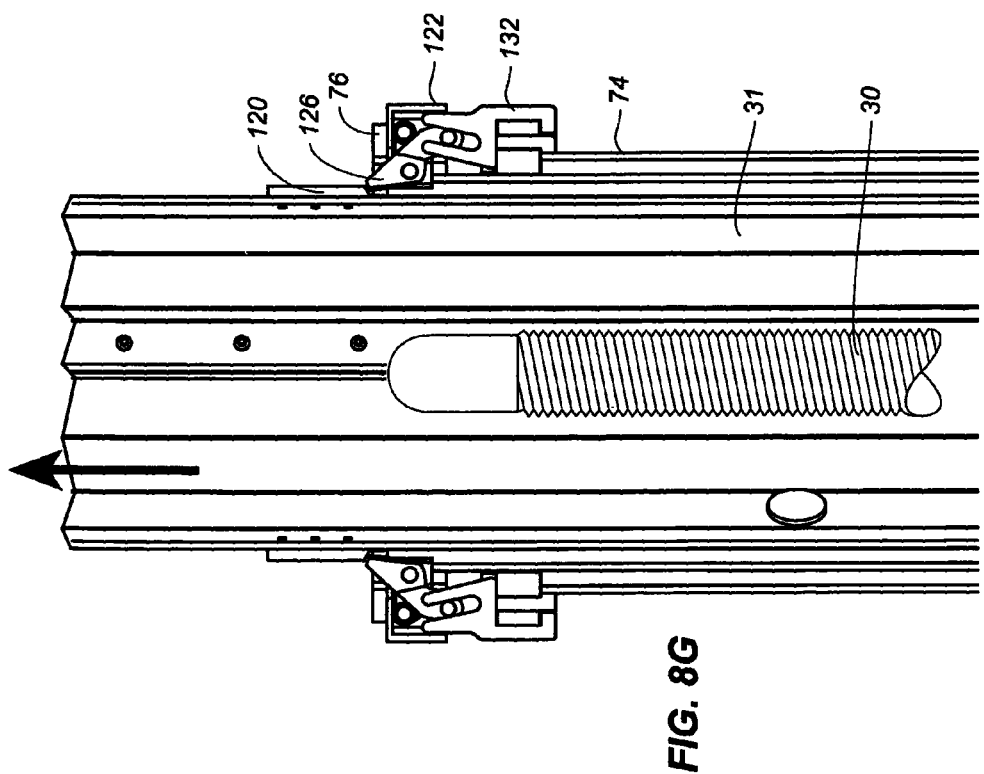

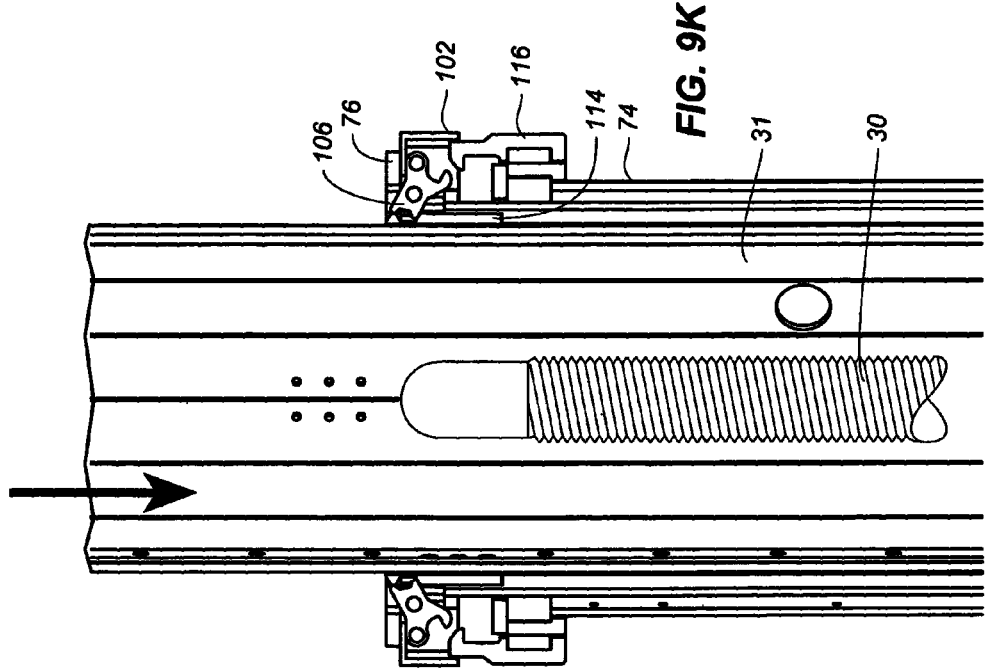
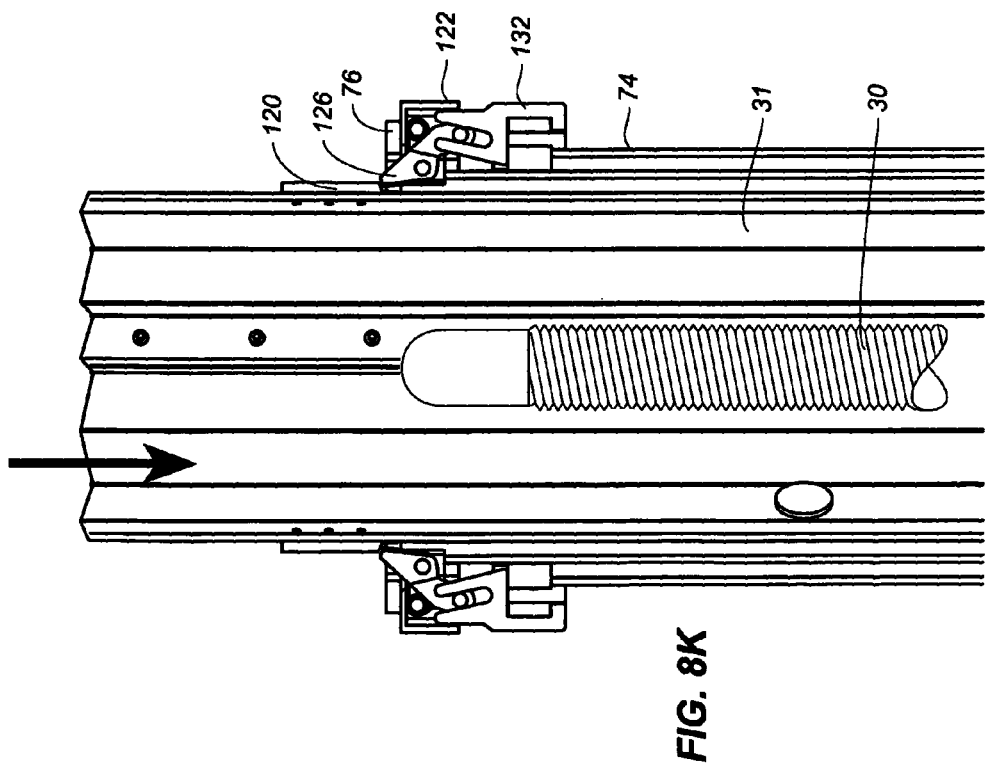

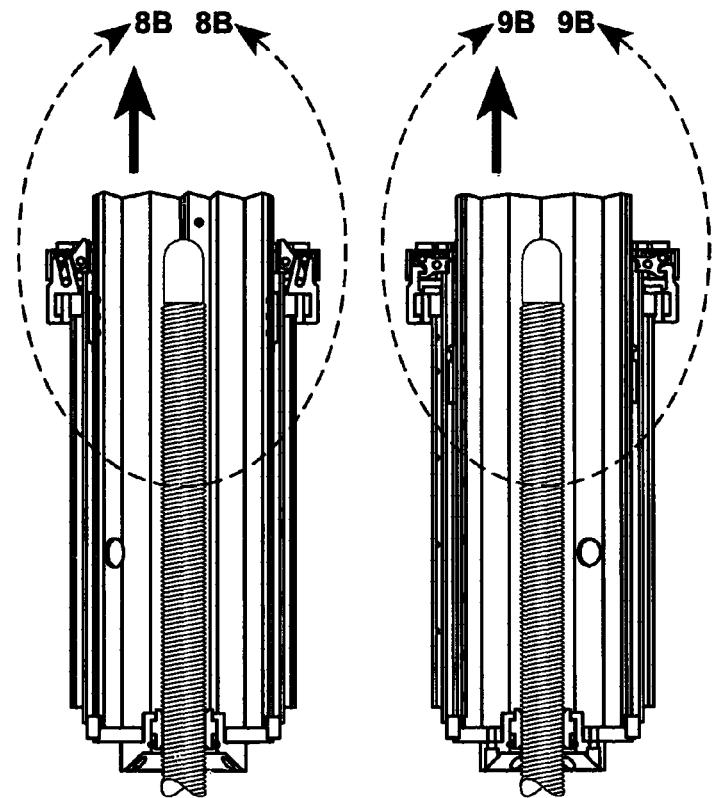
*FIG. 10B*                    *FIG. 11B*
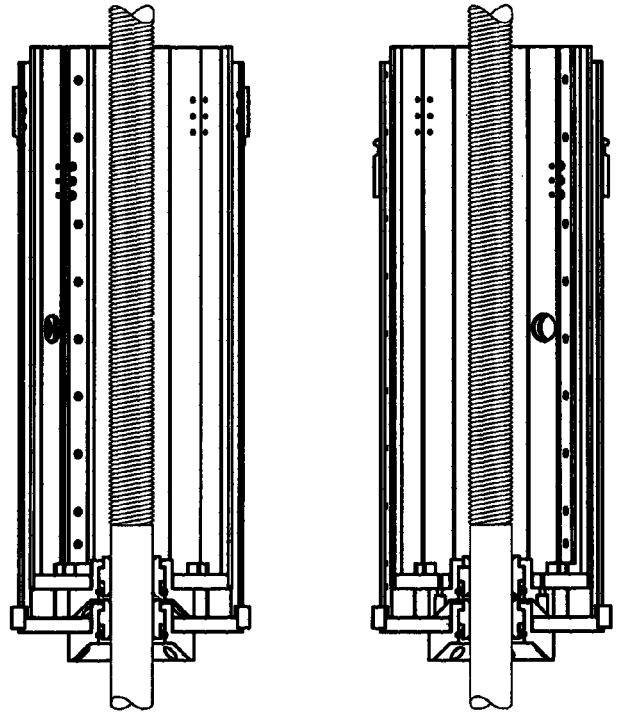

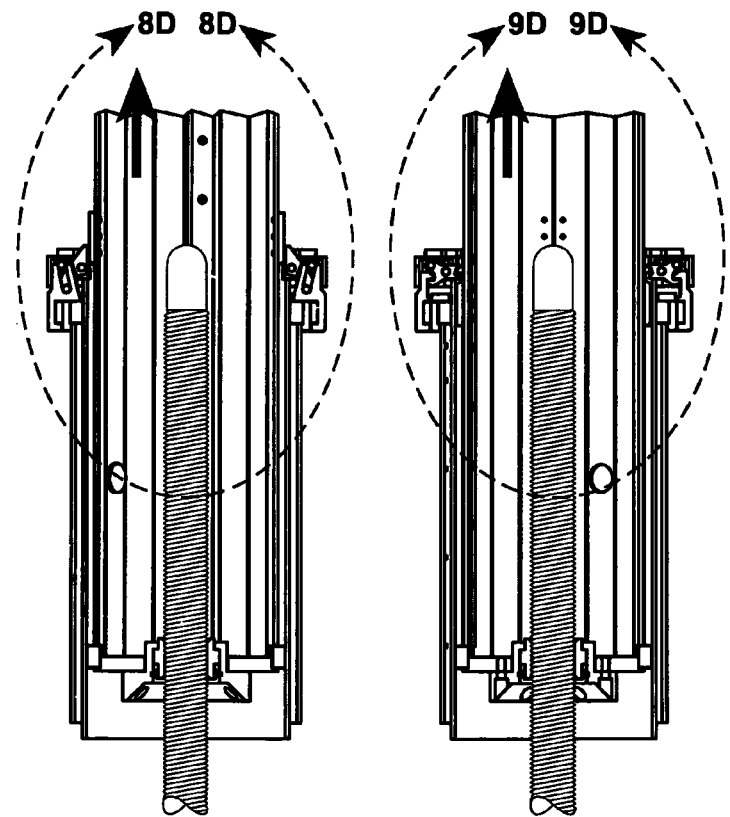
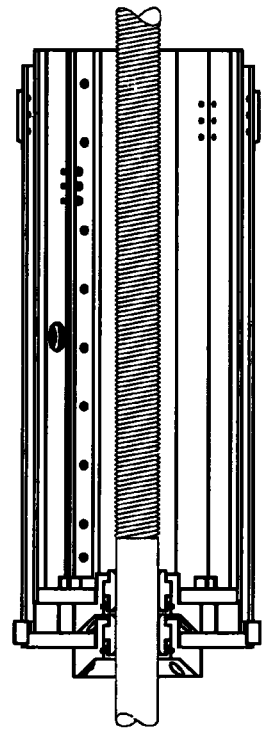
FIG. 10D
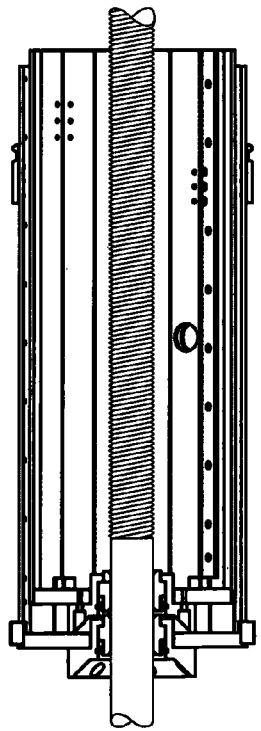
FIG. 11D

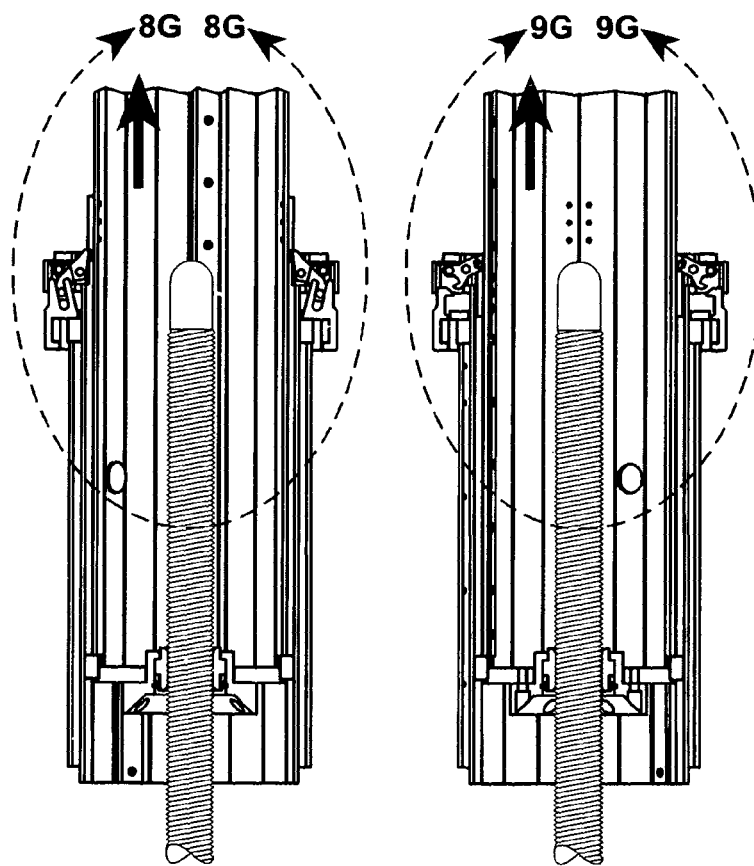
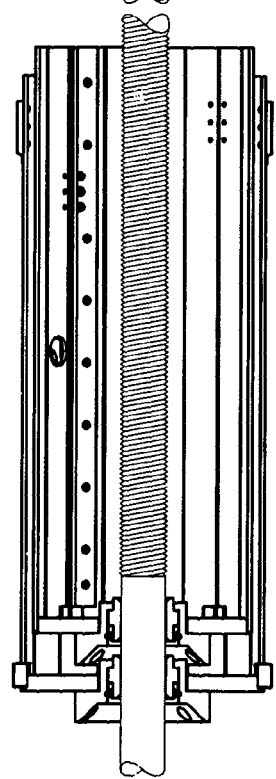
FIG. 10G
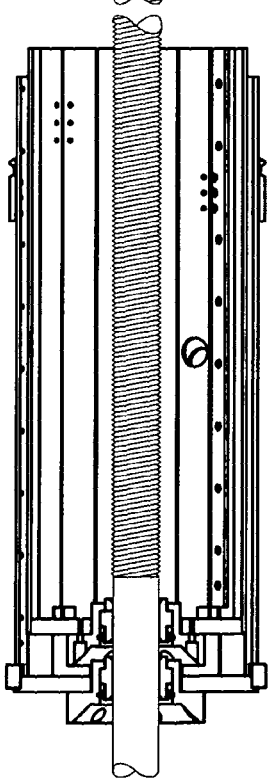
FIG. 11G

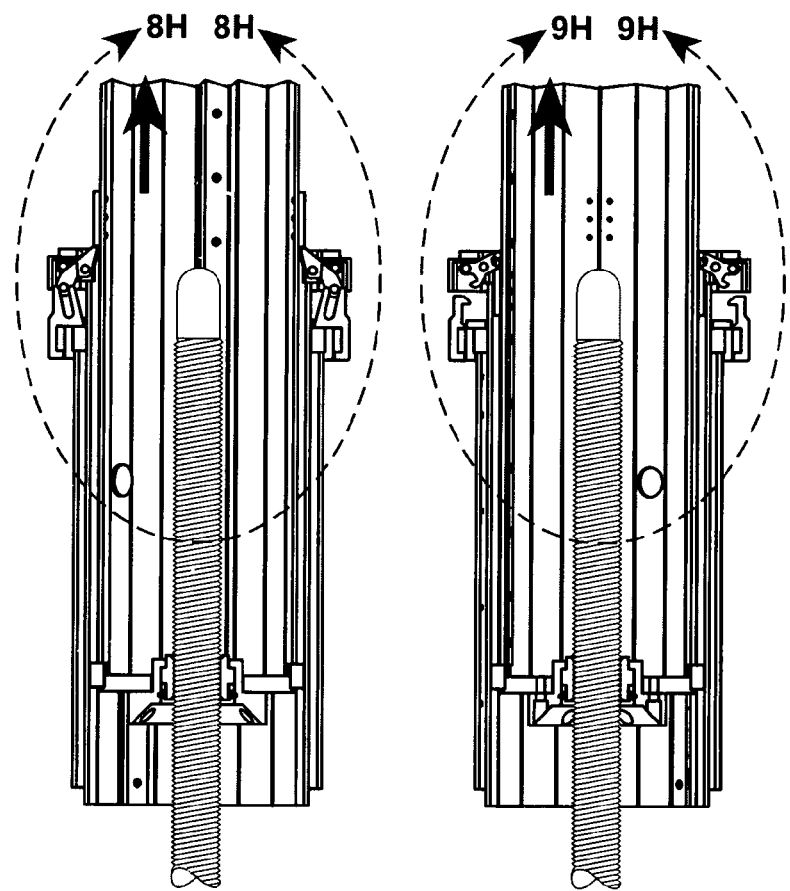
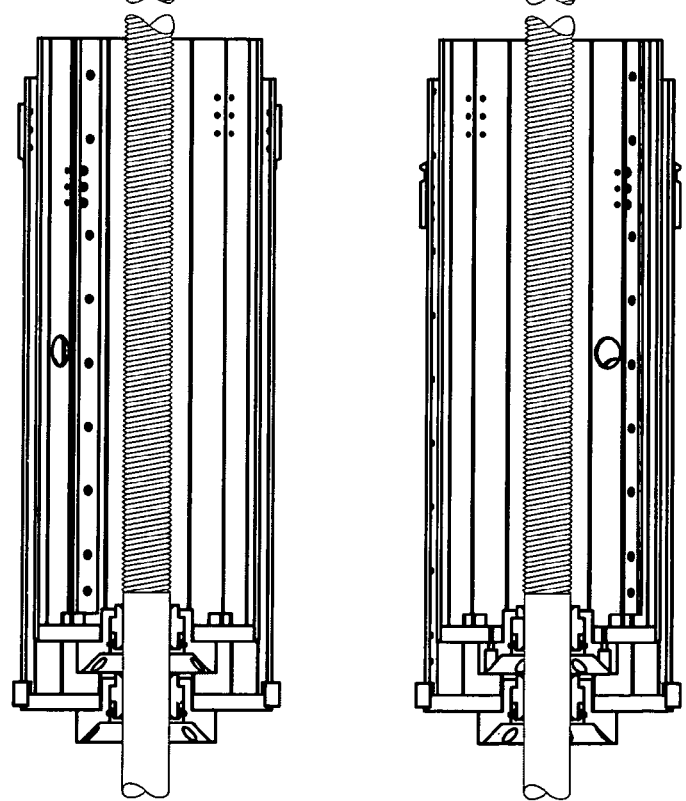
FIG. 10H
FIG. 11H

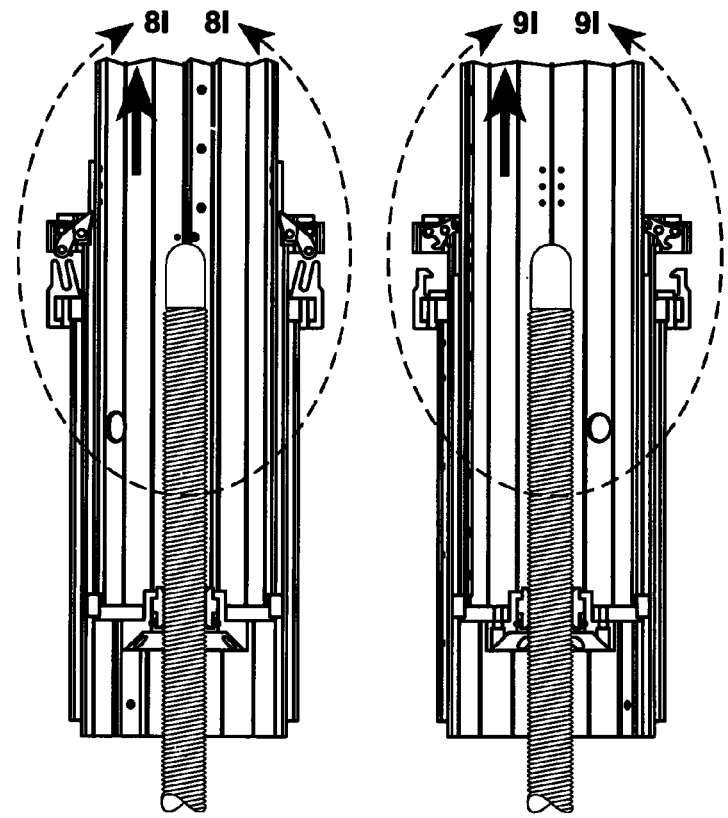
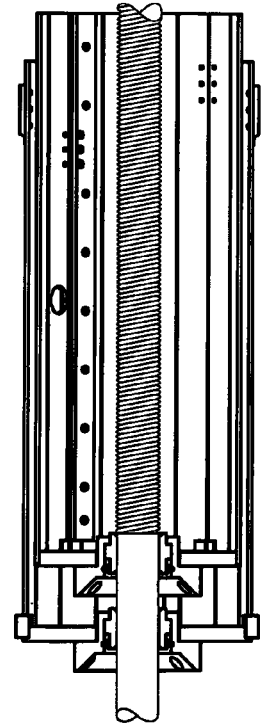
FIG. 10I
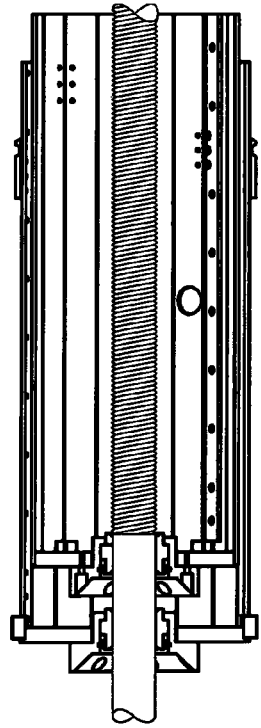
FIG. 11I

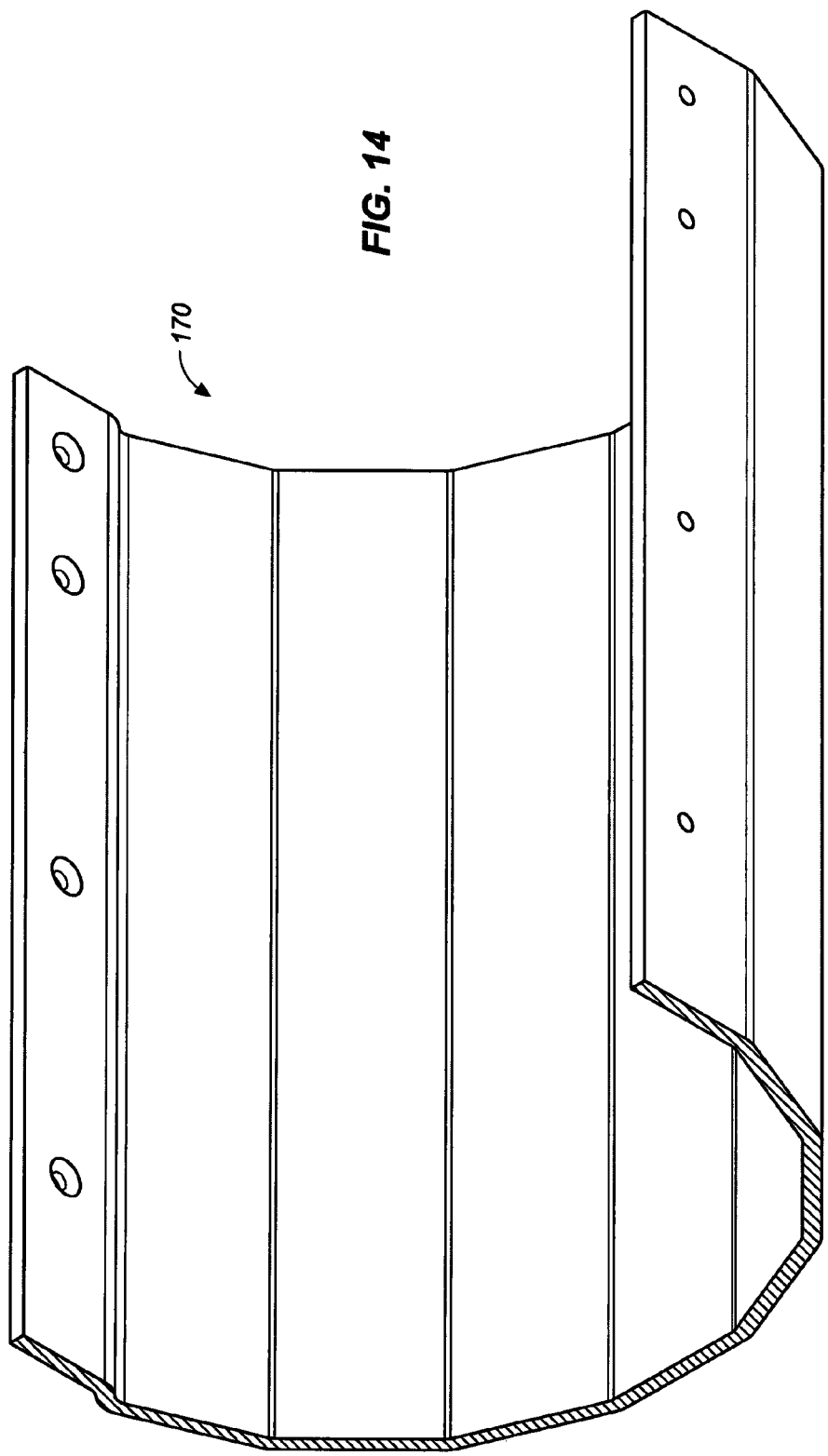

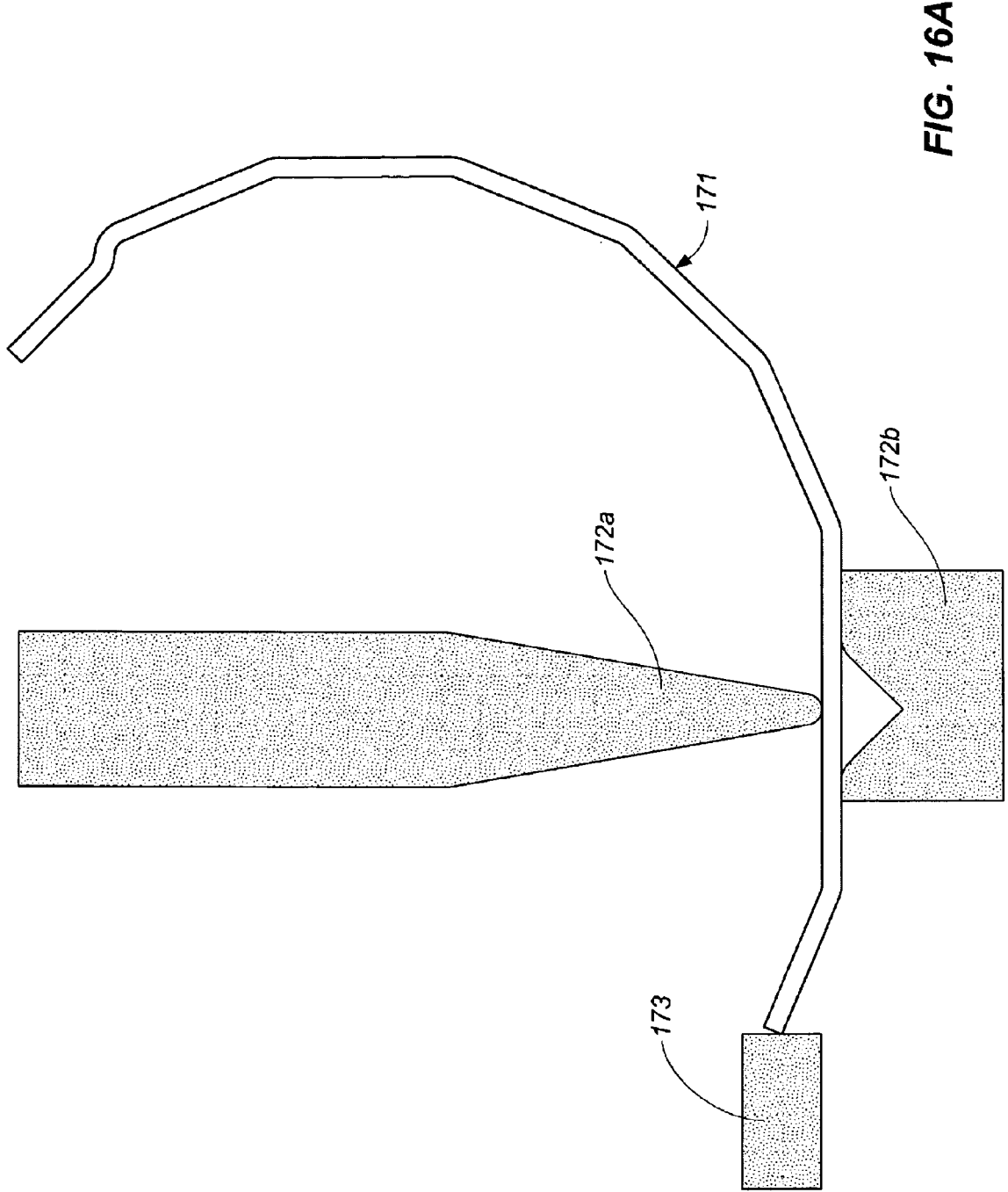

POLYGON MAST

CROSS-REFERENCE TO RELATED APPLICATIONS

This application claims the benefit of U.S. Provisional Patent Application No. 61/000,949 filed Oct. 29, 2007, which is hereby incorporated by reference in its entirety.

FIELD OF THE INVENTION

Aspects of the invention relate to telescoping mast assemblies (telescoping "towers"), polygonal sided masts for use in such assemblies, methods of fabricating polygonal sided masts, methods and apparatus for sequentially actuating and deactuating hold-down and locking mechanisms in telescoping towers, and such other aspects as will be understood from the present descriptions and drawings. Telescopic towers are usable for supporting and raising to a height any type of communications payload, including, for example, radio antennas, television antennas, any type of surveillance and/or sensor payloads, including, for example, microphones, cameras, flood lights, and the like.

BRIEF DESCRIPTION OF THE DRAWINGS

The figures are not to scale.

FIG. 2D is an enlarged side elevation cutaway view of a bottom portion of the telescopic tower shown in FIG. 2A.

FIG. 2E is an enlarged side elevation cutaway view of a top portion of the telescopic tower shown in FIG. 2A.

FIG. 3A is a perspective view of a telescoping interior tube that may be employed in a telescoping tower according to aspects of the present invention. The tube is shown with a portion removed or broken away to reduce space on the drawing. Sections shown in FIGS. 10 and 11 are taken along section lines 10-10 and 11-11.

FIG. 3B is a side elevation view of the broken-away tube of FIG. 3A.

FIGS. 10A-10K and companion FIGS. 11A-11K are also companions to FIGS. 8A-8K and 9A-9K (i.e., FIG. 10A is a companion of FIG. 1A and of FIGS. 8A and 9A, etc.) are cut-away side-elevation views of both the upper and lower portions of a tower showing the sequence of operation of the hold-down and locking mechanisms as three adjacent tubes in a tower embodying aspects of the present invention are extended and retracted. Each cut-away side-elevation view is at ninety degrees to its companion so that the respective companion views are cut through the locking mechanism elements (FIGS. 10A-K) and through the hold-down mechanism elements (FIGS. 11A-K).

FIG. 14 is a perspective view of a portion of a polygonal tube according to aspects of the invention, which tube is useful as a tube in a telescoping tower

FIG. 16A is a top plan view showing a way in which a polygonal tube portion may be formed from a flat rectangular sheet of metal.

DESCRIPTION OF THE INVENTION

Figure 1A:
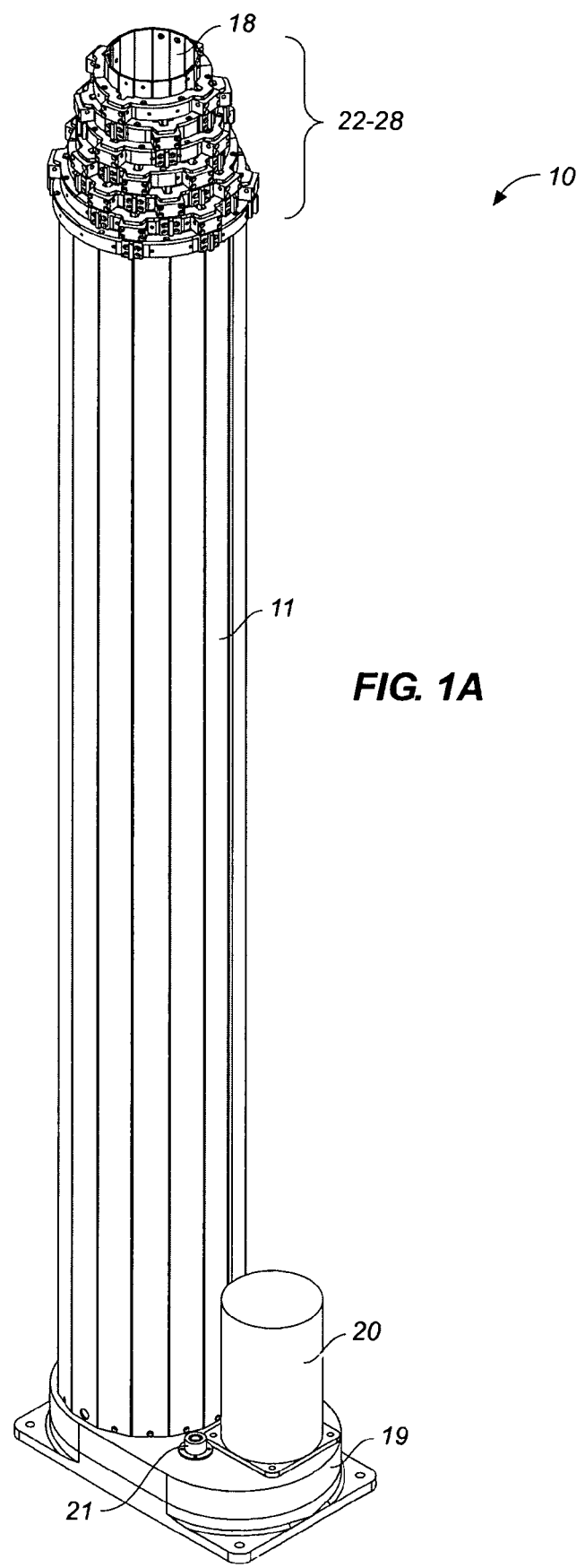
FIG. 1A is a perspective view of a telescoping tower embodying aspects of the present invention. The tower is shown in its fully-nested condition.
Figure 1B:
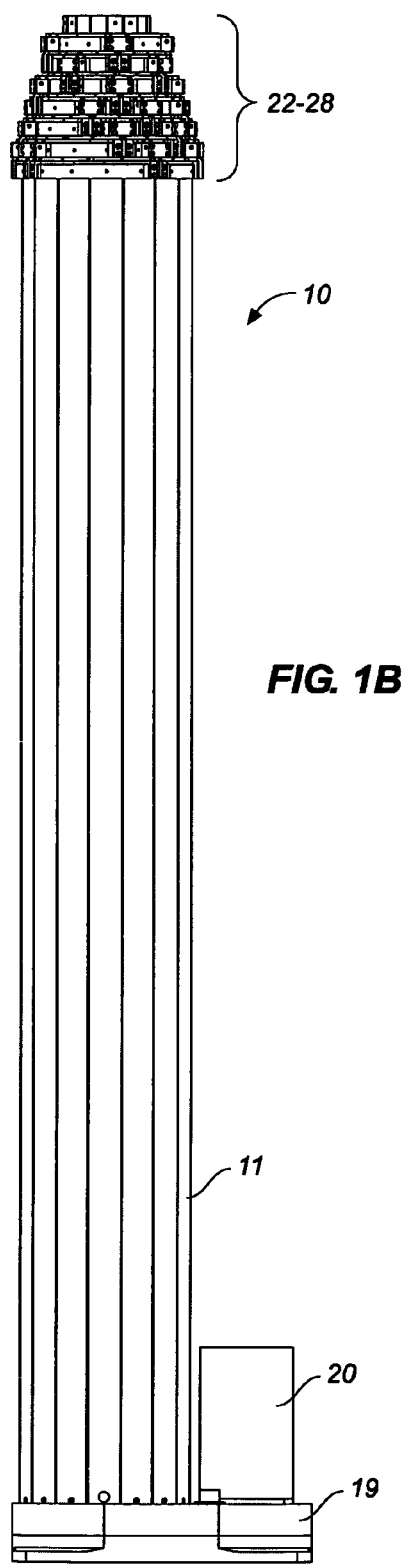
FIG. 1B is a side elevation view of a telescoping tower embodying aspects of the present invention. The tower is shown in its fully-nested condition.
Figure 1C:
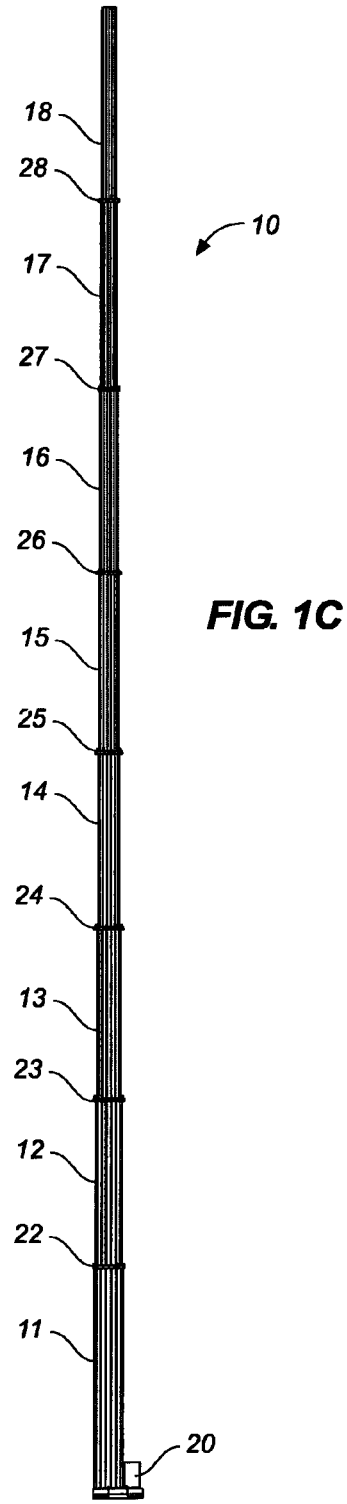
FIG. 1C is a side elevation view of a telescoping tower embodying aspects of the present invention. The tower is shown in its fully-extended condition.

Turning now to the drawings in which like reference characters identify the same elements in several views, FIGS. 1A, 1B and 1C show a telescoping mast assembly (telescoping "tower") 10 embodying various aspects of the present invention. In FIGS. 1A and 1B, the telescoping mast assembly 10 is shown in its fully "nested" condition—each of the multiple mast sections ("tubes") 11-18 of the assembly 10 is in its fully retracted position. In FIG. 1C, the telescoping mast assembly is shown in its fully extended position—each of the multiple mast sections 11-18 of the assembly 10 is fully extended. An axial drive screw mechanism (not seen in FIGS. 1A-1C) drives the extension and retraction of the tubes in a predetermined self-actuated sequence. The drive screw mechanism has a drive screw controllably rotated in either of two directions by a gear train (not shown in FIGS. 1A-1C) within a gear box 19, powered by a drive motor 20 or, alternatively, powered manually by a hand crank (not shown) that engages a hand crank receptacle 21. The gear box 19 also functions as a base for the telescoping mast assembly 10 that may be affixed to a fixed or movable support. Gear box 19 includes an anti-backdrive brake that facilitates stopping an extension of the tower sections at any point and that obviates the need to lock that last inner section to the outer section when the tower is raised to its maximum extension.

One aspect of the present invention is the use of cylindrical tubular mast sections having a polygonal cross section rather than a circular cross section. Although the various figures herein show such polygonal mast sections, it will be understood that certain aspects of the invention are not limited to mast sections having a polygonal cross section. Although a deca-hexagonal (16 sided) polygon cross section is employed in various examples herein because it closely approximates the wind characteristics of a circular cross section mast section, other sided polygons may be employed. Whether polygonal or circular in cross section, the tube sections are close fitting and progressively smaller in diameter. In practical implementations, the tubes may each have, for example, lengths in the order of five to twelve feet.

The top of each of all but the top one of the mast sections of FIGS. 1A-1C is shown encircled and capped by a respective annular assembly 22-28 that includes elements of mast section hold-down and mast section locking assemblies as are described in detail below. Hold-down assemblies prevent premature extension of mast sections. Lock assemblies positively lock the mast against retraction as each section is fully extended. The hold-down assemblies and lock assemblies according to aspects of the present invention are configured to cause a self-sequencing in which the hold-down and locking operations are performed separately and sequentially so as to assure proper extension and retraction of the mast sections.

Figure 2A:
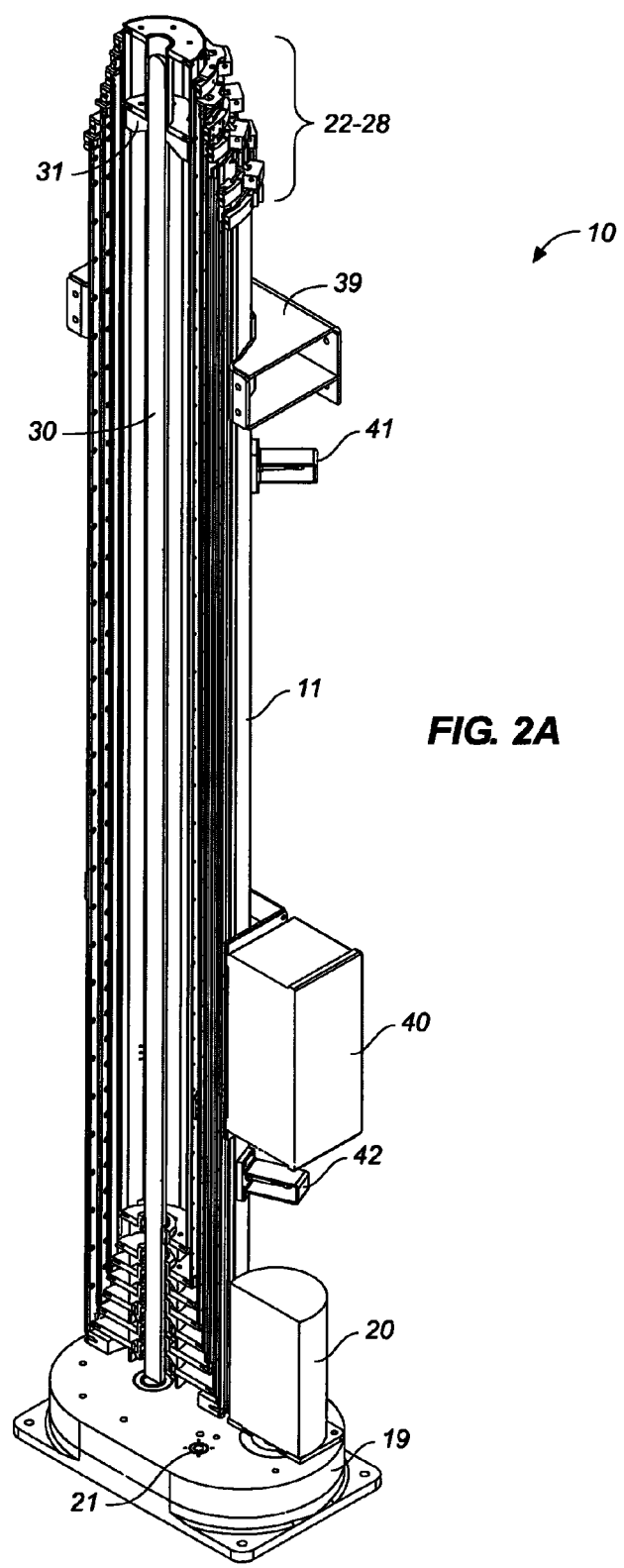
FIG. 2A is a perspective cutaway view of a telescoping tower embodying aspects of the present invention. The tower is shown in its fully-nested condition.

Refer now to a cutaway view of the nested mast sections as shown in FIG. 2A and enlarged details thereof in FIGS. 2B-2E. A drive screw 30 is shown extending upward from the gear box 19 through the nested mast sections to a point near the top of the innermost mast section. An annular support assembly 31 (best seen in FIGS. 2B and 2E) affixed to near the top of the innermost mast section provides support for the top of the drive screw, particular during shipment. Each of the inner mast sections has a respective drive nut assembly 32-38 (best seen in FIGS. 2C, 2D, and 12A-D).

The drive screw 30 is threaded along its length except at a bottom portion 30a (best seen in FIG. 2D—the slightly narrowed diameter of the drive screw) and a top portion (best seen in FIG. 2B—the slightly narrowed diameter of the drive screw) 30b. Threads are shown in FIGS. 8A-Q, 9A-Q, 10A-K and 11A-K. In the nested condition, only one drive nut assembly, that of the innermost mast section, is on the threads of the drive screw.

The drive screw may have a one inch lead with ten individual starts and may employ an acme thread. A nut going on or coming off the drive screws thus has ten possibilities for each rotation: ten within a tenth of an inch. There is a $^{100}/_{1000}{}^{th}$ inch linear travel from one lead to another. All of the nuts are spring loaded with an allowance of about $^{125}/_{1000}{}^{th}$ inch. The springs work in both an upward and downward direction. Nuts have a cone shape and the end of the top end of the drive screw has a semi-spherical end to facilitate a nut coming onto the drive screw.

FIG. 2A shows a bracket 39 for affixing the telescoping mast assembly 10 to a structure, such as a building. Also seen in FIG. 2A is an enclosure 40 for control circuitry for turning the drive motor on and off and for selecting the direction in which it rotates. FIG. 2A also shows an upper optical limit assembly 41 (best seen in FIG. 2D) for detecting full extension of the mast sections and a lower optical limit assembly 42 (best seen in FIG. 2C) for detecting full retraction of the mast sections. Each optical limit assembly includes a housing 41a (42a), a combination light source and sensor 41b (42b), a series of holes 41c through the seven outermost mast sections (not seen in the FIG. 2C view) and a mirror in the innermost mast section (not seen in the FIG. 2C view), aligned with the series of holes. When the mast sections are fully nested, optical limit assembly 41 detects the fully nested condition and provides a signal that is used to turn off the motor in order to stop the drive screw. Similarly, when the mast sections are fully extended, assembly optical limit assembly 42 detects the fully extended condition and provides a signal that is used to turn off the motor in order to stop the drive screw. Of course, the motor may be manually turned off at any time in order to place the telescoping mast assembly in a condition somewhere between fully nested and fully extended. Alternatively or in addition, automatic turn off of the motor may also be accomplished by counting revolutions of the drive screw. Fail safe mechanical stops may also be provided to provide a forced mechanical stop of extension or retraction in the event that the automatic sensing malfunctions.

Figure 2B:
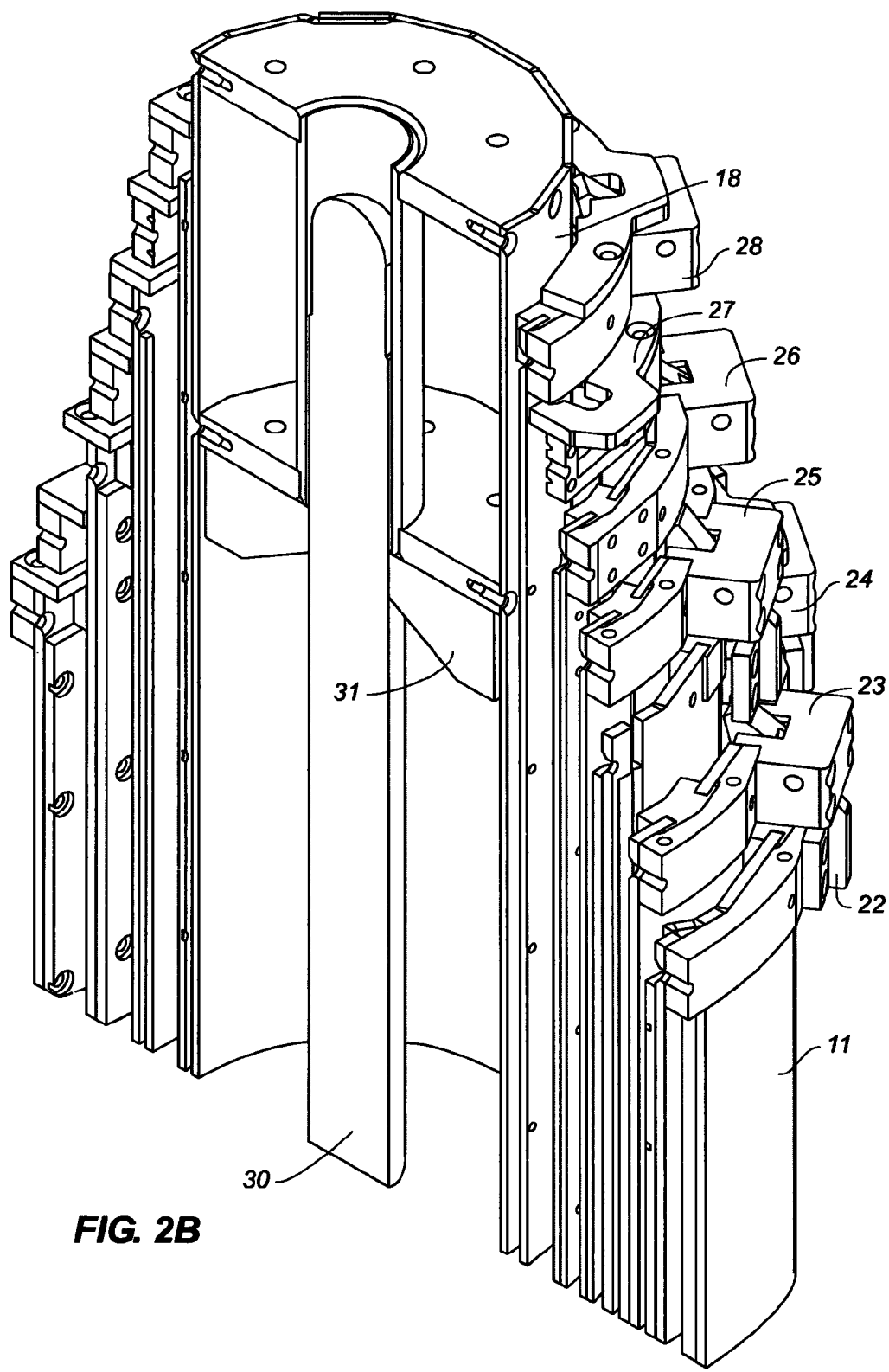
FIG. 2B is an enlarged perspective cutaway view of a top portion of the telescoping tower shown in FIG. 2A.
Figure 2C:
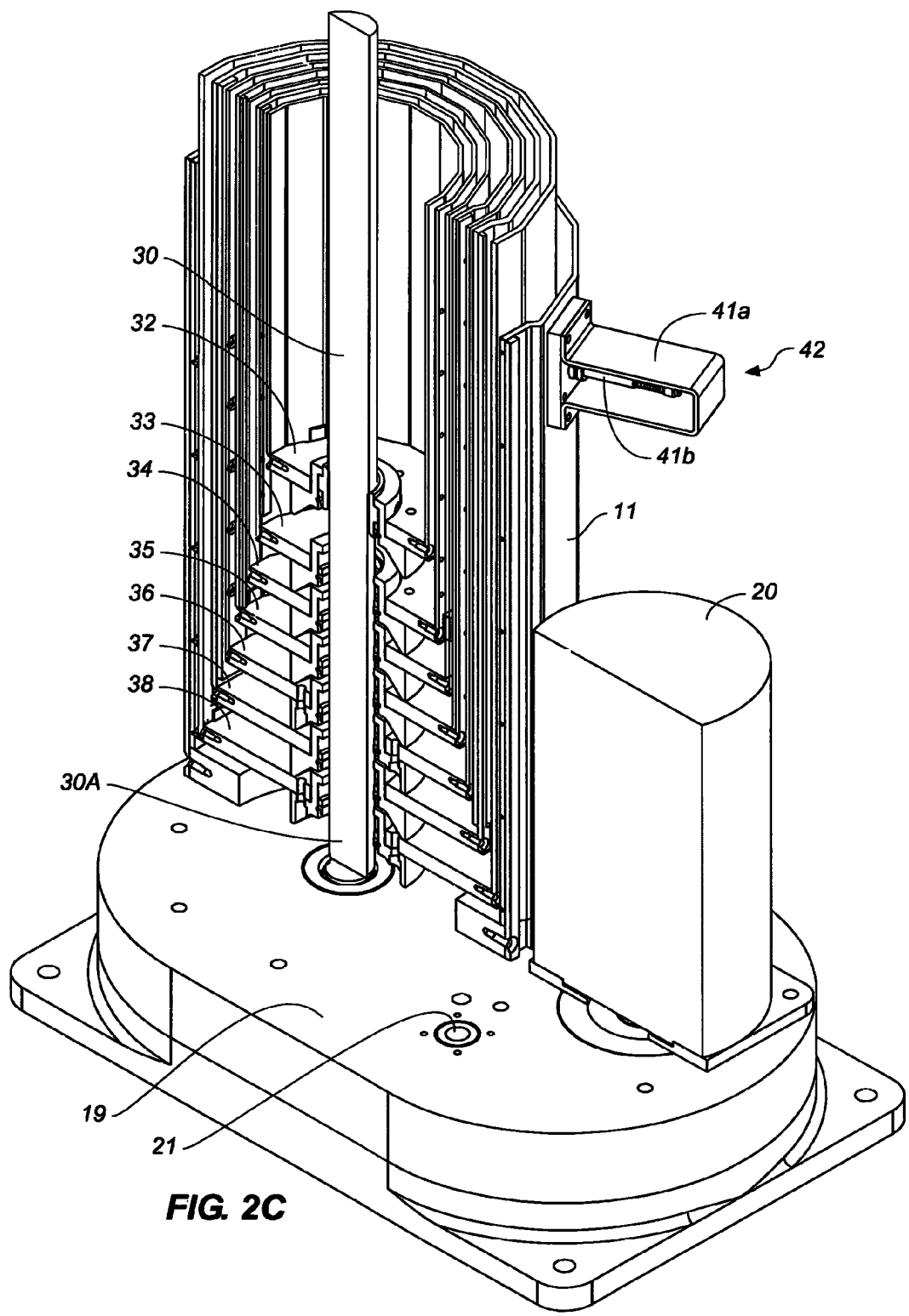
FIG. 2C is an enlarged perspective cutaway view of a bottom portion of the telescoping tower shown in FIG. 2A.

FIGS. 2B and 2E show the ring assemblies 22-28 in greater detail. The ring assemblies each include in their annular encircling portions elements of multiple hold-down assemblies and elements of multiple lock assemblies. In addition, each ring assembly includes an upper flange cap that caps the respective mast section. The various hold-down and lock assemblies and flange caps are staggered in their angular orientation in order to sequentially operate as is explained below. Details of the hold-down assemblies and locks and their operation as the telescopic mast assembly is extended and retracted are set forth below.

Although FIGS. 1A-C and 2A-E show eight mast sections, polygonal and circular cross-sectioned mast sections in accordance with aspects of the invention may, in principle, be used in telescopic mast assemblies with more than eight and as few as three mast sections. For simplicity in explanation, hold-down and locking mechanism aspects of the present invention will be described with examples employing three mast sections, it being understood that the same principles apply to telescopic mast assemblies employing more than three mast sections by applying the teachings to consecutive triads of mast sections.

FIGS. 3A-3D show an example of an intermediate (middle) mast section 50 of a mast section triad (the three masts may be all or some of the masts of a telescopic mast assembly). The mast section may be a generally-cylindrically-shaped polygon tube formed from two halves 50a and 50b fastened together at overlaps 51a and 51b with rivets 52 or some other suitable securing method. A deca-hexagon (16 sided) polygon mast is shown in this example. Low friction pads or slides 53 are shown around the bottom periphery for spacing the mast section 50 from the slightly larger mast section (not shown) in which it nests and extends and for facilitating the relative movement of those adjoining mast sections. Similarly, low friction pads or slides 54 are located around the inside of the top of mast section 50 for the same reasons with respect to the slightly smaller mast section (not shown) that nests and extends within mast section 50. A hole 55 for cooperating with an optical limit switch is provided in the wall of the mast section 50.

Figure 3C:
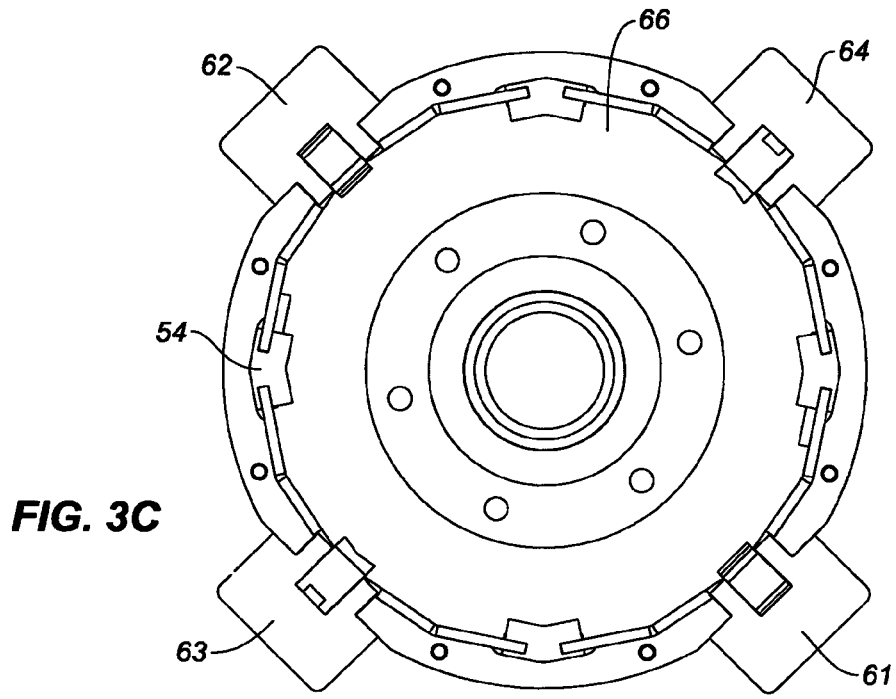
FIG. 3C is a top plan view of the tube of FIG. 3A.
Figure 3D:
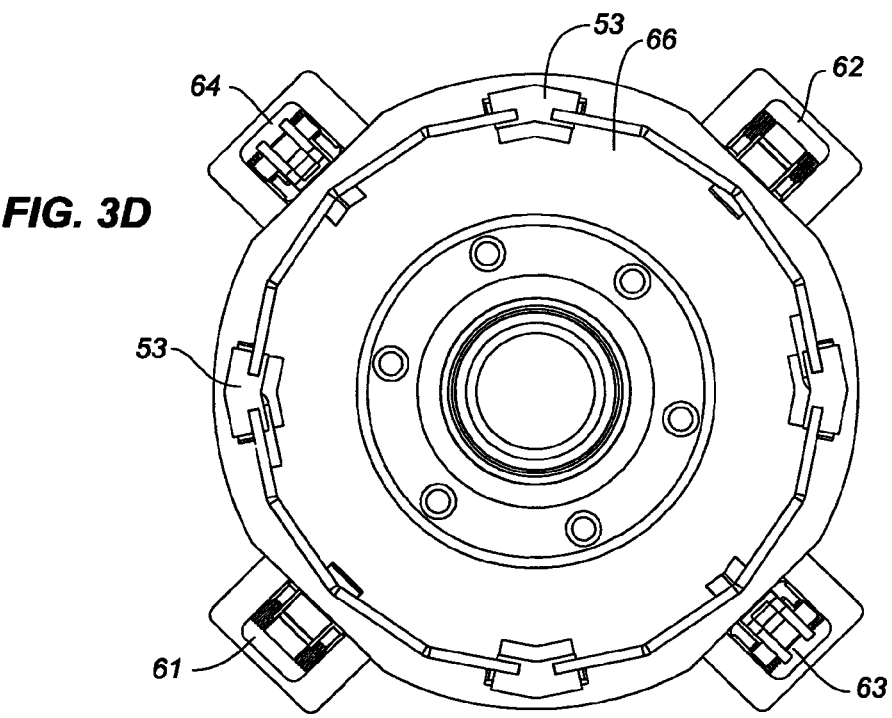
FIG. 3D is a bottom plan view of the tube of FIG. 3A.

Elements of two hold-down mechanisms and two lock mechanisms are shown in FIGS. 3A-3D. As will be explained below, each hold-down mechanism and each lock mechanism employs three main elements, each located on one of three consecutive mast sections (a triad of mast sections). The elements of a hold-down mechanism and a lock mechanism in accordance with aspects of the present invention will be described in greater detail below, as will their operation. Two hold-down actuator pads 56 and 57 are seen in FIGS. 3A and 3B. Each is secured to the outer wall of the mast section. Two lock actuator pads 58 and 59 are also affixed to the outer wall of the mast section 50. The mast section annular encircling portion of a ring assembly 60 at the top of mast section 50 holds a pair of hold-down housings 61 and 62, from each of which extends through a respective slot in the wall of the mast section 50 a portion of the hold-down housing from which a pivoting hold-down extends. The mast section annular encircling portion of ring assembly 60 also holds a pair of lock housings 63 and 64, from each of which extends through a respective slot in the wall of the mast section 50 a portion of the lock housing from which a pivoting lock extends.

Nut assemblies 66 of FIGS. 3A-3D are described below in connection with FIGS. 12A-D.

Depending on the number of mast sections in a telescopic mast assembly, each mast section may have two hold-downs and two locks or two hold-downs and four locks (four locks may be used, for example, for the lower mast sections that must support a higher load than higher, smaller mast sections). As in the example of FIGS. 3A-3D, locks and hold-downs should be spaced apart from each other and alternated to the extent possible, such as having the pairs of hold-downs and locks opposite each other and spaced by 90 degrees.

Figure 4:
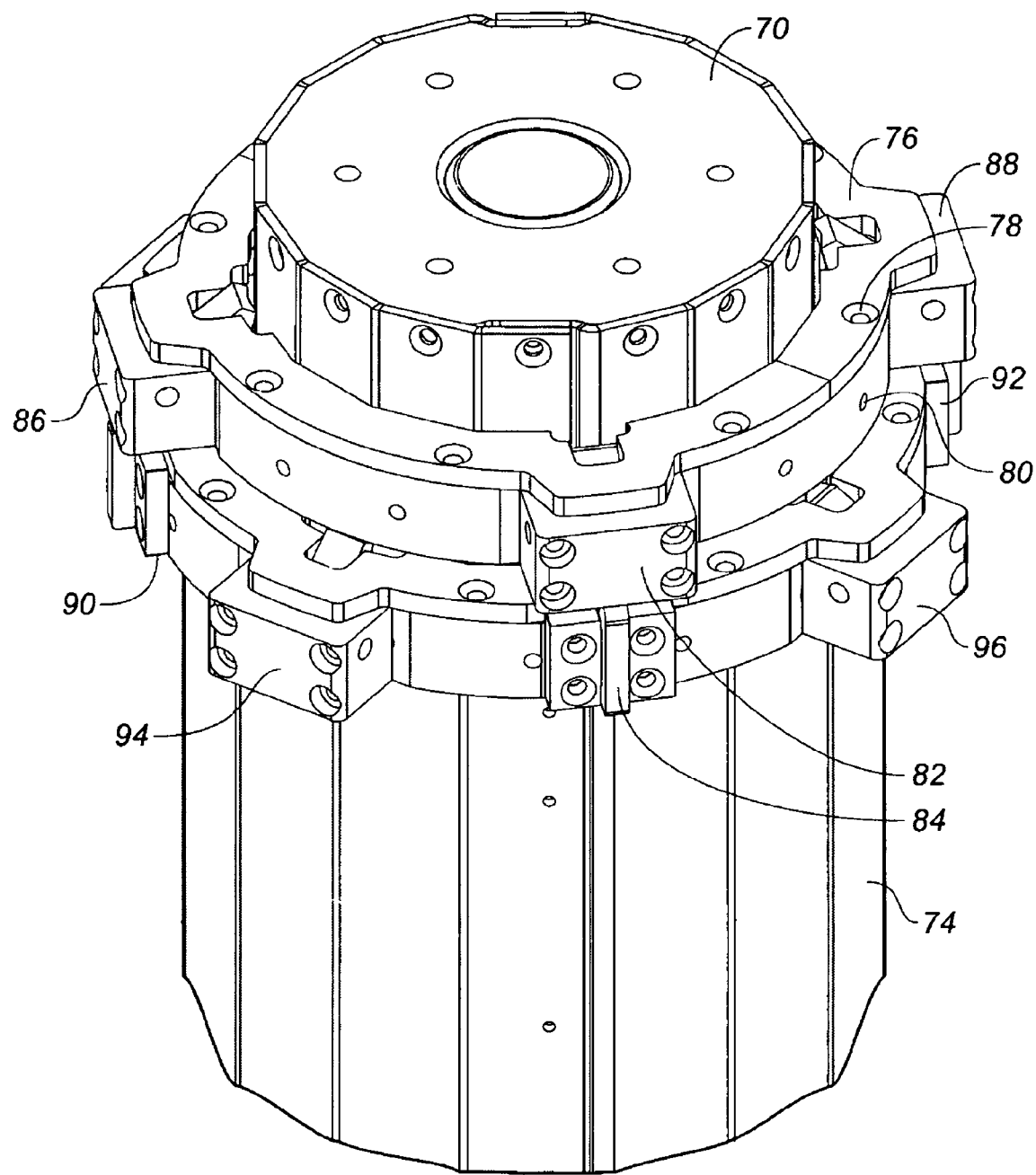
FIG. 4 is a perspective view of three nested tubes of a telescopic tower embodying aspects of the present invention. The three tubes may be the three innermost tubes of a telescoping tower such as shown in FIG. 1A.

FIG. 4 shows three consecutive mast sections (a triad) nested. In this example, an inner mast section 70 is shown nested within an intermediate mast section 72 which is, in turn, nested within an outer mast section 74. The main portion of intermediate mast 72 is hidden in this figure (see FIG. 5). The outer mast may be further nested within another mast section (not shown). Inner mast section 70 has no top ring assembly. However, the top ring assemblies of mast sections 72 and 74 are shown. The top ring assembly of intermediate mast section 72 has an upper flange cap 76 which is fastened, as by screws passing through screw holes 78, to the annular encircling portion of the top ring assembly, which is, in turn, fastened to the top portion of mast section 72 in a suitable way such as by rivets 80. The upper flange cap 76 has slotted tongues into each of which a lock may extend and into each of which an upper beak portion of a hold-down actuator pad may extend so that shoulders of the hold-down actuator pad engage the upper flange cap to cause the mast section to extend in order that the mast section picks up the drive shaft with its nut. This operation is explained further below. FIG. 4 also shows a hold-down housing 82 on mast section 72, a hold-down post 84 on mast section 74, lock housings 86 and 88 on mast section 72, lock posts 90 and 92 on mast section 74, a lock housing 94 and a hold-down housing 96 on mast section 74.

Figure 5:
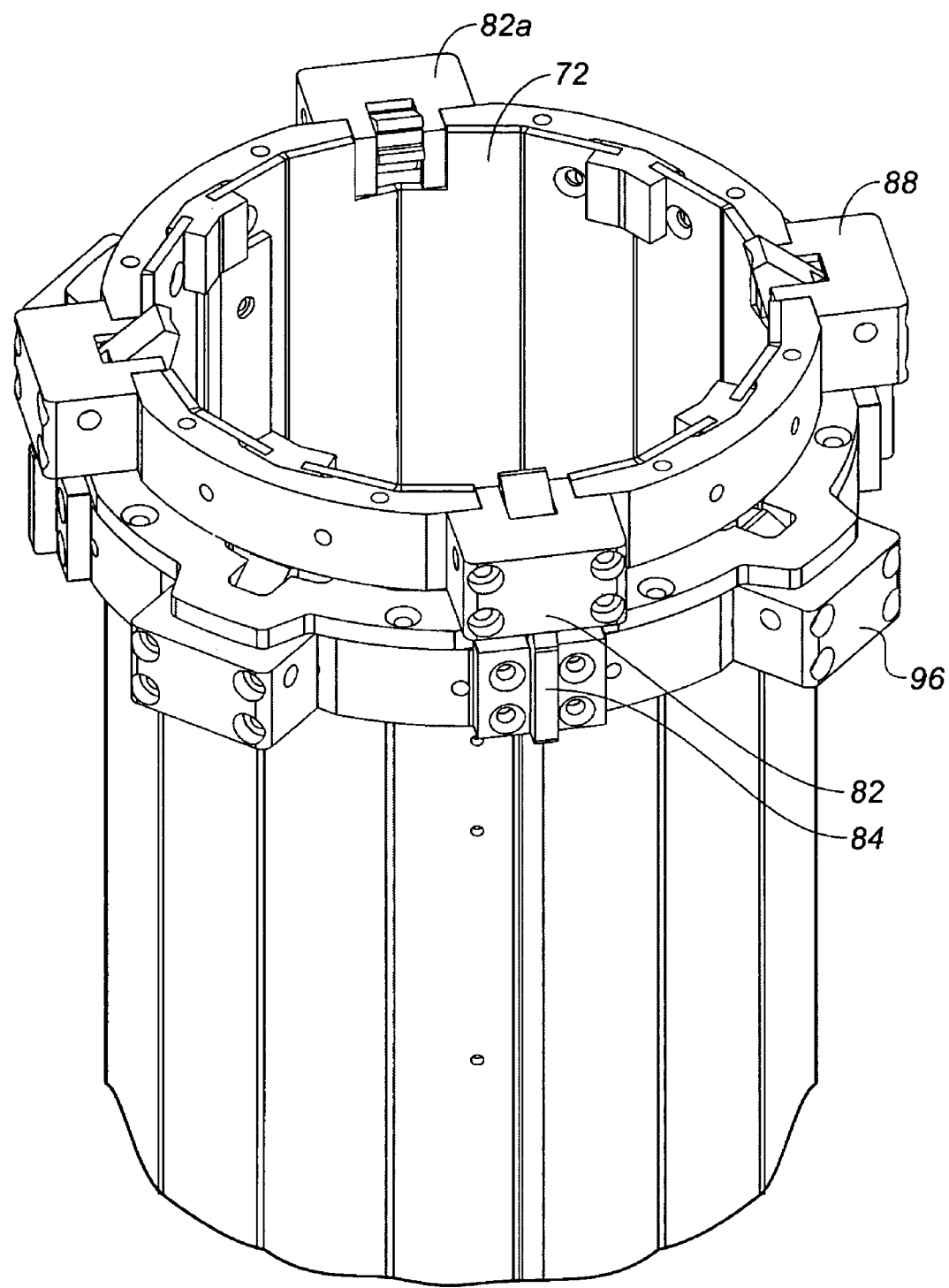
FIG. 5 is a perspective view of two nested tubes of a telescopic tower embodying aspects of the present invention. The three tubes may be the two outer tubes of the three tubes shown in FIG. 4.

FIG. 5 shows the outer two mast sections of the FIG. 4 depiction—the innermost mast section 70 is not present. The upper flange cap 76 is also not present. The view of FIG. 5 reveals the intermediate mast section 72 and a second hold-down housing 82a.

Figure 6A:
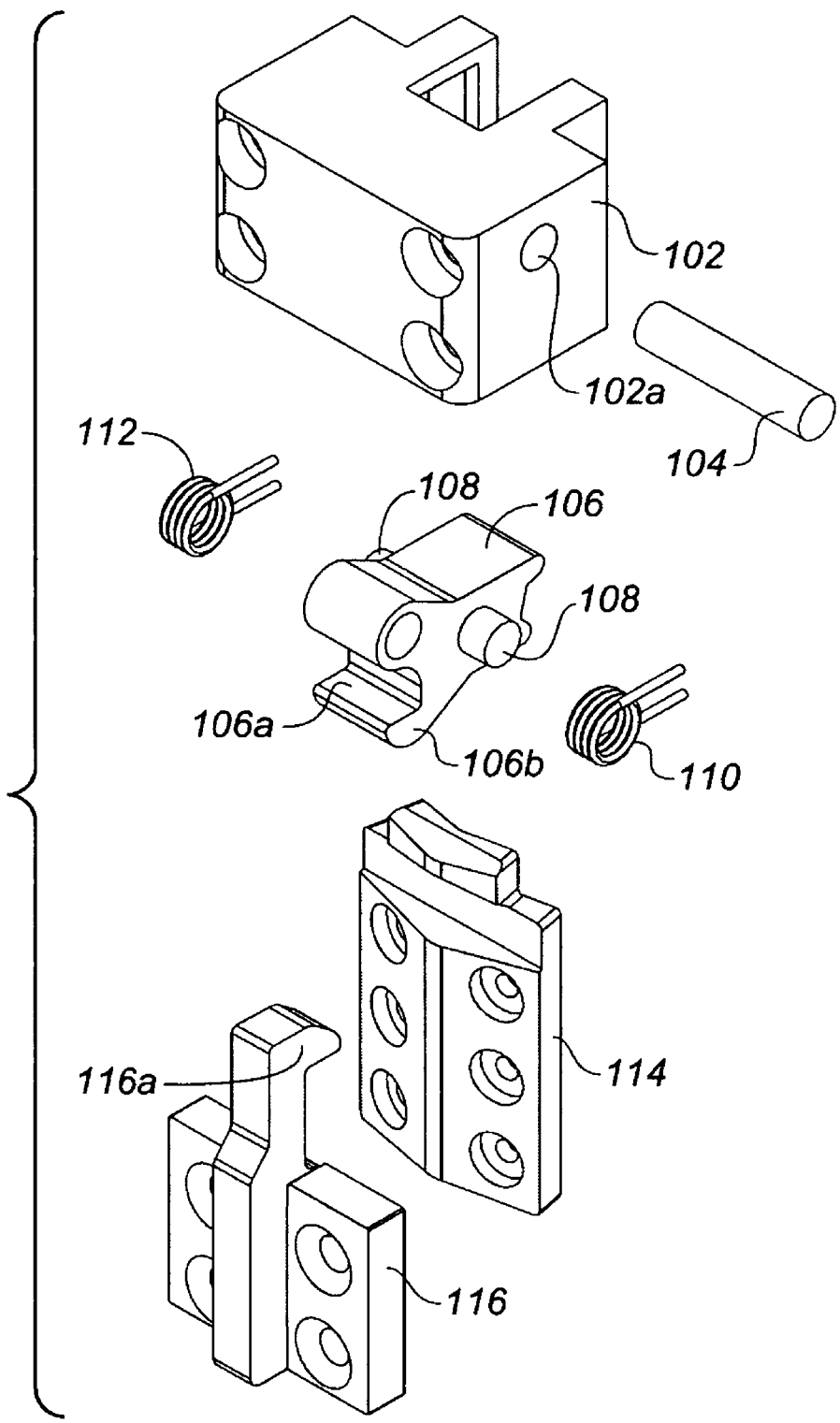
FIG. 6A is an exploded perspective view showing the elements of a hold-down mechanism aspect of the present invention.
Figure 6B:
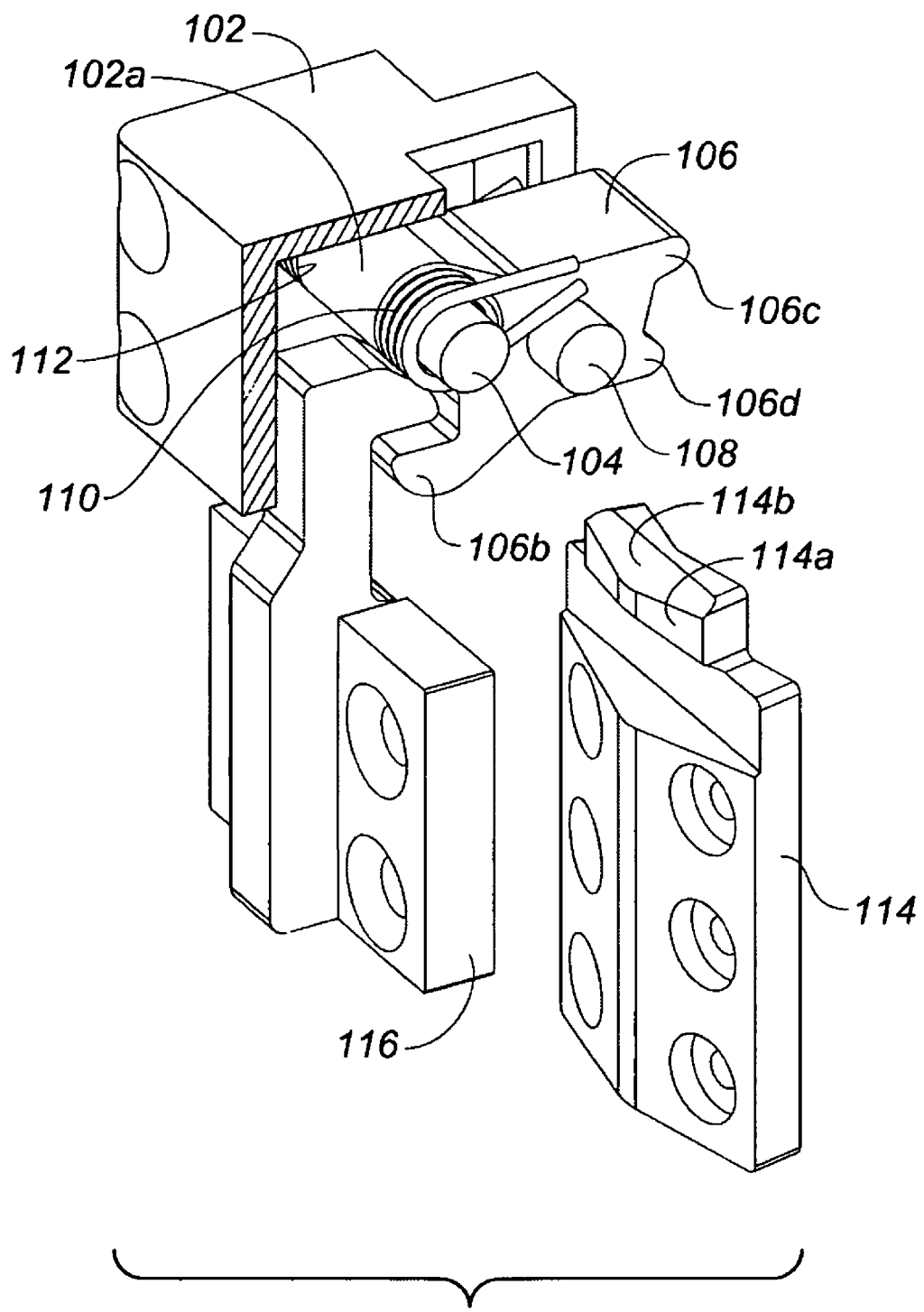
FIG. 6B is a perspective view showing the elements of the hold-down mechanism of FIG. 6A in an assembled and operating position. The tubes on which the elements are mounted are not shown in this view for clarity.

FIG. 6A shows the elements of a hold-down assembly in accordance with aspects of the present invention. The hold-down assembly includes a hold-down housing 102, a pin 104 that functions as a spring rest, a hold-down 106 that is rotatably held within housing 102 and which rotates on the axis of its pin 108, first and second springs 110 and 112, a hold-down actuator pad 114 and a hold-down post 116. FIG. 6B shows the hold-down assembly elements in an operating position. Pin 104 passes through a hole 106a in the hold-down 106 and the holes 102a in the hold-down housing 102, allowing the hold-down to rotate along the axis of pin 104. Springs 110 and 112, working against spring rest pin 108, urge the hold-down into its engaged position as shown in FIG. 6B. Hold-down 106 has an extending hook portion 106b that engages a mating hook 116a extending from the hold-down post 116. The hold-down actuator pad has an upward extending "beak" or lip portion 114a having a beveled top portion 114b. When the hold-down actuator pad 114 moves upward with respect to the hold-down 106, its upper beak or lip engages the upper lip 106c of the hold-down 106, causing it to rotate clockwise and disengage the mating hooks 106b and 116a. The lower lip 106d of the hold-down is engaged by the beak or lip portion 114a of the hold-down actuator pad when it moves downward with respect to the hold-down. With respect to three consecutive mast sections, the hold-down actuator pad 114 is carried by the innermost mast section, the hold-down housing 102 (carrying the hold-down 106) by the intermediate mast section, and the hold-down post 116 by the outer mast section. In the hold-down engaged condition shown in FIG. 6B, the intermediate mast section cannot be extended with respect to the outer mast section. The operation of the hold-down assembly is explained in further detail below.

Figure 7A:
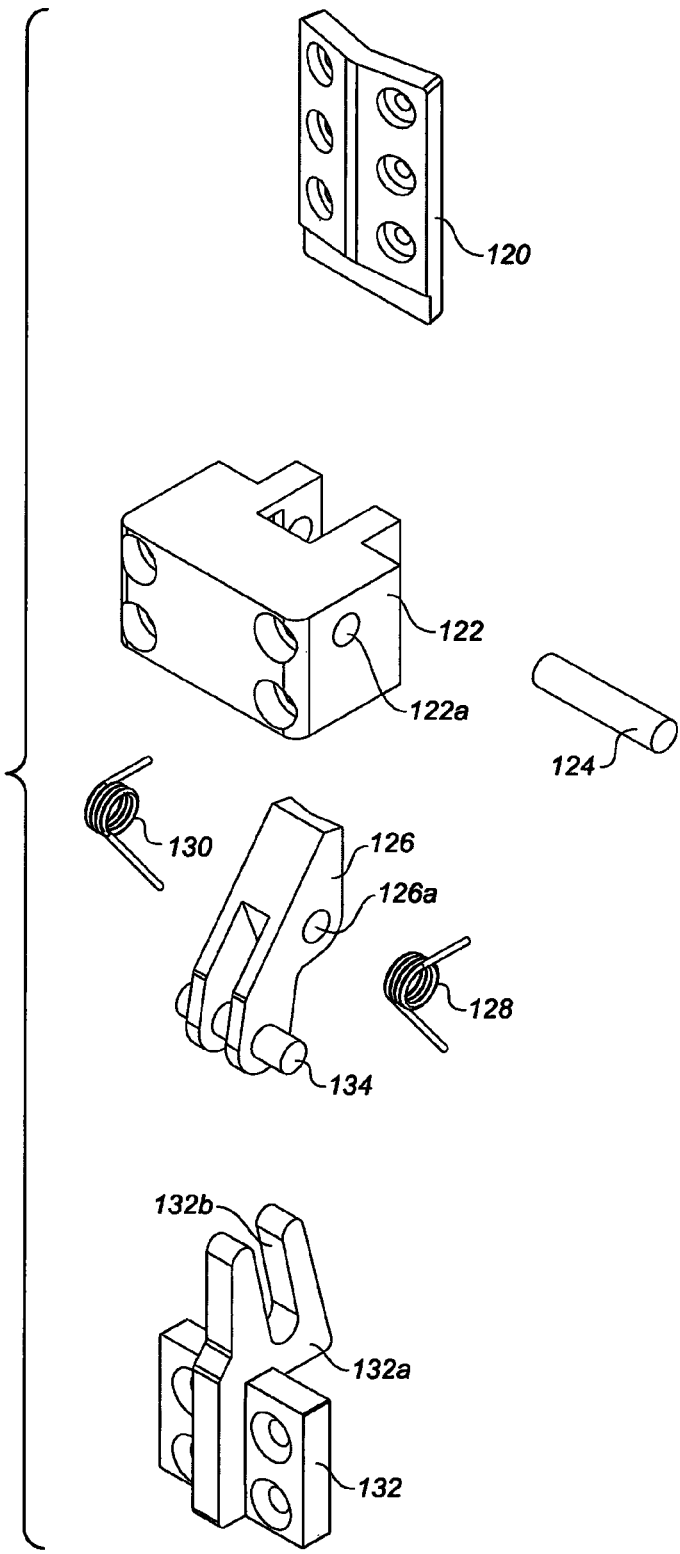
FIG. 7A is an exploded perspective view showing the elements of a locking mechanism aspect of the present invention.
Figure 7B:
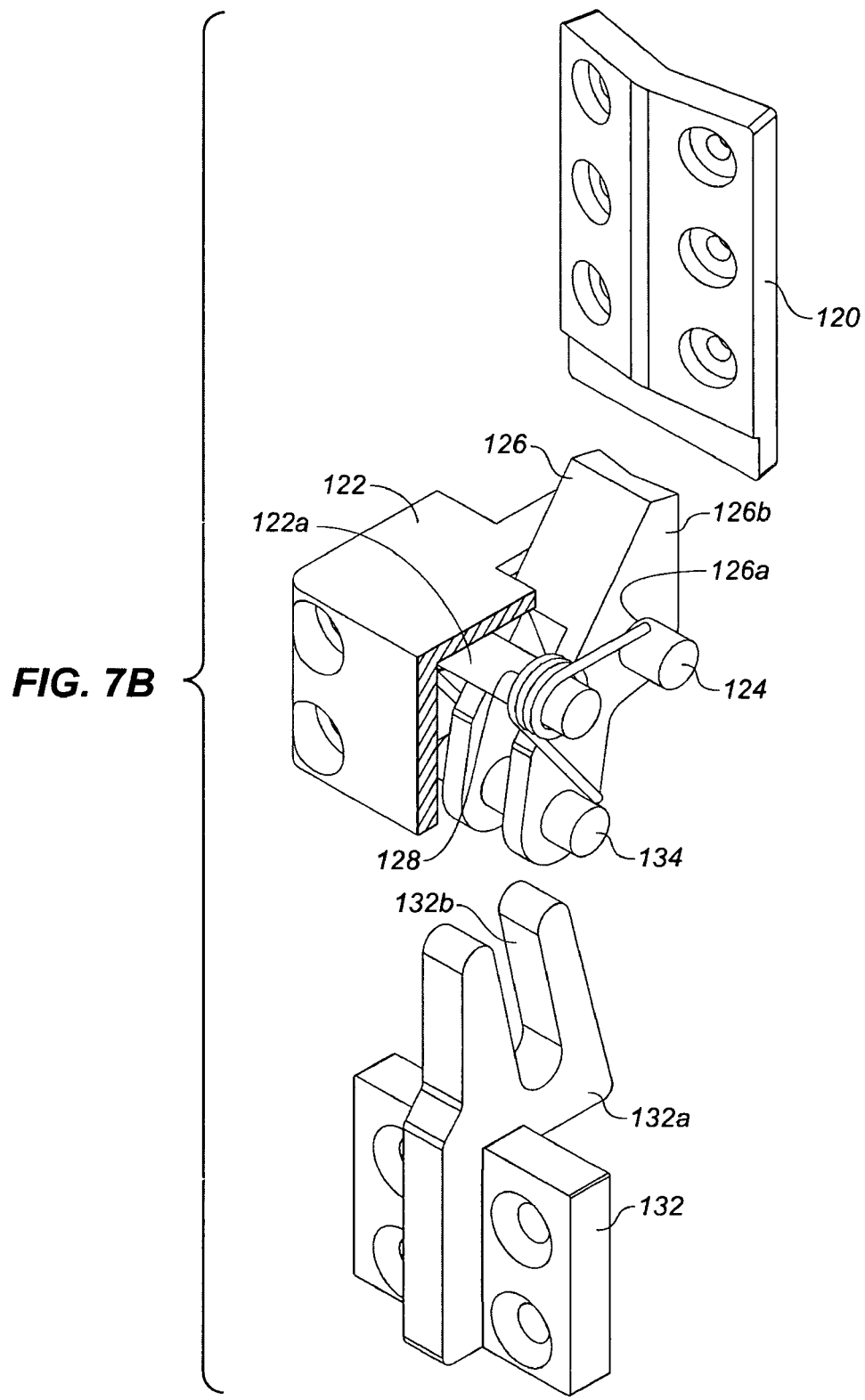
FIG. 7B is a perspective view showing the elements of the locking mechanism of FIG. 7A in an assembled and operating position. The tubes on which the elements are mounted are not shown in this view for clarity.
Figure 8D:
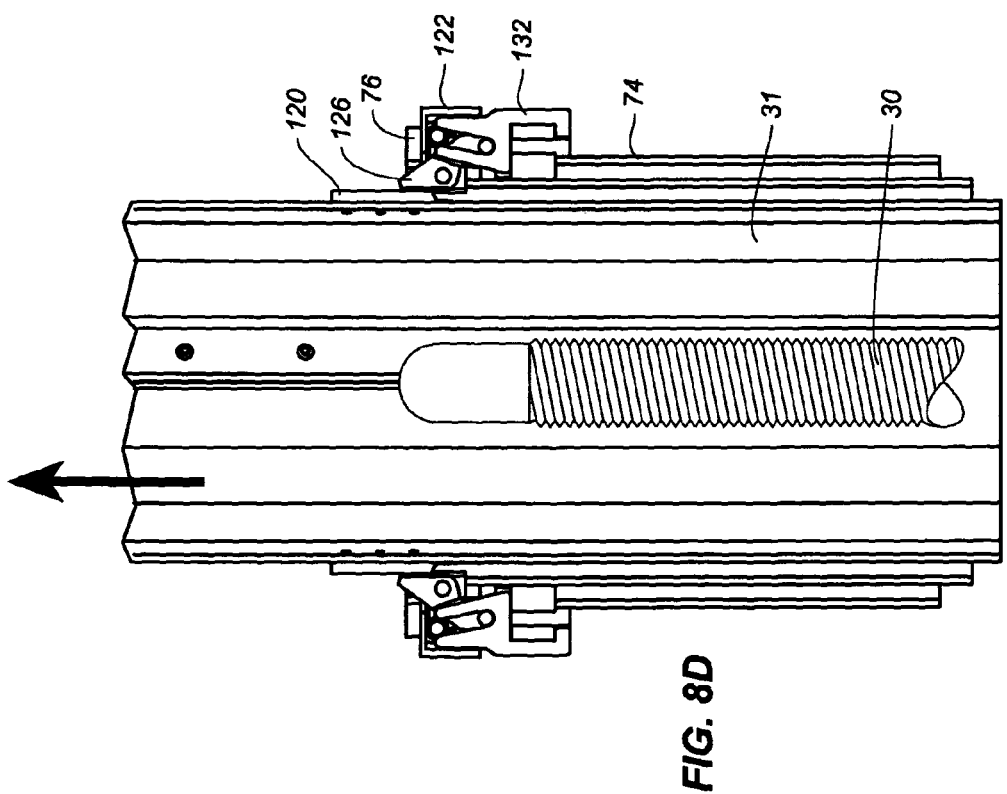
FIGS. 8A-8Q and companion FIGS. 9A-9Q (i.e., FIG. 8A is a companion of FIG. 9A, etc.) are cut-away side-elevation views showing the sequence of operation of the hold-down and locking mechanisms as three adjacent tubes in a tower embodying aspects of the present invention are extended and retracted. Each cut-away side-elevation view is at ninety degrees to its companion so that the respective companion views are cut through the locking mechanism elements (FIGS. 8A-Q) and through the hold-down mechanism elements (FIGS. 9A-Q).
Figure 8E:
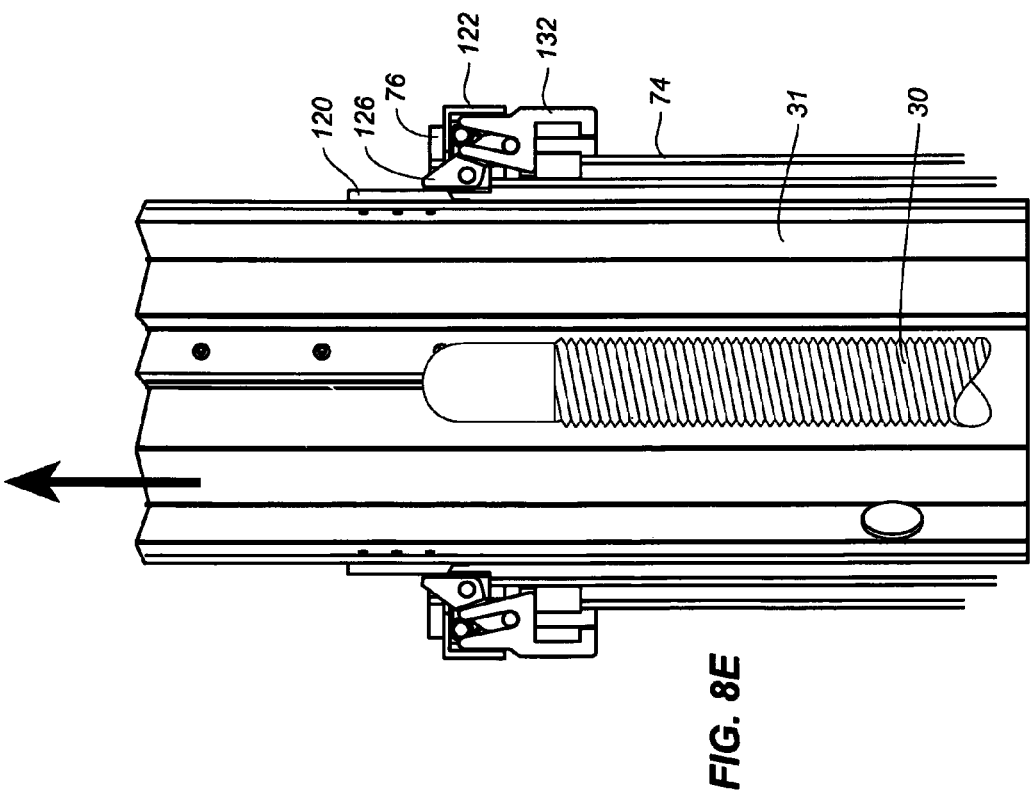
Figure 8F:
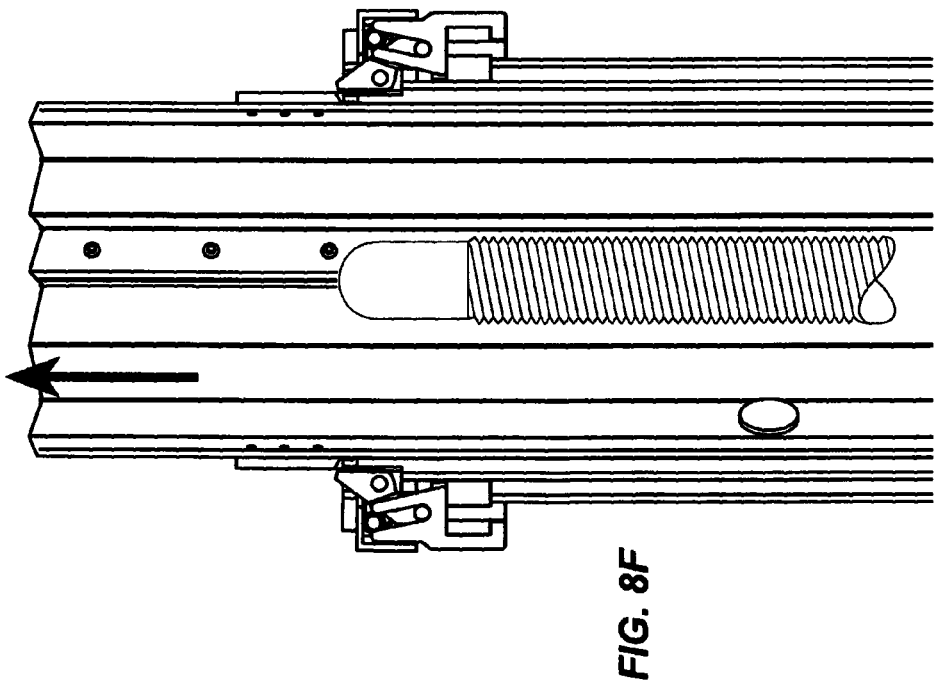
Figure 8H:
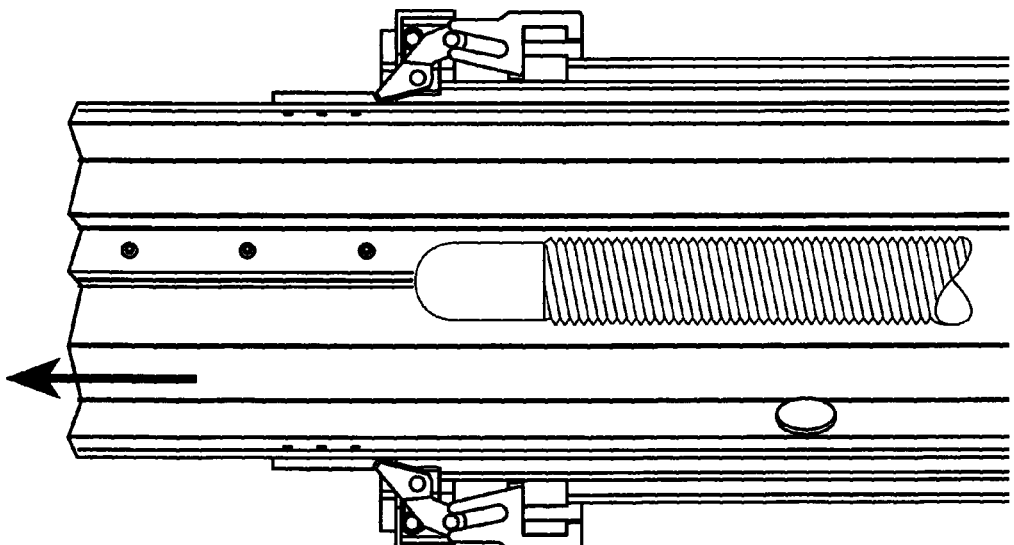
Figure 8I:
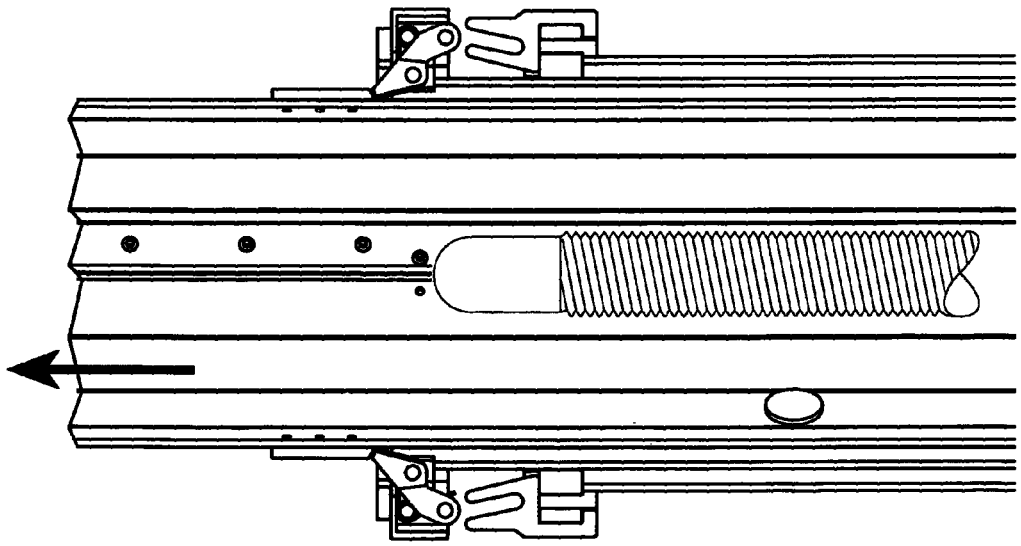

FIG. 7A shows the elements of a lock assembly in accordance with aspects of the present invention. The lock assembly includes a lock pad 120, a lock housing 122, a pivot pin 124, a lock 126, first and second springs 128 and 130, and a lock actuator post 132. The lock 126 has a pin 134 that functions both as a spring retainer and a lock stop. FIG. 7B shows the hold-down assembly elements in an operating position. Pivot pin 124 passes through a hole 126a in the lock 126 and the holes 122a in the hold-down housing 122, allowing the lock to rotate along the axis of pin 124. Springs 128 and 130, working against spring rest pin 134, urge the lock into its locked position as shown in FIG. 7B. Lock 126 has an extending latch portion 126b that engages the bottom side of the lock pad 120. The lock actuator post has an upward extending U-shaped member 132a having a slot 132b that engages lock stop pin 134 of the rotating lock. When the pin is at the bottom of the slot, the lock is open; when the pin is at the top of the slot, the lock is locked. With respect to three consecutive mast sections, the lock pad 120 is carried by the innermost mast section, the lock housing 122 (carrying the lock 126) by the intermediate mast section, and the lock actuator post 132 by the outer mast section. The slot in the lock actuator post forces the lock into position even though the lock is spring loaded in the locking position. This results in a positive locking operation. In the locked condition shown in FIG. 7B, the inner mast section cannot be retracted with respect to the intermediate mast section. The operation of the hold-down assembly is explained in further detail below.

The following table describes further the operation of the hold-down and locking mechanisms with respect to extension and retraction of the tower sections.

| FIGS. | Steps | Narrative | Status |
| --- | --- | --- | --- |
| FIGS. 1A, 1B, 2A, 2B, 2C, 2D, 2E, 8A, 9A, 10A and 11A. | Starting condition. Tower fully nested. | Tubes fully retracted as determined by electrical stop or by fail-safe mechanical stop. Only one nut (inner tube's nut) is on the lead screw; the other nuts are on the lower unthreaded portion of the lead screw. All hold-downs are engaged (the outermost tube has no hold-down - it is secured to the tower base. All locks are unlocked (allowing inner tube to move vis-à-vis the intermediate tube). Top of lead screw is supported by a lead screw-supporting member 31 (FIGS. 2B, 2E). | Hold-downs engaged Locks unlocked Inner tube's nut on lead screw |
|  | Extension of inner tube begins. | Drive motor rotates lead screw in direction that causes the inner tube to extend out of the intermediate tube that is held down to the outer tube by the hold-down mechanisms. The locking mechanisms are not locked. | Inner tube extends out of intermediate tube |
| FIGS. 8B, 9B, 10B and 11B. | Inner tube nears its full extension. | Hold-downs remain actuated, keeping the intermediate tube from moving. Locks remain unlocked. Hold-down actuator pads approach hold-downs. Lock pads approach lock. |  |
| FIGS. 8C, 9C, 10C and 11C. | Inner tube continues upward toward its full extension. | Hold-downs remain actuated, keeping the intermediate tube from moving. Locks remain unlocked. Hold-down actuator pads more closely approach hold-downs. Lock pads are passing lock. |  |
| FIGS. 8D, 9D, 10C and 11C. | Inner tube continues further upward toward its full extension. | Hold-downs remain actuated, keeping the intermediate tube from moving. Locks remain unlocked. Hold-down actuator pads begins to engage the hold-downs (upper lip of hold-downs). Lock pads continue to pass lock. |  |
| FIGS. 8E, 9E, 10E and 11E. | Inner tube continues further upward toward its full extension. | Hold-downs remain actuated, keeping the intermediate tube from moving. Locks remain unlocked. Hold-down actuator |  |

| FIGS. | Steps | Narrative | Status |
|---|---|---|---|
| | | pads begin to rotate the hold-downs toward disengagement. Lock pads continue to pass by the lock. | |
| FIGS. 8F, 9F, 10F and 11F | As inner tube continues further upward toward its full extension, the hold-downs disengage and stops on the intermediate tube are engaged so that the intermediate tube is carried by the inner tube. | Hold-downs disengage, allowing the intermediate tube to move with respect to the outer tube (top lip of the hold-down actuator on inner tube engages the hold-down on the intermediate tube, causing it to release from the hold-down post hook on the outer tube). As the hold-down clears the hold-down post hook, the shoulders of the hold-down actuator pads engage the stop provided by the upper flange cap. The inner tube carries the intermediate tube along with it (the inner tube's nut is still on the lead screw; the intermediate tube's nut is not yet on the lead screw). The locks remain unlocked. Lock pads are now above the lock so that the lock can be rotated in order to engage the bottom of the lock pad (it is not yet rotated). The overlap between the inner and intermediate tube is determined by the relative locations of the hold-down pads and the lock pads. | Hold-downs disengaged Stops engaged Intermediate tube extends out of outer tube along with inner tube |
| FIGS. 8G, 9G, 10G and 11G. | As inner tube continues further upward, carrying the intermediate tube with it, the locks begin to engage. | Because the outer tube cannot move (if it is the ultimate outer tube, it is fixed to the base, otherwise it is held down by hold-down mechanisms), the lock pin on the lock rides up in the lock post slot (carried by the outer tube) as the intermediate tube extends (it is carried up by the inner tube's engagement of the stop), causing the lock to begin rotating under the lock pad. | Locks begin to engage |
| FIGS. 8H, 9H, 10G and 11G. | The inner tube continues further upward, carrying the intermediate tube with it. The locks fully engage into their locked positions (but there is still a gap). | The lock pin on the lock rides up in the lock post slot to the top of the slot, rotating the lock into its fully engaged locked position under the lock pads (the intermediate tube is | Locks fully engaged |

| FIGS. | Steps | Narrative | Status |
|---|---|---|---|
| | | still carried by the inner tube-there is a slight gap between the lock and the bottom of the lock pad; the intermediate tube's nut is not yet on the lead screw). In its fully rotated position, the lock also engages a lock stop in the lock housing. | |
| FIGS. 8I, 9I, 10I and 11I. | Intermediate tube's nut goes on lead screw | The inner and intermediate tubes continue upward together (the intermediate tube is carried by the inner tube) causing the intermediate tube's nut to engage a thread on the lead screw. The upper movement of the intermediate tube causes the intermediate tube's nut to engage the lead screw, maintaining the position of the lock pad constant with respect to the lock housing as the inner tube and intermediate tube move upward (the nuts of both tubes are on a lead screw thread). | Both nuts on the lead screw (inner and intermediate) |
| FIGS. 10J and 11J | Inner tube's nut comes off lead screw threads | The inner and intermediate tubes continue upward together (the intermediate tube's and inner tube's nuts are both on the lead screw) causing the inner tube's nut to go off the threads at the top of the lead screw. The inner tube then seats on the lock of the intermediate tube, causing the gap to go away. The inner tube then goes up along with the intermediate tube. | Inner tube's nut goes off top of threaded portion of lead screw; gap between lock and bottom of lock pad goes away; intermediate nut is on the lead screw. Intermediate tube's nut is on the lead screw. |
| FIGS. 10K and 11K. | Inner tube's nut comes off lead screw completely | As the inner tube continues upward along with the intermediate tube, it eventually goes off the top of the lead screw completely (the topmost portion of the lead screw is unthreaded). As the intermediate tube extends it reaches the next set of hold-down mechanisms and lock mechanisms and the cycle repeats. Note however that the intermediate tube is not locked to the bottom outer tube when there is only | Inner tube's nut goes off top of lead screw completely Intermediate tube's nut remains on the lead screw. |

Figure 9D:
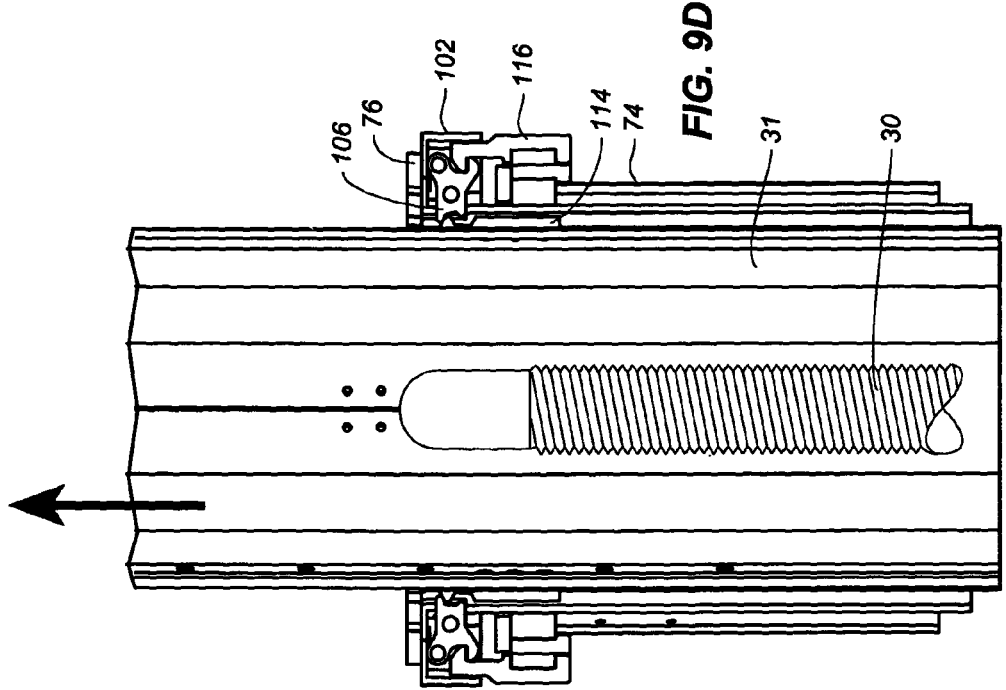
Figure 9E:
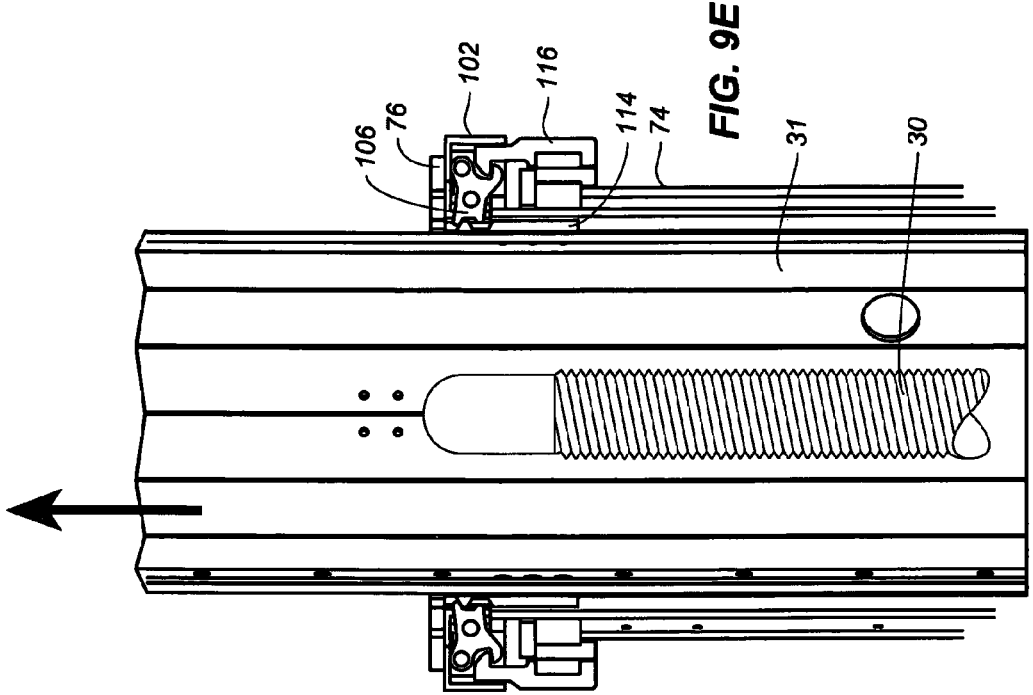
Figure 9F:
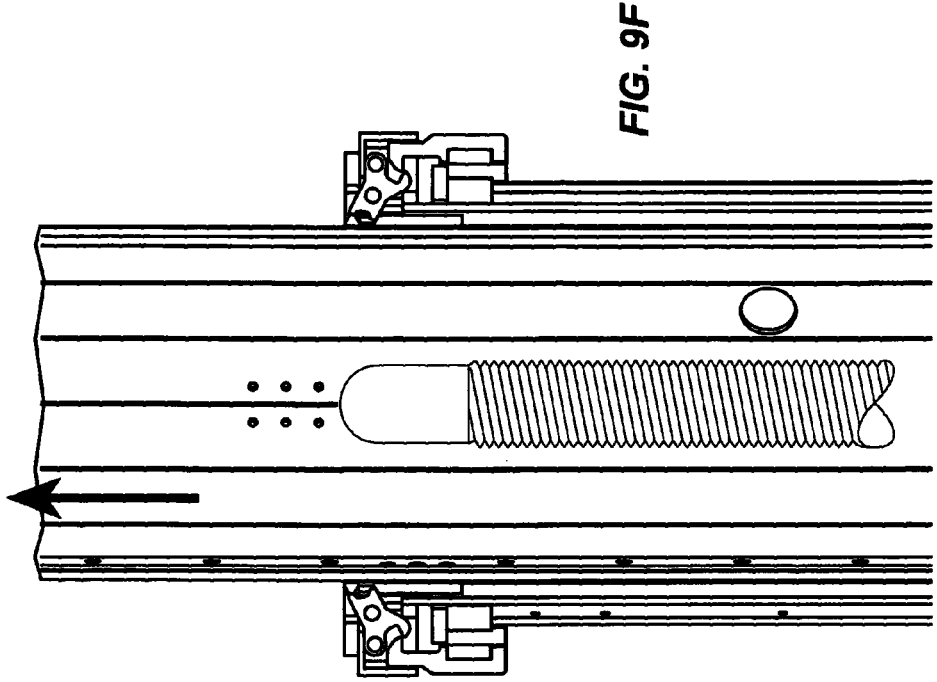
Figure 9H:
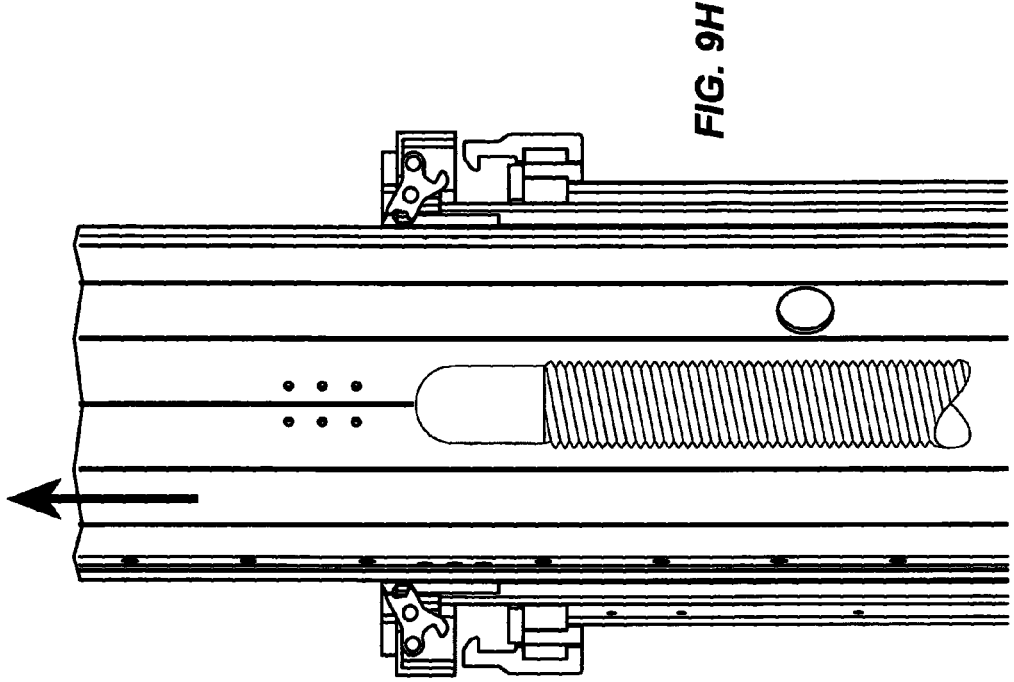
Figure 9I:
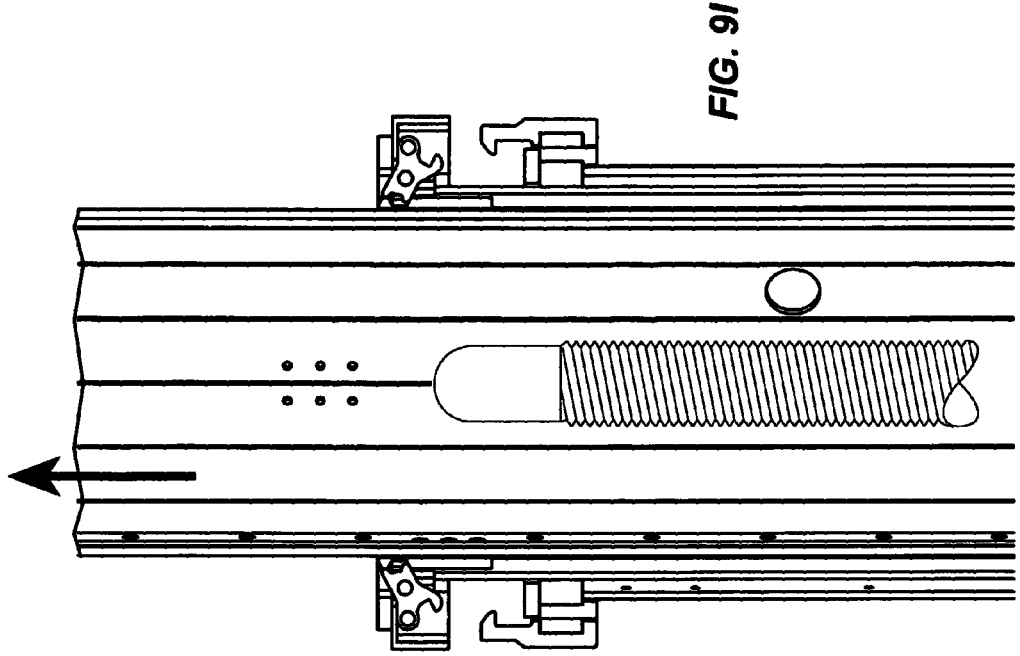
Figure 9J:
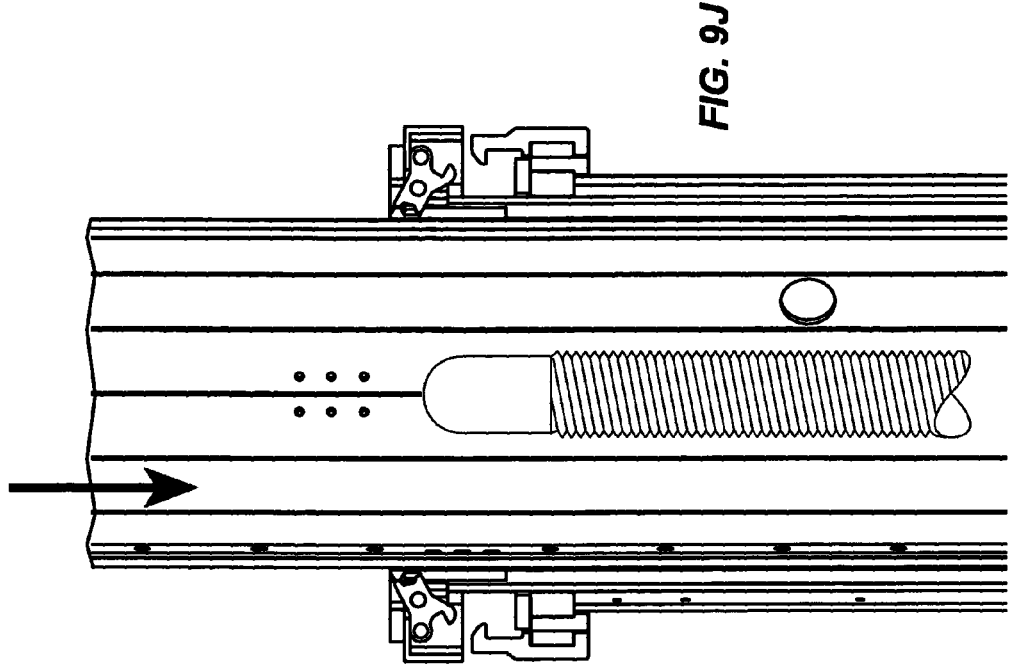
Figure 8J:
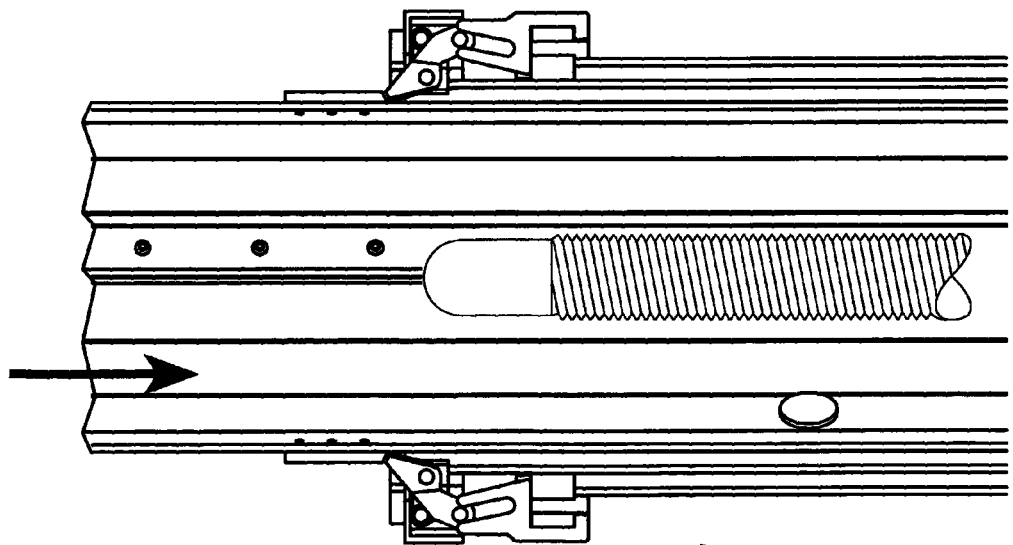
Figure 9L:
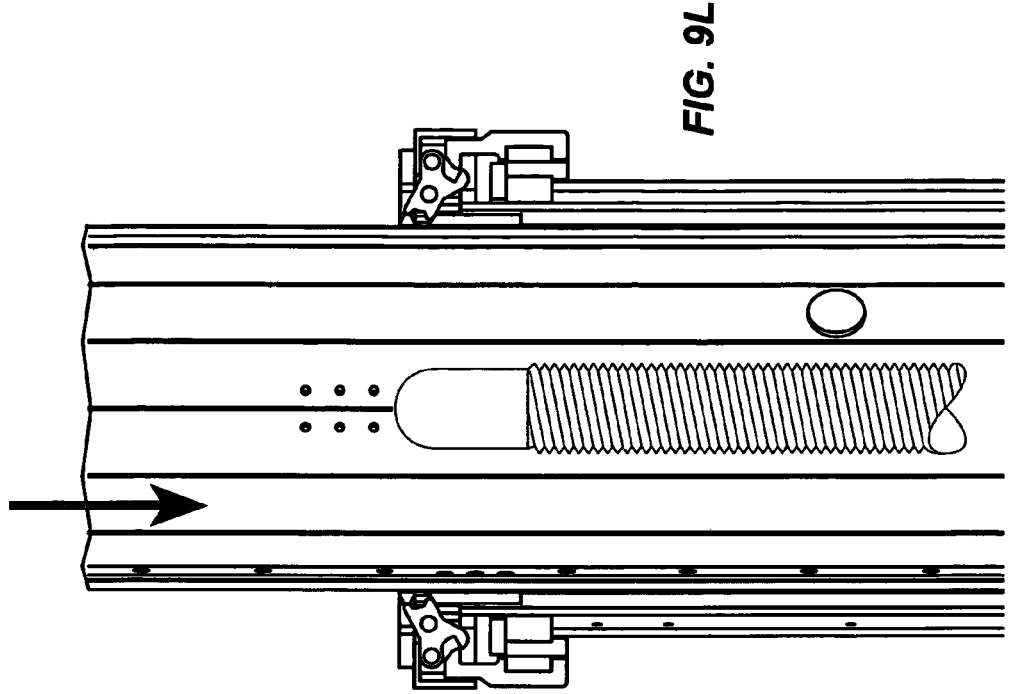
Figure 8L:
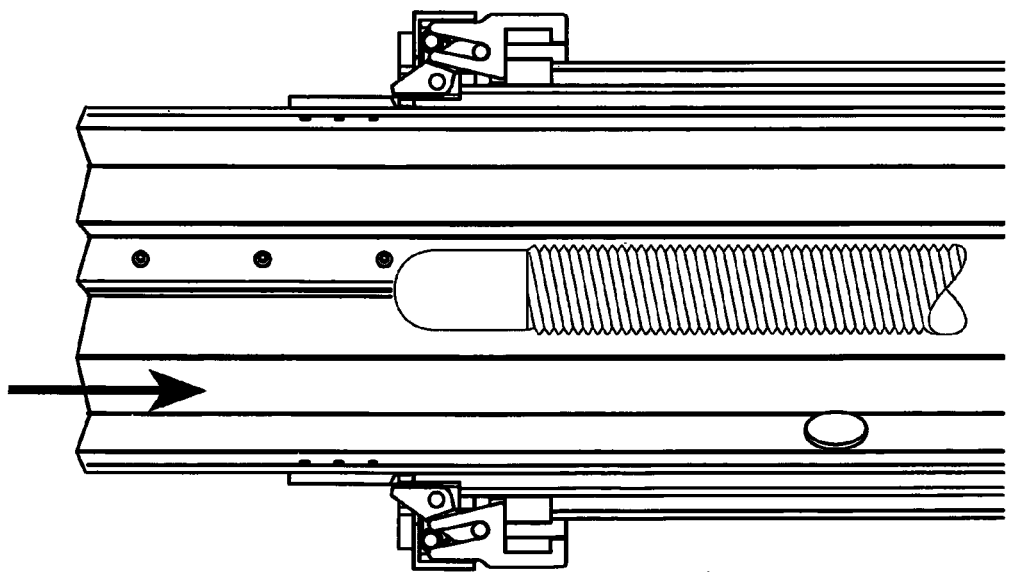

| FIGS. | Steps | Narrative | Status |
|---|---|---|---|
| | | one three tube triad - the next to the outside tube always has its nut on a thread when the tower is fully extended and that is sufficient without otherwise locking that tube section. | |
| | Begin retraction Inner tube's nut comes onto lead screw. | Rotate lead screw in direction to cause intermediate tube to retract. The inner tube, resting on the locks, moves along with the intermediate tube and the inner tube's nut engages a thread on the top of the lead screw. | Intermediate tube's nut is on the lead screw. Inner tube's nut comes onto the lead screw. |
| | Intermediate tube's nut comes off the lead screw | The inner tube and intermediate tube continue to retract together. The nut of the lower tube, the intermediate tube comes off the lead screw threads, shifting the load of the lower tube to the shoulders of the hold-down actuator pads that are engaging the upper flange cap. The inner tube's nut remains on the lead screw, taking the load of both tubes and unloading the locks. | Intermediate tube's nut comes off the lead screw. Inner tube's nut is on lead screw, unloading the locks. Gap reappears. |
| FIGS. 8J and 9J | Begin unlocking sequence | The inner and intermediate tubes continue to move together. The lock pin enters the lock post slot (carried by the non-moving outer tube). | Lock pin enters lock post slot. |
| FIGS. 8K and 9K | Continue unlocking sequence | The inner and intermediate tubes continue to move together. The lock pin continues through the lock post slot causing rotation of the lock. | Lock pin continues along slot, rotating lock. |
| FIGS. 9L and 9L | Unlocking sequence completed. | The inner and intermediate tubes continue to move together. The lock pin continues to the bottom of the lock post slot causing full rotation of the lock, opening the lock. Note that the relative locations of the lock pads/locks and hold-down pads/hold-downs does not change through FIGS. 8I/9I through 8K/9K because the intermediate tube is hanging from the inner tube. | Lock pin reaches bottom of slot; lock is unlocked. |

-continued

Figure 9M:
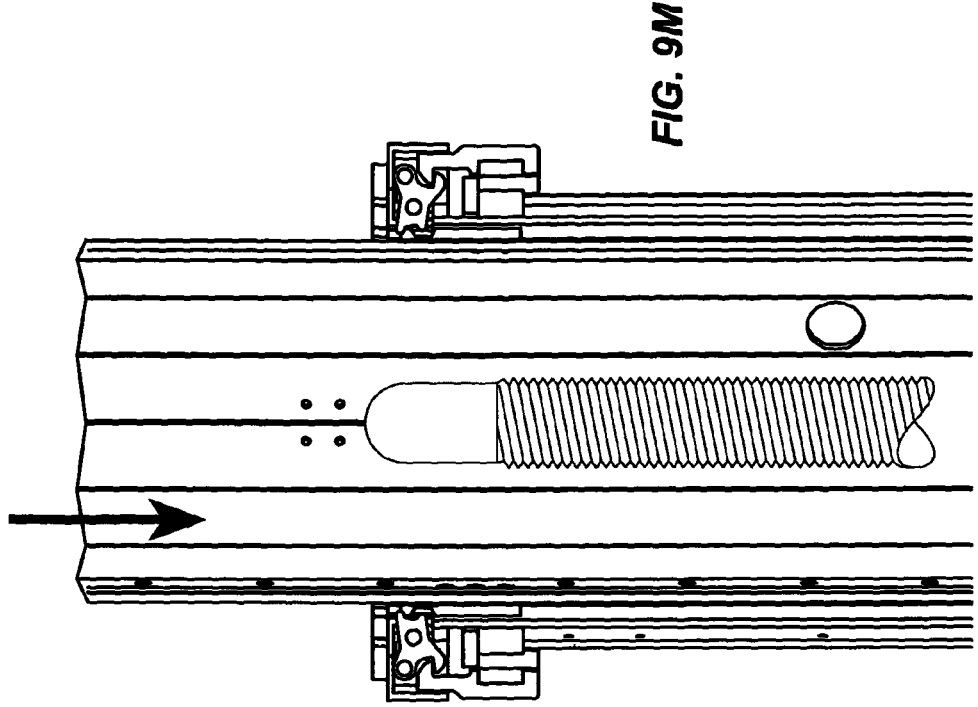
Figure 8M:
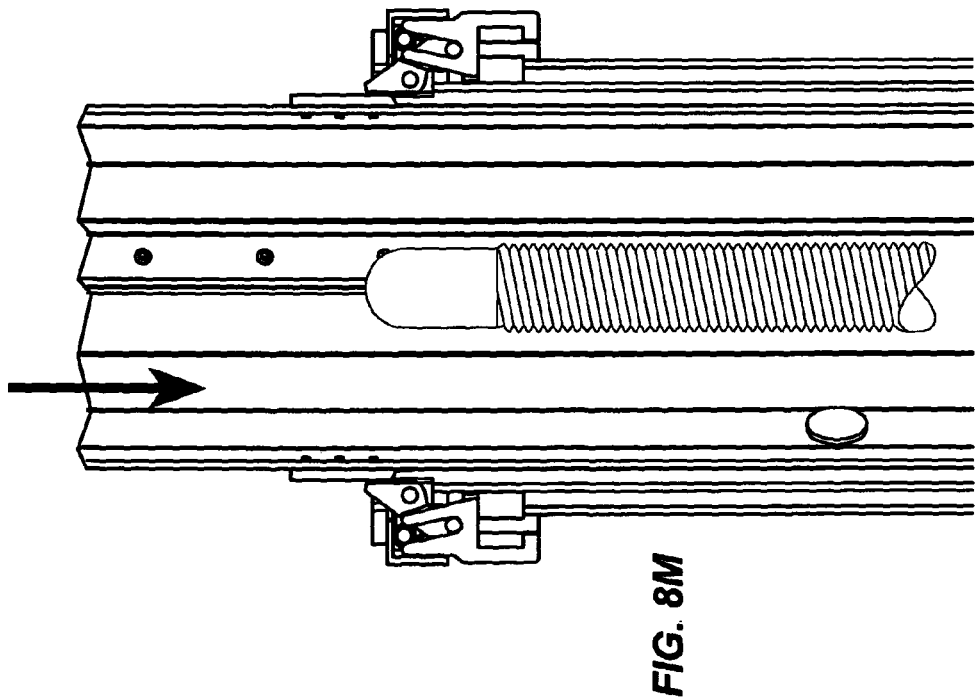
Figure 9N:
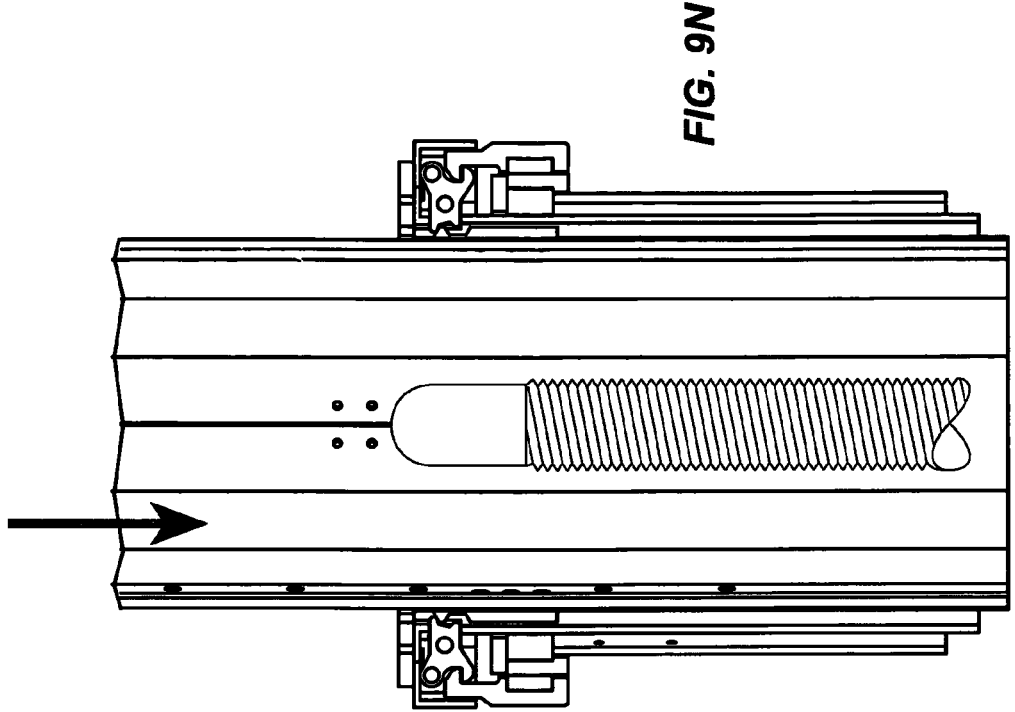
Figure 8N:
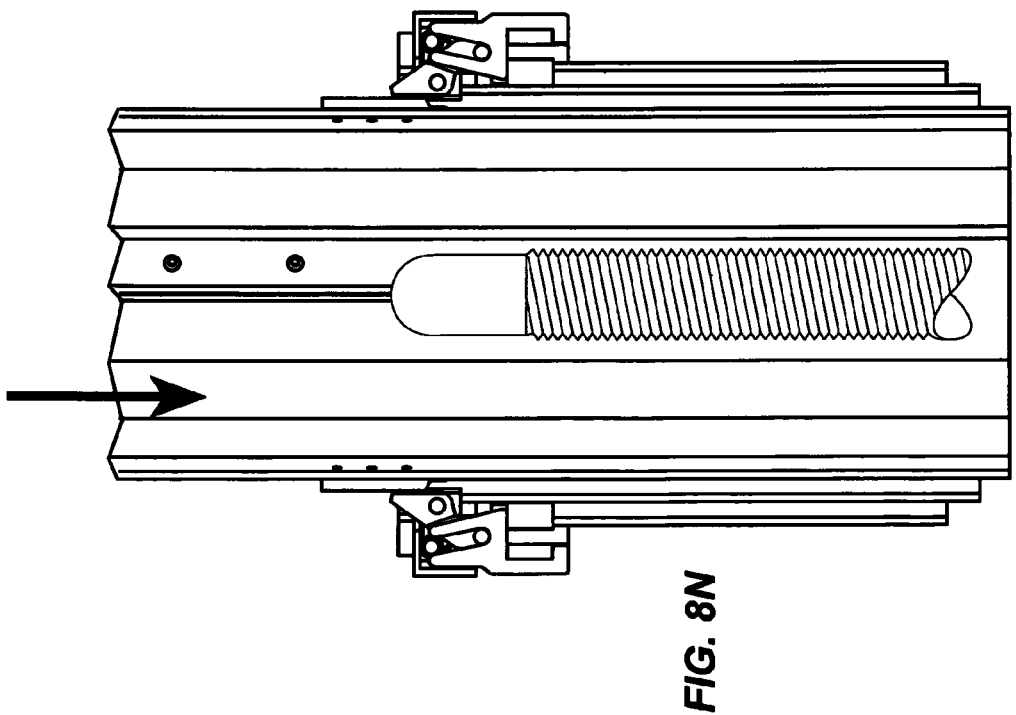
Figure 9O:
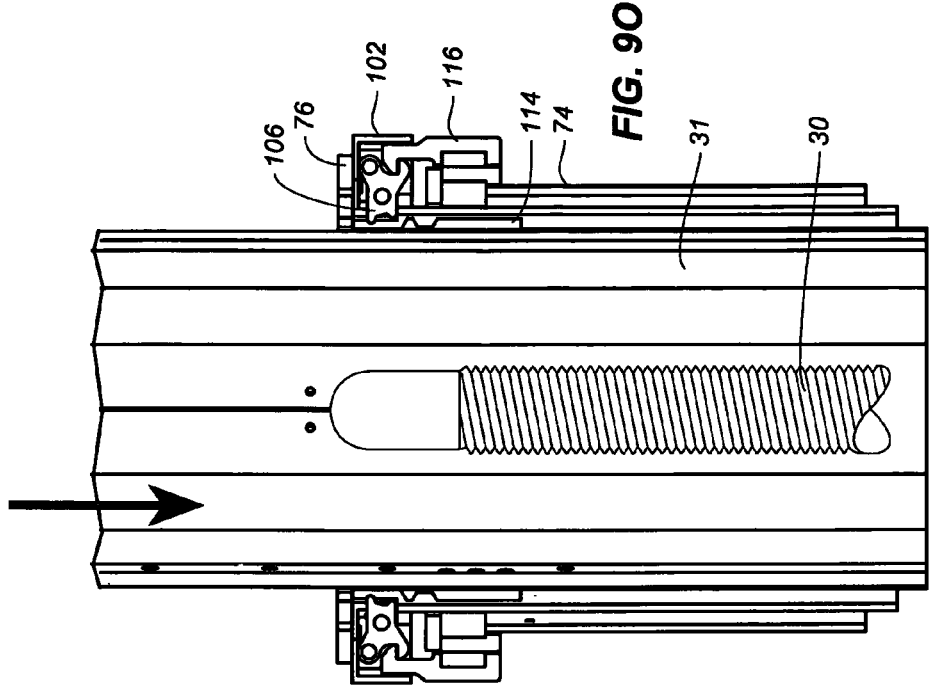
Figure 8O:
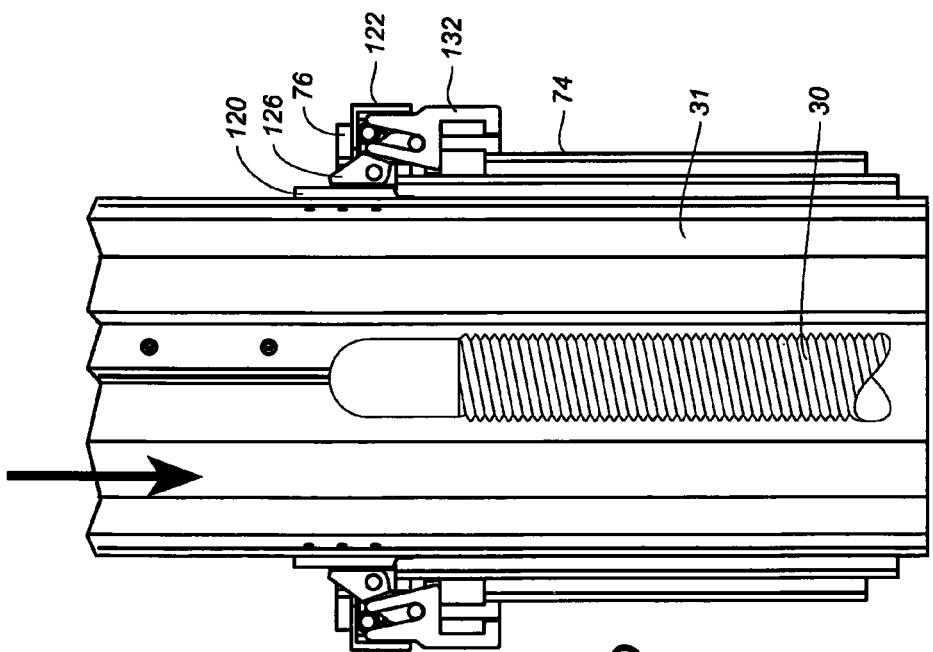
Figure 9P:
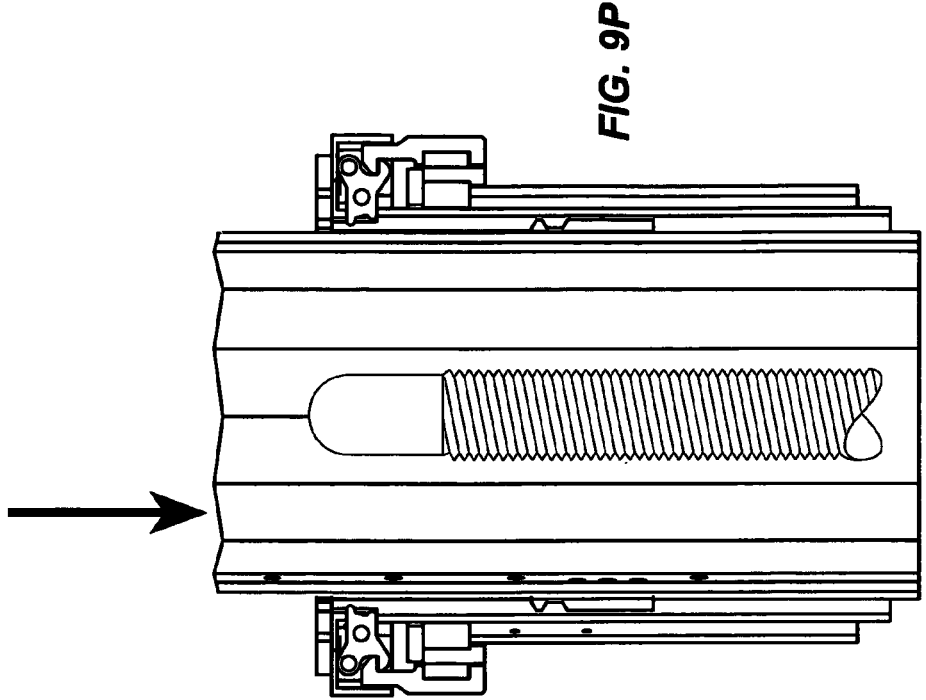
Figure 8P:
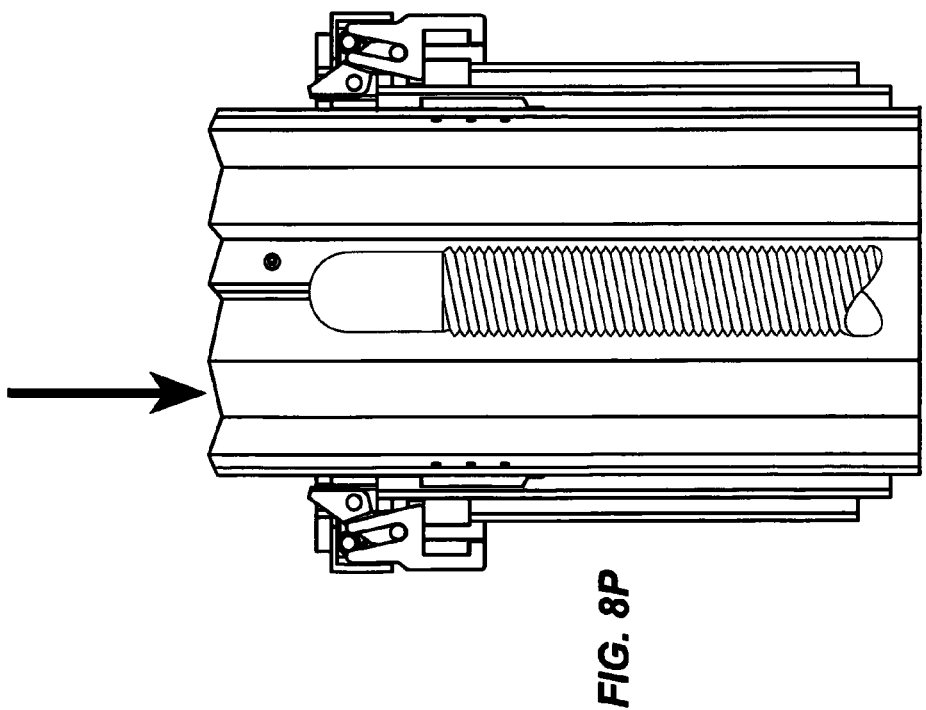
Figure 9Q:
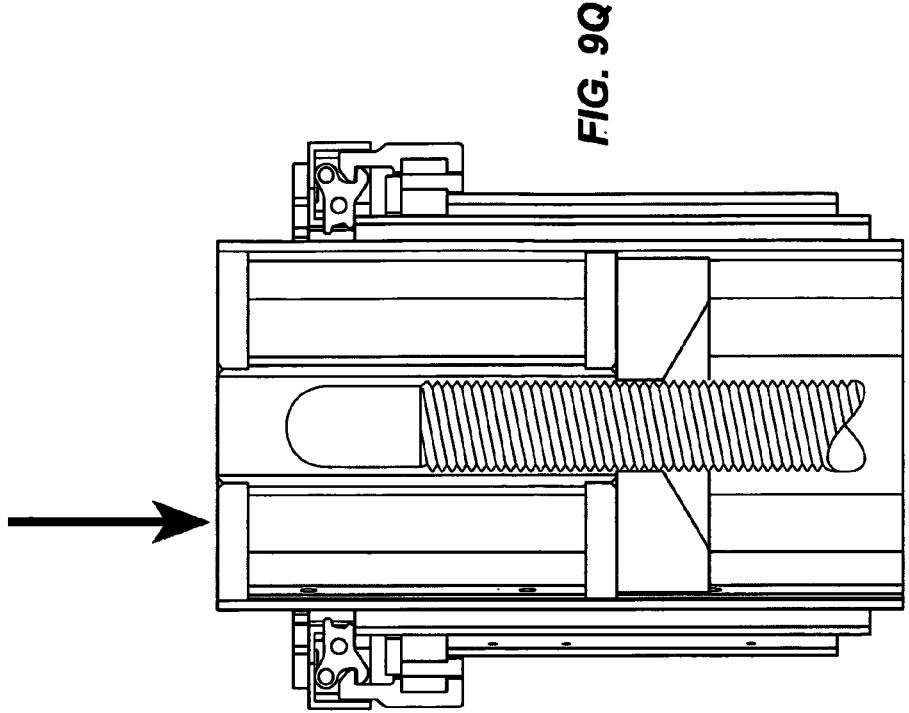
Figure 8Q:
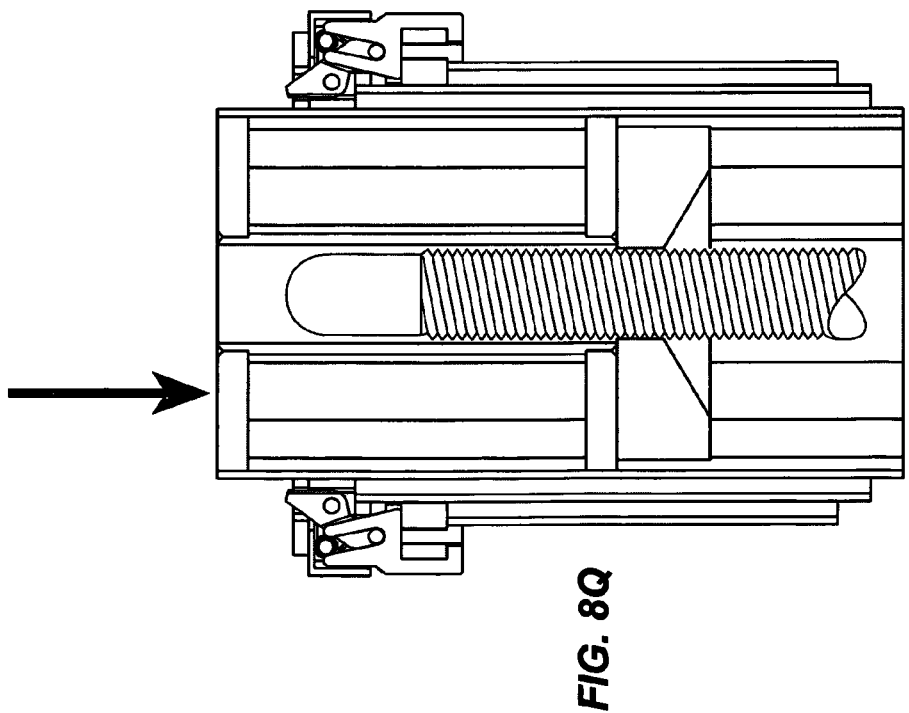
Figure 10A:
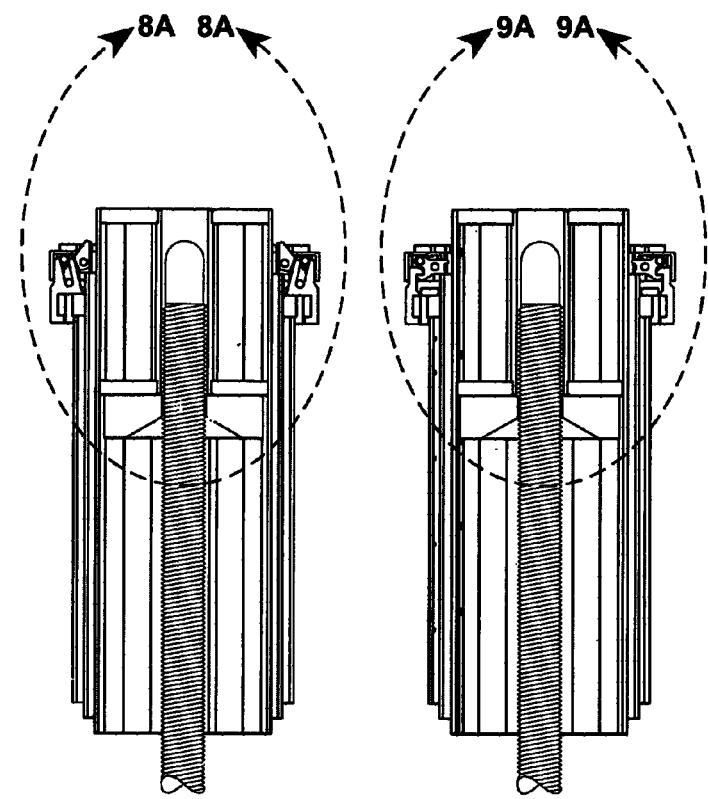
Figure 11A:
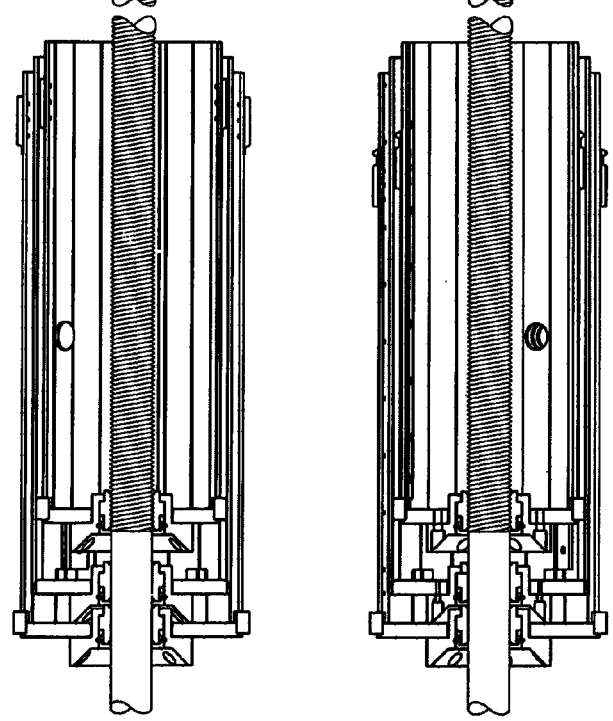
Figure 10C:
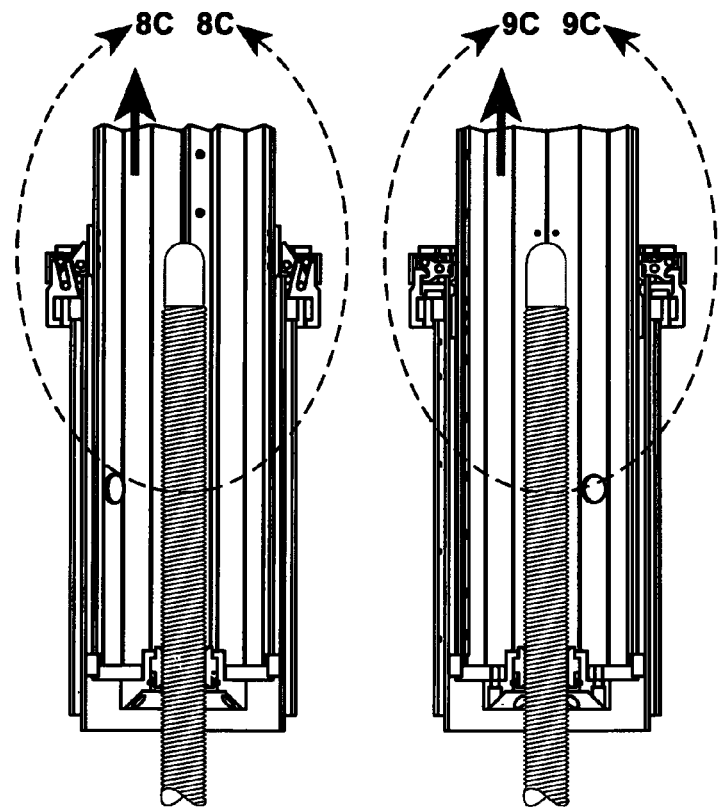
Figure 11C:
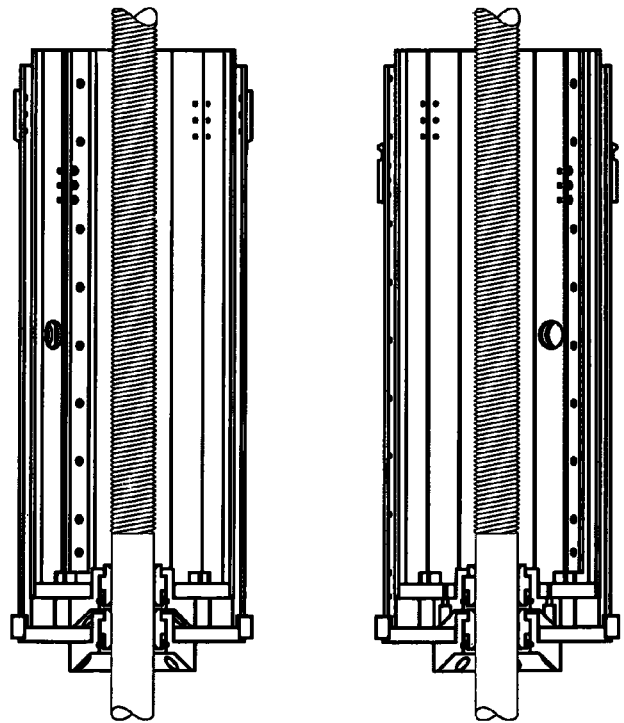
Figure 10E:
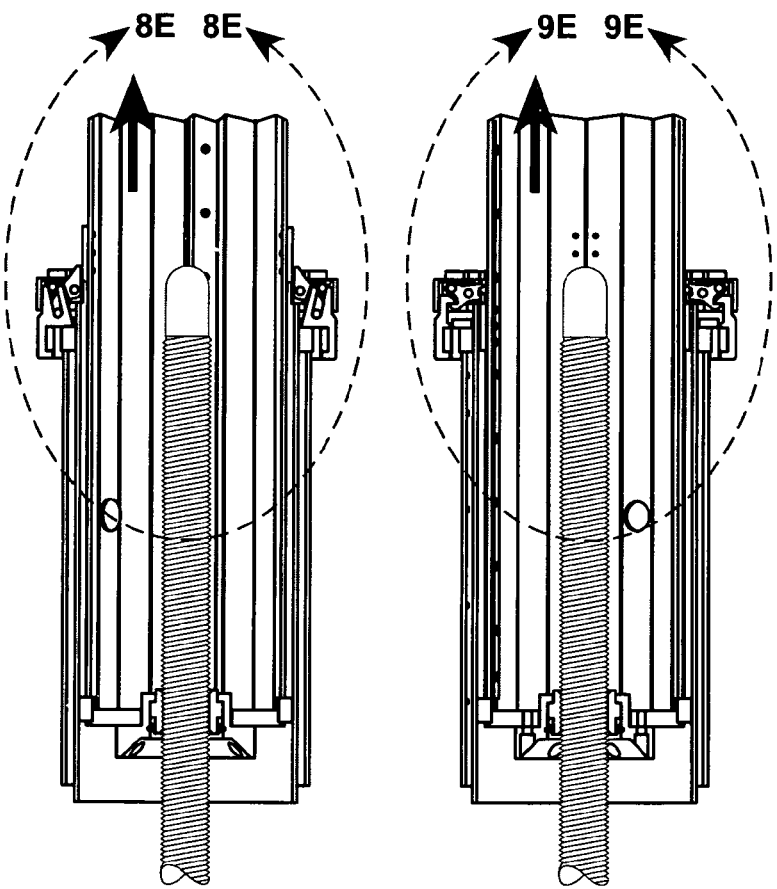
Figure 11E:
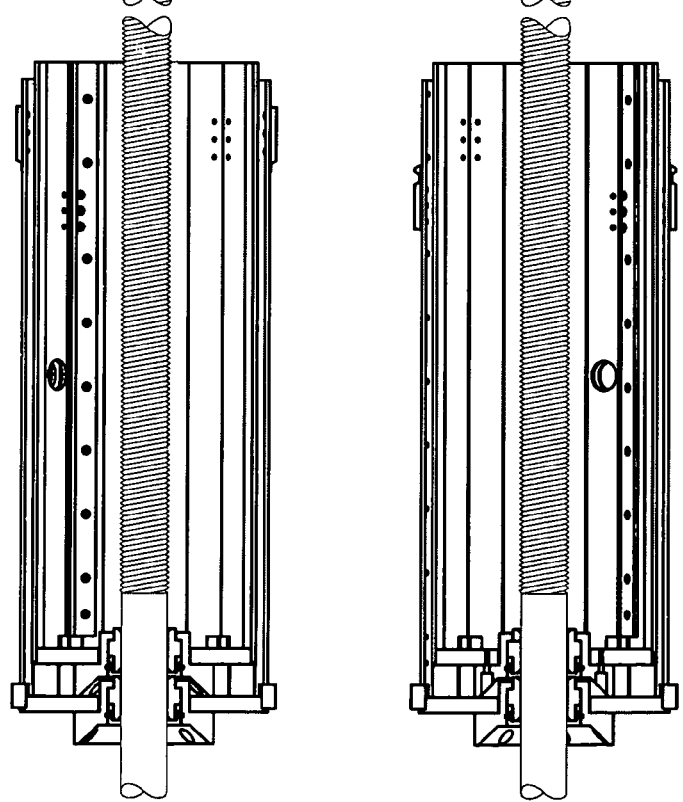
Figures 10F, 11F:
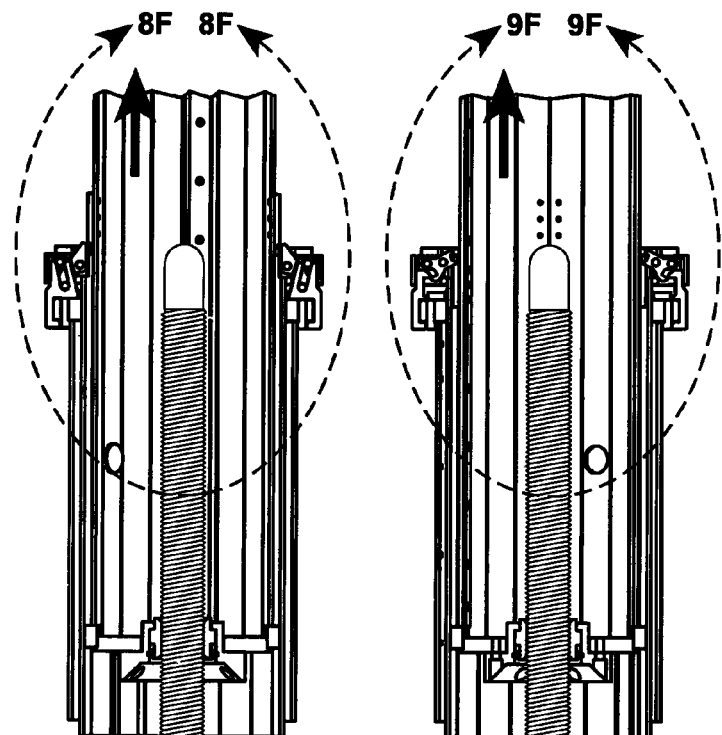
Figure 10J:
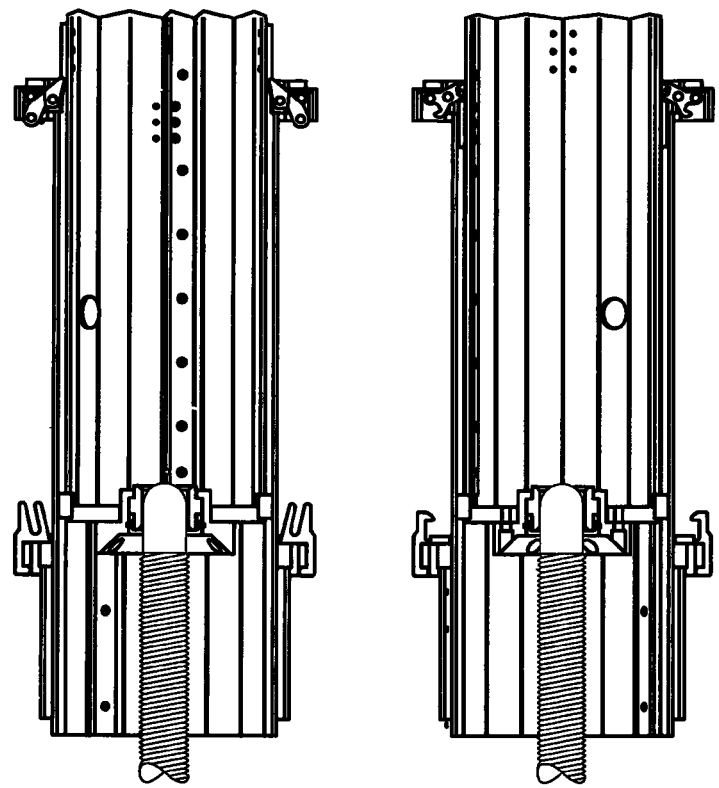
Figure 11J:
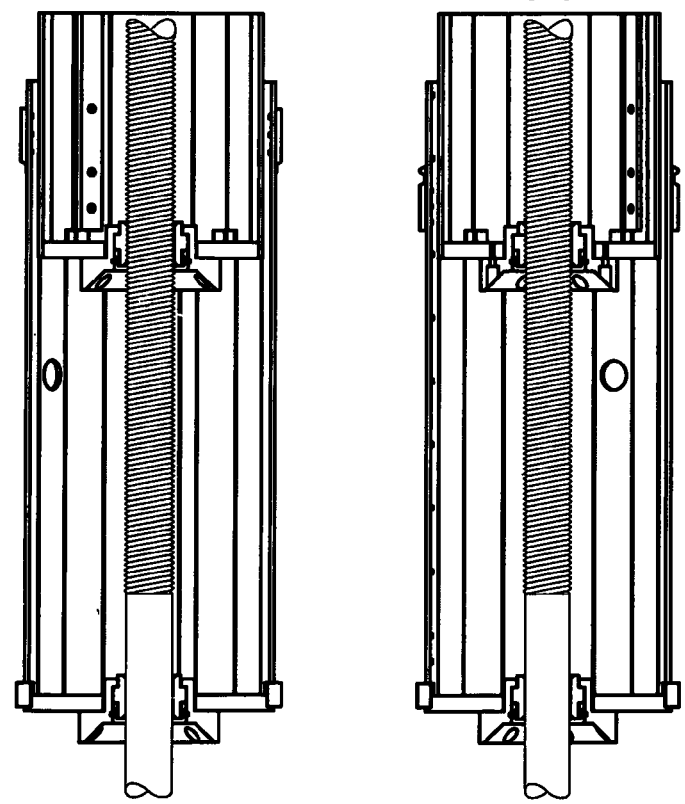
Figure 10K:
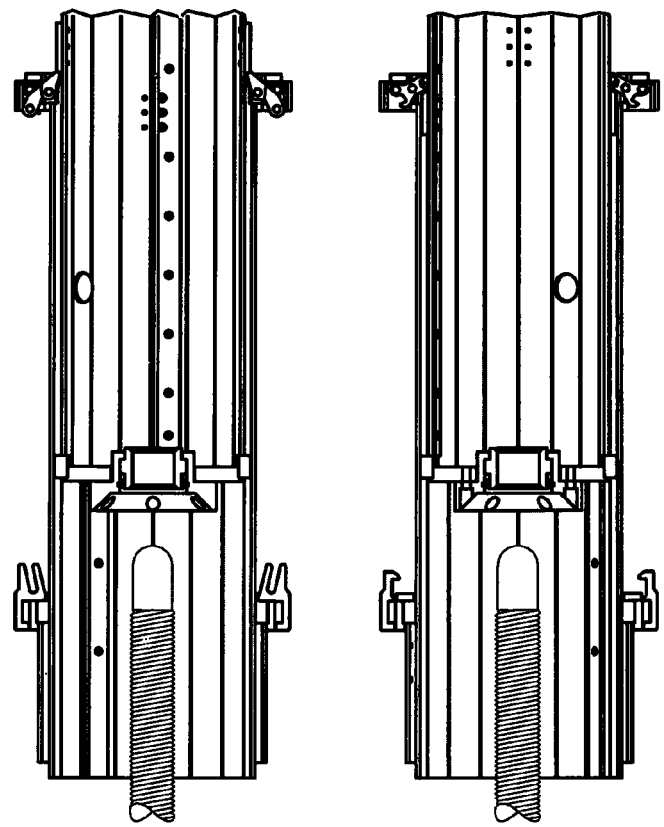
Figure 11K:
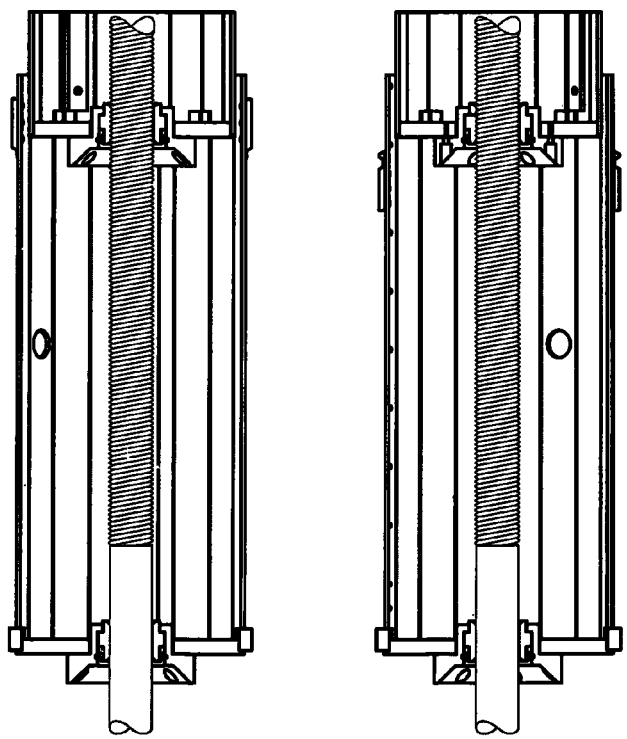

| FIGS. | Steps | Narrative | Status |
|---|---|---|---|
| FIGS. 2A, 2B | Intermediate tube reaches its nested position | Inner tube moves down while intermediate tube remains stationary its nested position | |
| FIGS. 8M and 9M | Begin hold-down activation sequence | Beak of hold-down actuator pad engages lower lip of hold-down, beginning to rotate it. | |
| FIGS. 8N and 9N | Continue hold-down activation sequence | Jaws of hold-down begin to engage hook of hold-down post. | |
| FIGS. 8O and 9O | Hold-down activation sequence completed. | Beak of hold-down actuator pad pushes lower lip of hold-down to fully engage hook of hold-down post | Hold-down engaged. |
| FIGS. 8P and 9P | | Lock pads and hold-down actuator pads below the respective locks and hold-downs. Inner tube continues retraction. | |
| FIGS. 8Q and 9Q | Return to fully nested condition. | All tubes fully nested | Hold-downs engaged, locks unlocked. |

Figure 12A:
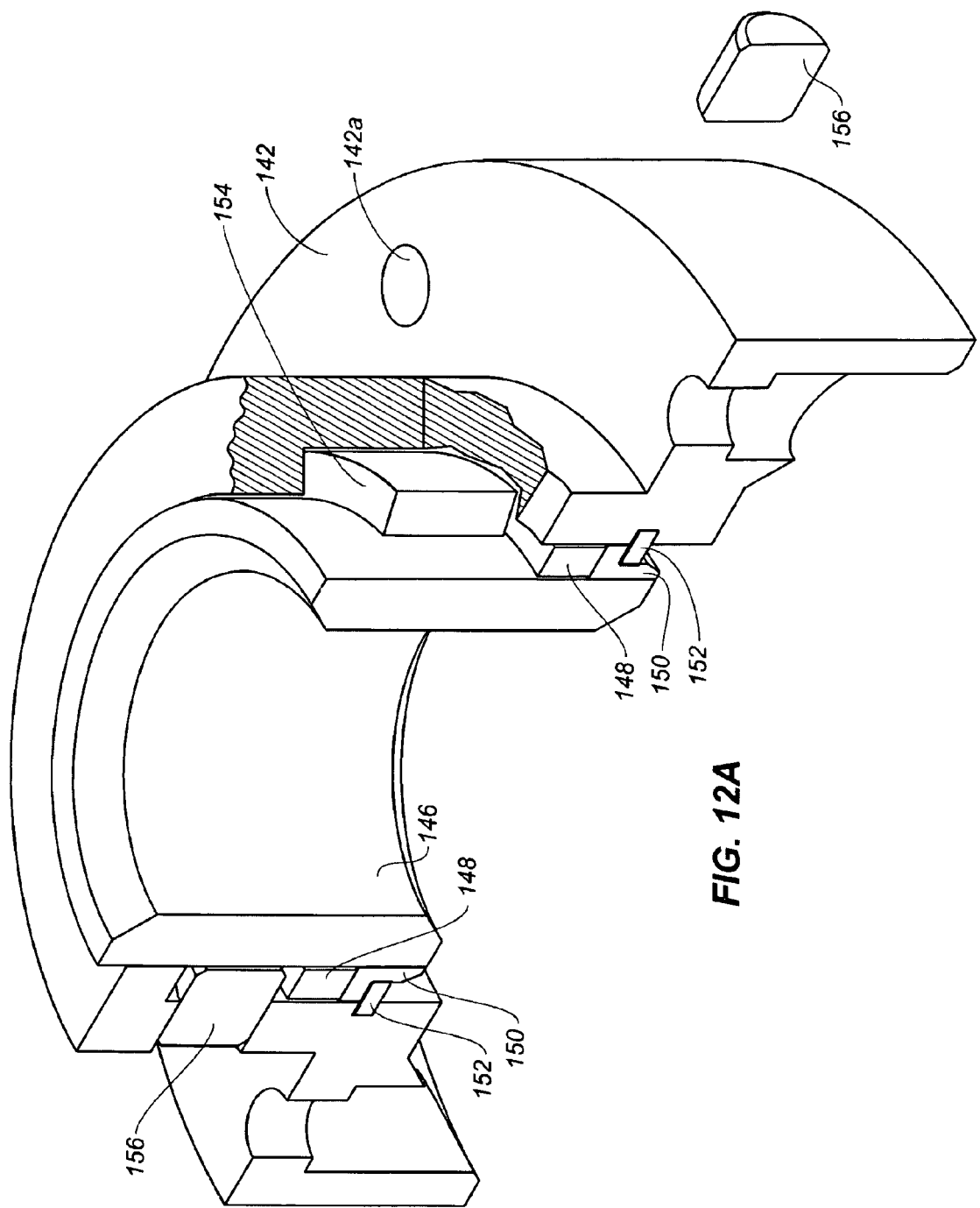
FIG. 12A is a perspective cross section of the drive nut assembly for a telescoping tube.
Figure 12B:
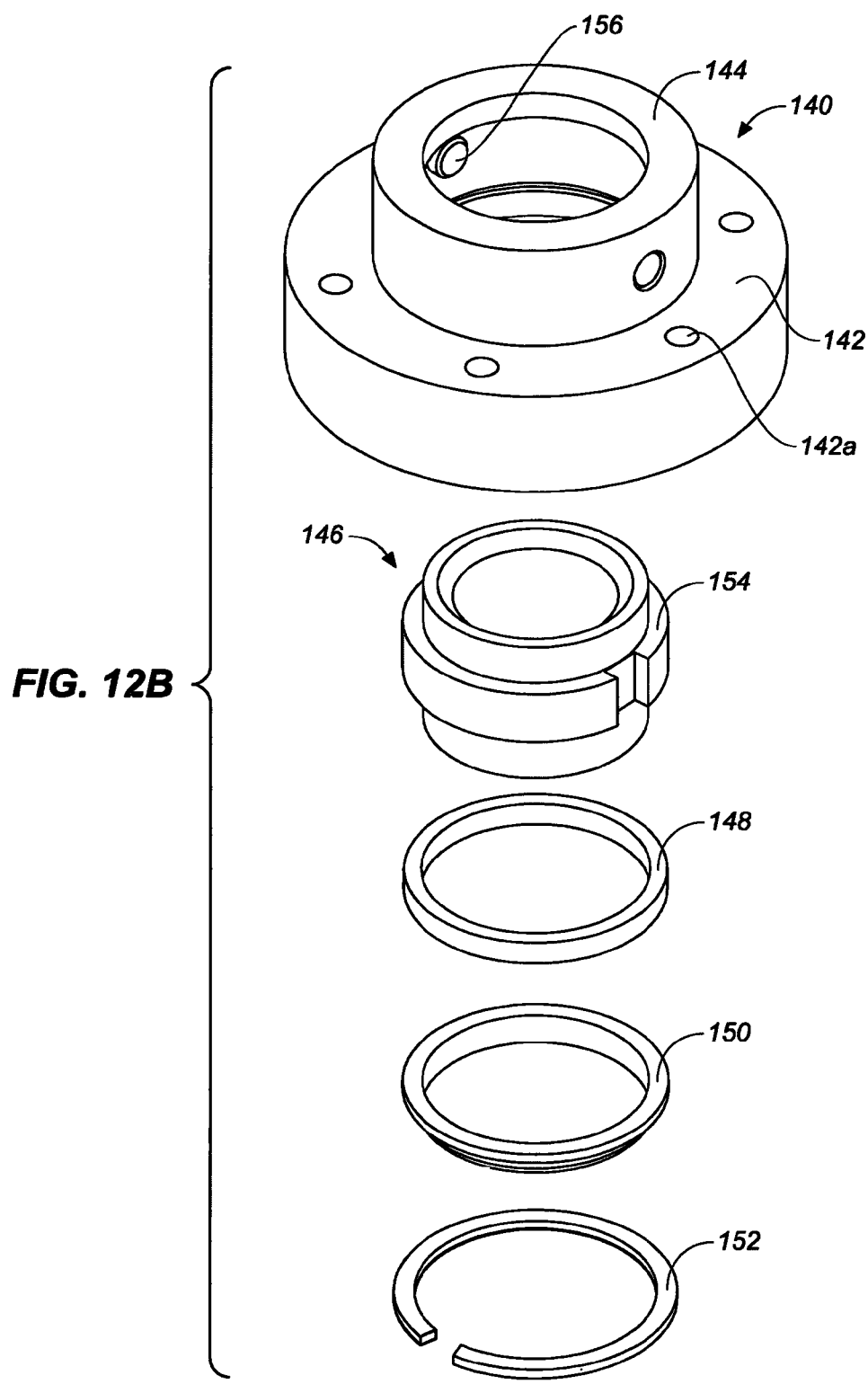
FIG. 12B is an exploded view of the major elements of the drive nut assembly of FIG. 12A.
Figure 12C:
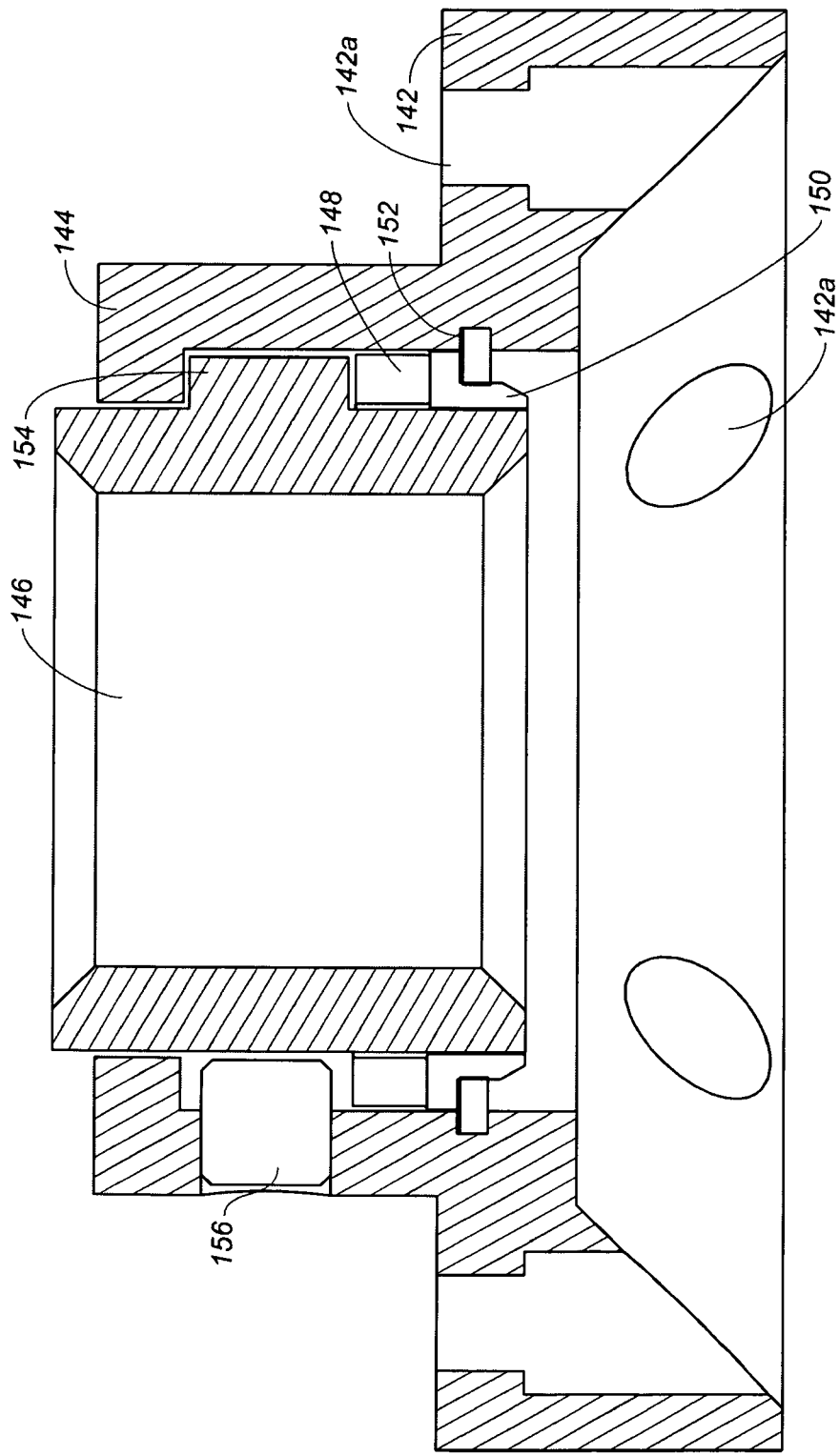
FIG. 12C is a side elevational cross sectional view of the drive nut assembly of FIGS. 12A and 12B.
Figure 12D:
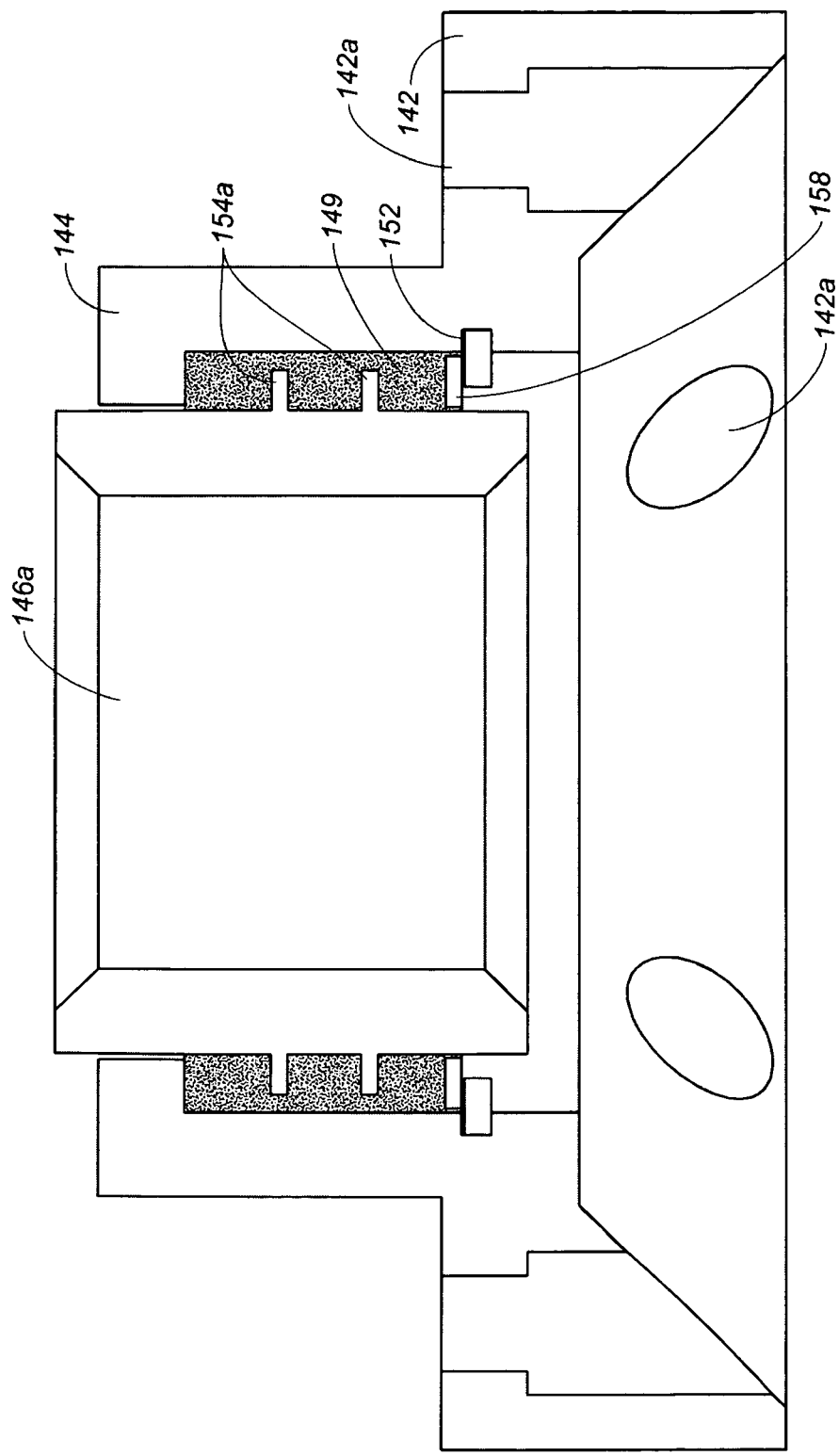
FIG. 12D is a side elevational cross sectional view of a variation of the drive nut assembly of FIGS. 12A and 12B.

FIGS. 12A-12C show a nut assembly 32-38 (FIGS. 2C, 2D) in greater detail. FIG. 12D shows a variation on the nut assembly of FIGS. 12A-12C. Referring first to the nut assembly of FIGS. 12A-12C, a flange 140 adapted for attachment to a tube section has a base 142 having screw holes 142a and an annular neck portion 144 for captively holding a threaded drive nut 146, a wavy ring-shaped metal spring 148, a retaining ring 150 and a snap ring 152. The drive nut 152 has a collar 154 for cooperating with the retaining ring and snap ring to capture the wavy spring. Collar 154 has a gap to allow a pin 156 to interfere with the free rotation of the drive nut within the flange. The wavy spring's vertical "play" and the collar gap's slight rotational "play" permit the nut to more readily engage the threaded drive screw.

Referring now to the variation shown in FIG. 12D, an elastomer (a natural or synthetic rubber), preferably moldable or castable, such as polyurethane or some other suitable material is used instead of a wavy metal washer is employed. The springiness of the polyurethane provides not only vertical and rotational "play" but also provides some cushioning as mast sections are retracted. One way to implement such an arrangement is to provide a ribbed surface area inside the flange collar 144 onto which a castable elastomer such as polyurethane is cast in place. The polyurethane contacts the captive nut and a slight gap is provided between the nut and the flange collar to as to allow some movement of the nut. A metal washer underneath the polyurethane prevents wear of the polyurethane with respect to a retaining ring 160.

Suitable materials other than an elastomer may include other thermoset plastics, carbon-fiber and carbon-fiber impregnated thermoset plastics, fiberglass and fiberglass impregnated thermosets, cork, or composites of some or all of the materials mentioned in this paragraph.

Figure 13A:
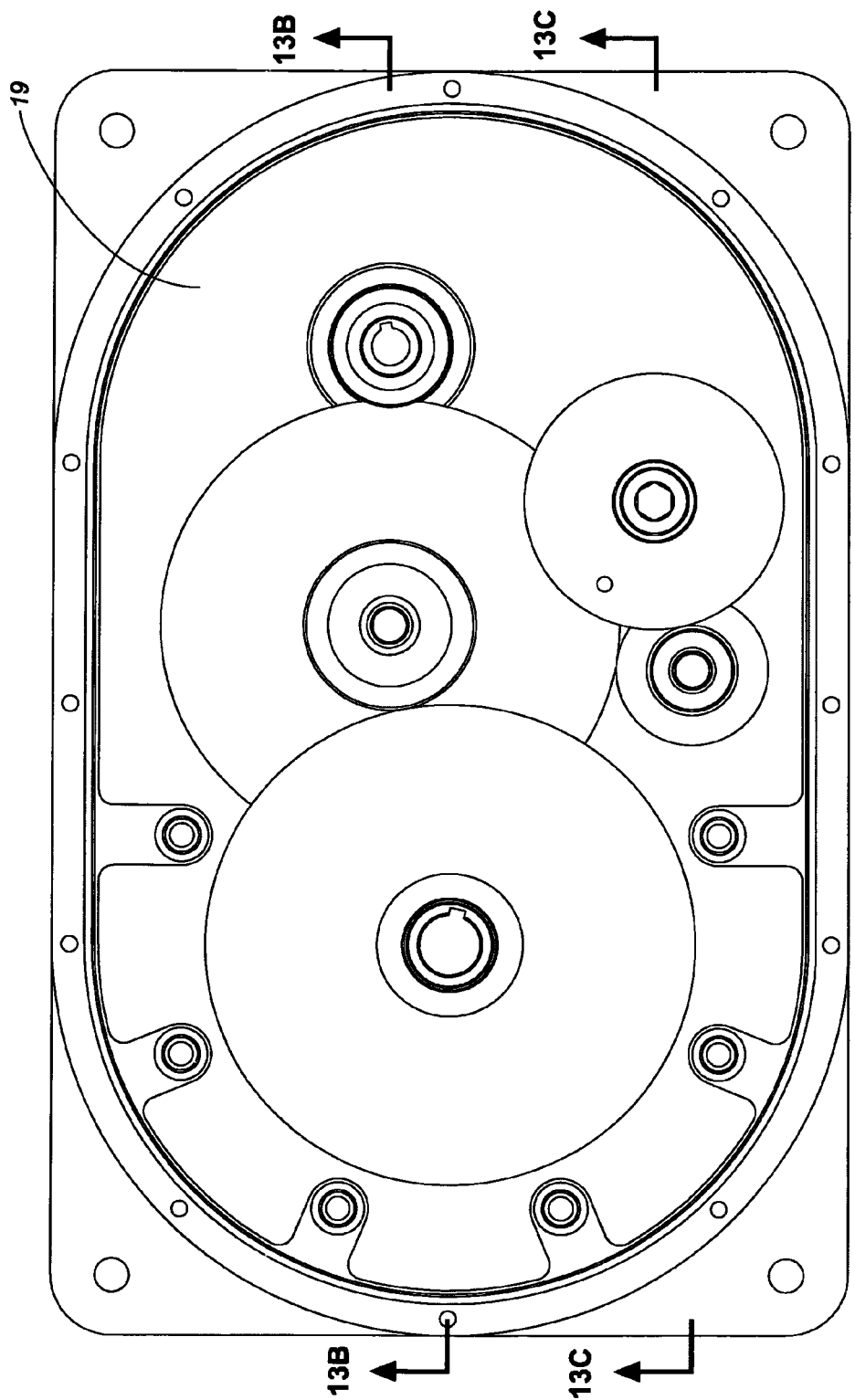
FIG. 13A a cut-away top plan view of the drive gear box portion of a telescoping tower according to aspects of the present invention.

FIG. 13A is a plan view of the gear box 19 with its cover removed.

Figure 13B:
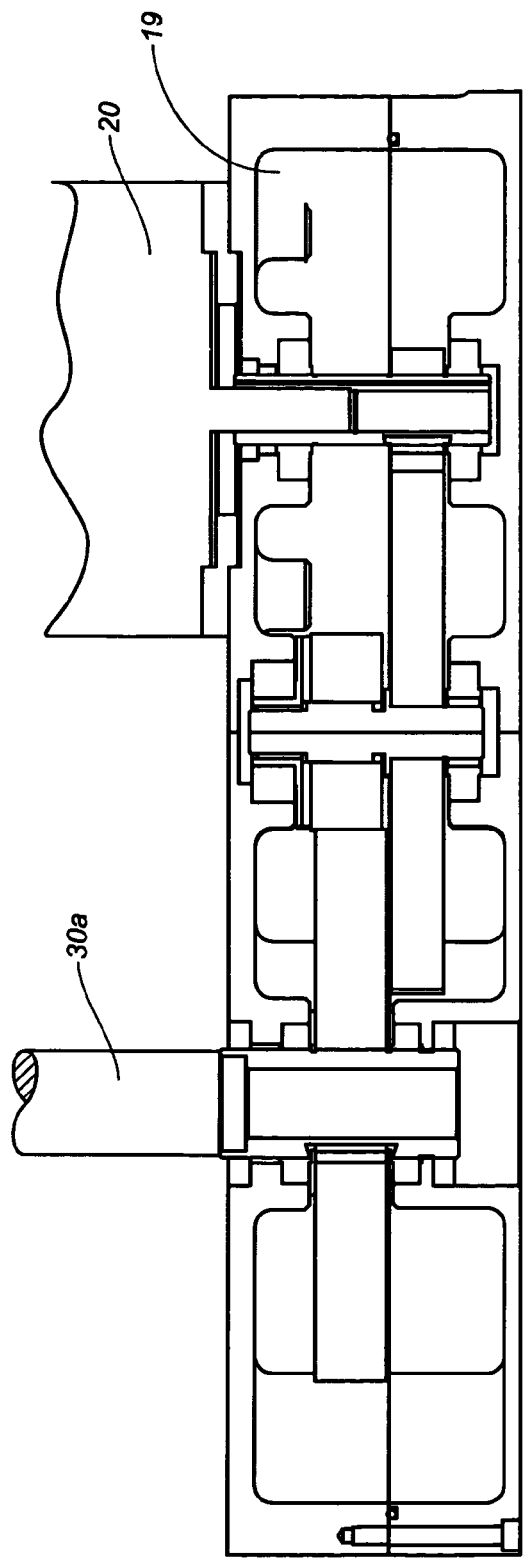
FIG. 13B is a side elevation cross section along the sections lines 13B of FIG. 13A.

FIG. 13B is a cross sectional view along section lines 13B-13B of FIG. 13A.

Figure 13C:
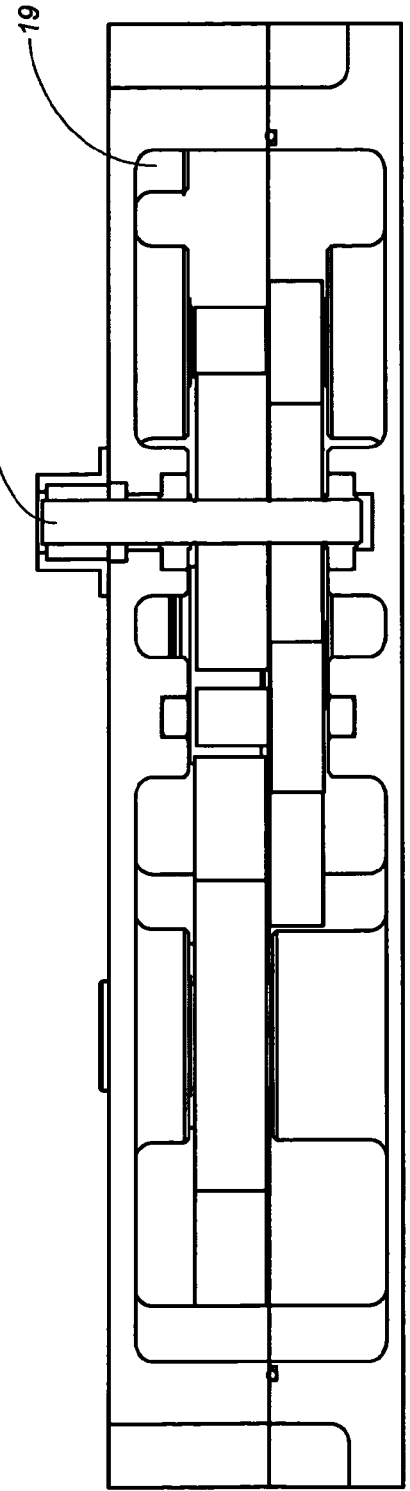
FIG. 13C is a side elevation cross section along the sections lines 13C of FIG. 1A.

FIG. 13C is a cross sectional view along section lines 13C-13C of FIG. 13A.

Figure 15:
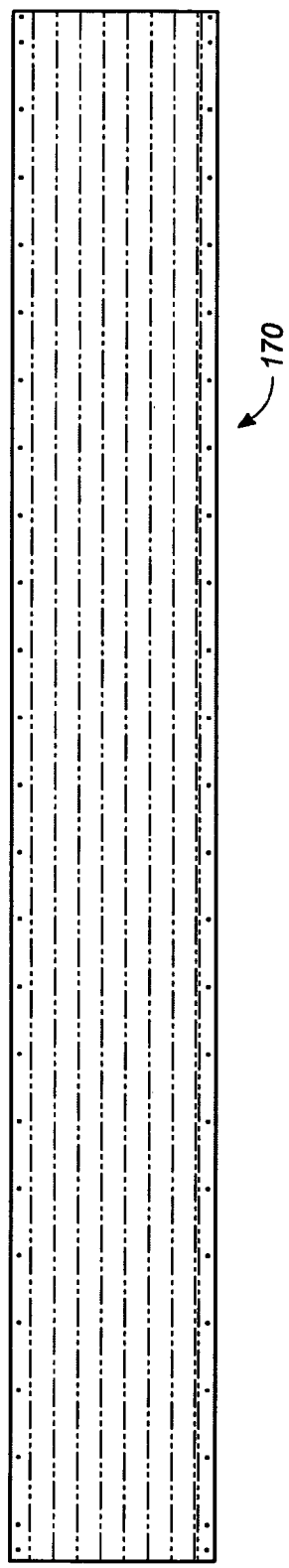
FIG. 15 is a top plan view of the polygonal tube portion of FIG. 14.

A polygon mast according to aspects of the present invention may be fabricated from metal sheets, for example aluminum sheet or stainless steel sheet. The sections can be manufactured from nearly any material that is available in sheets that can be formed, including, for example, aluminum, stainless steel, galvanized steel, and any other suitable material. One may start with a flat metal sheet. Such sheets commonly have a width of 96 inches and a length of as much as 14 feet. A 100 foot tower may employ 14 foot mast sections. Shorter sheets and shorter sections may be employed depending on the desired product height. Automated computer numerically controlled (CNC) may be employed to punch holes, cut slots, etc. in a sheet prior to forming into a "half shell" 170 such as shown in FIGS. 14 and 15. The polygonal mast may be formed from more than two pieces. A single piece cannot be easily fabricated.

Figure 16B:
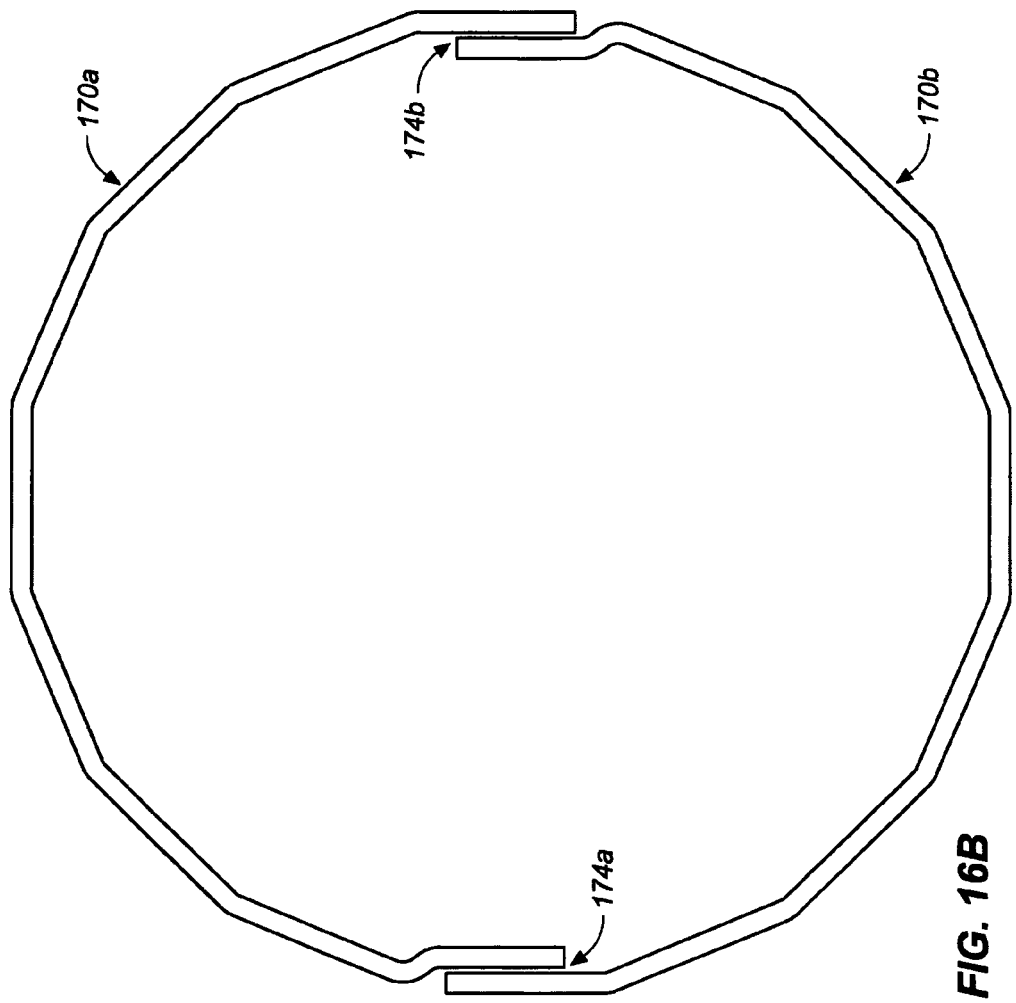
FIG. 16B is a top plan view showing the manner in which two portions of polygonal tube as in FIGS. 12 and 13 may be joined together to form a polygonal tube.

A flat sheet may be formed into a half shell by applying a series of bends along its length, such as 22.5 degree bends when a sixteen-sided mast cylinder is desired. The bends may be applied in any suitable way to a metal sheet 171 using either manually-controlled or computer-controlled devices. FIG. 16A shows the application of such bends using an elongated two-piece die punch 172a, 172b. A stop 173 may be used for aligning the metal sheet with the die. FIG. 16B shows two half shells 170a and 170b mated and fastened together along two overlapping seams 174a and 174b. Rivets or other suitable fasteners may be employed. The end of each of the half shells 170a and 170b may be offset as shown in order to facilitate the overlap and securing together of the half shells.

Figure 17:
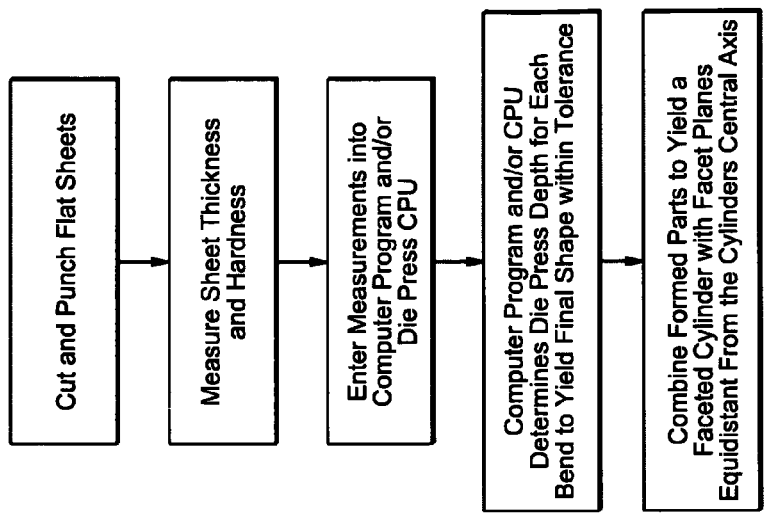
FIG. 17 show steps in making a faceted cylinder (polygonal tube) in accordance with aspects of the present invention.

An example of steps useful for fabricating a polygonal mast section is shown in FIG. 17.

Polygon mast section "shells" may also be formed from thermoset plastics or from composites by any of various suitable methods, including, for example, pultrusion, filament winding or layup (using fiberglass or carbon fiber, for example) over a mandrill. Shells formed in any of such manners may provide excellent strength to weight ratios.

Whether the polygonal sections are formed from metal or other material, as shown in the examples of FIGS. 3A and 3B, for example, corners of the polygon may be used to hold slides and/or to mount elements of the hold-down or locking mechanisms.

Polygon mast sections according the teaching herein may be fabricated with very tight clearances, for example as little as 5 to 6/1000 inch. Such tolerances result in a very "tight" tower.

Although aspects of the invention are not limited to a mast having the cross section of a sixteen-sided polygon, that number of sides is useful because the resulting wind coefficient of the tower is essentially the same as that formed from mast sections having a circular cross section.

The manufacture of polygonal masts and towers has several advantages. Generic metal sheets can be stocked, usable for various different mast and tower configurations. In addition, manufacturing lead time is very short—there is no need to extrude aluminum parts, for example.

INCORPORATION BY REFERENCE

U.S. Pat. No. 5,163,650 is hereby incorporated by reference in its entirety.

The invention claimed is:

1. A telescoping mast assembly comprising:
three nestable telescoping mast sections, an inner mast section, an intermediate mast section, and an outer mast section, the telescoping mast sections having hold-down and locking mechanisms;
each hold-down mechanism including a hold-down actuator pad disposed on an outside surface of the inner mast section at a first vertical position and a first angular position, a first hook pivotally mounted proximate to the top of the intermediate mast section at the first angular position, and a hold-down post including a second hook fixedly mounted proximate to the top of the outer mast section at the first angular position, the first hook biased to engage the fixed hook when the inner mast section is nested within the intermediate mast section below a hold-down position, the hold-down actuator pad engaging and pivoting the first hook to release the first hook from the fixed hook when the inner mast section is nested within the intermediate mast section above the hold-down position; and
each locking mechanism including a lock pad disposed on the outside surface of the inner mast section at a second vertical position lower than the first vertical position and at a second angular position displaced from the first angular position, a lock member pivotally mounted proximate to the top of the intermediate mast section, and a pivot actuator mounted proximate to the top of the outer mast section, the pivot actuator pivoting the lock member to engage a bottom edge of the lock pad when the inner mast section is nested within the intermediate mast section above a lock position higher than the hold-down position, and pivoting the lock member to disengage the bottom edge of the lock pad when the inner mast section is nested within the intermediate mast section below the lock position.

2. The telescoping mast assembly according to claim 1 wherein the nestable telescoping mast sections have a polygonal cross-section.

3. The telescoping mast assembly according to claim 2 wherein each of the mast sections comprises multiple subsections.

4. The telescoping mast assembly according to claim 3 wherein each of the subsections is fabricated from a flat sheet material.

5. The telescopic mast assembly according to claim 4 wherein the flat sheet material is metal.

6. The telescoping mast assembly according to claim 3 wherein the telescoping mast sections are formed from two half shells.

7. The telescoping mast assembly of claim 1 further including:
a base to which the outer mast section is mounted;
a drive screw extending upward from the base, the drive screw including an unthreaded bottom portion, and a threaded portion located above the bottom portion, the bottom portion having a diameter less than a diameter of the threaded portion;
a drive nut assembly mounted at the bottom of each of the inner mast section and the intermediate mast section, the drive nut assembly of the inner mast section engaging the threaded portion of the drive screw when the inner mast section, the intermediate mast section, and the outer mast section are in a fully nested configuration, the drive nut assembly of the intermediate mast section is positioned around the bottom portion of the drive screw when the inner mast section, the intermediate mast section, and the outer mast section are in a fully nested configuration;
wherein the drive nut assembly of the intermediate mast section engages the threaded portion of the drive screw when the inner mast section is extended within the intermediate mast section an engagement distance above a position where the bottom edge of the lock pad of the inner mast section is engaged by the lock of the intermediate mast section; and
wherein the drive nut assembly of the inner mast section disengages from an upper end of the threaded portion of the drive screw when the inner mast section extends within the intermediate mast section a disengagement distance above the position where the drive nut assembly of the intermediate mast section engages the threaded portion of the drive screw.

8. The telescoping mast assembly of claim 7 wherein the drive screw is coupled to a source of driving force to rotate the drive screw in a first direction to extend the inner mast section, the intermediate mast section, and the outer mast section, and in a second direction to nest the inner mast section, the intermediate mast section, and the outer mast section.

9. The telescoping mast assembly of claim 8 wherein the source of driving force is a motor.

10. The telescoping mast assembly of claim 9 further including:
a lower-limit light source and a lower-limit light sensor disposed on the outer mast section;
a lower-limit mirror disposed inside the inner mast section;
the inner mast section, the intermediate mast section, and the outer mast section each including lower-limit alignment holes formed therein, the lower-limit light source, lower-limit mirror, lower-limit light sensor, and the lower-limit alignment holes positioned to be in optical alignment to form an optical path including the light source, the lower-limit mirror and the lower-limit sensor when the inner mast section, the intermediate mast section, and the outer mast section are in a fully nested configuration; and wherein the lower-limit sensor is coupled to the motor to turn off the motor when the inner mast section, the intermediate mast section, and the outer mast section are in the fully nested configuration.

11. The telescoping mast assembly of claim 9 further including:
- an upper-limit light source and an upper-limit light sensor disposed on the outer mast section;
- an upper limit mirror disposed inside the inner mast section;
- the inner mast section and the outer mast section each including upper-limit alignment holes formed therein, the upper-limit light source, upper-limit mirror, upper-limit light sensor, and the upper-limit alignment holes positioned to be in optical alignment to form an optical path including the upper-limit light source, the upper-limit mirror and the upper-limit sensor when the inner mast section, the intermediate mast section, and the outer mast section are in a fully extended configuration; and
- wherein the upper-limit sensor is coupled to the motor to turn off the motor when the inner mast section, the intermediate mast section, and the outer mast section are in the fully extended configuration.

12. The telescoping mast assembly of claim 7 wherein the threaded portion of the drive screw has multiple individual starts.

13. The telescoping mast assembly of claim 7 wherein the threaded portion of the drive screw employs an acme thread.

14. The telescoping mast assembly of claim 7 wherein the drive screw has a tapered upper end above an end of the threaded portion of the drive screw to guide descending drive nut assemblies onto the drive screw.

15. The telescoping mast assembly of claim 7 wherein the drive nut assemblies of the inner mast section and the intermediate mast section are resiliently mounted to their respective mast sections to provide vertical play in both an upward and downward direction.

16. The telescoping mast assembly of claim 7 wherein the drive nut assemblies of the inner mast section and the intermediate mast section have cone shaped threads at each end thereof.

17. The telescoping mast assembly of claim 1 further including a lower optical limit sensor including:
- a lower-limit light source and a lower-limit light sensor disposed on the outer mast section;
- a lower-limit mirror disposed inside the inner mast section; and
- the inner mast section, the intermediate mast section, and the outer mast section each including lower-limit alignment holes formed therein, the lower-limit light source, lower-limit mirror, lower-limit light sensor, and the lower-limit alignment holes positioned to be in optical alignment to form an optical path including the light source, the lower-limit mirror and the lower-limit sensor when the inner mast section, the intermediate mast section, and the outer mast section are in a fully nested configuration.

18. The telescoping mast assembly of claim 1 further including an upper optical limit sensor including:
- an upper-limit light source and an upper-limit light sensor disposed on the outer mast section;
- an upper limit mirror disposed inside the inner mast section; and
- the inner mast section and the outer mast section each including upper-limit alignment holes formed therein, the upper-limit light source, upper-limit mirror, upper-limit light sensor, and the upper-limit alignment holes positioned to be in optical alignment to form an optical path including the upper-limit light source, the upper-limit mirror and the upper-limit sensor when the inner mast section, the intermediate mast section, and the outer mast section are in a fully extended configuration.

* * * * *